US009203805B2

(12) United States Patent
Goyal et al.

(10) Patent No.: US 9,203,805 B2
(45) Date of Patent: Dec. 1, 2015

(54) REVERSE NFA GENERATION AND PROCESSING

(75) Inventors: Rajan Goyal, Saratoga, CA (US);
Satyanarayana Lakshmipathi Billa, Sunnyvale, CA (US)

(73) Assignee: Cavium, Inc., San Jose, CA (US)

( * ) Notice: Subject to any disclaimer, the term of this patent is extended or adjusted under 35 U.S.C. 154(b) by 0 days.

(21) Appl. No.: 13/303,885

(22) Filed: Nov. 23, 2011

(65) Prior Publication Data

US 2013/0133064 A1    May 23, 2013

(51) Int. Cl.
*G06F 21/00*    (2013.01)
*H04L 29/06*    (2006.01)

(52) U.S. Cl.
CPC ........ *H04L 63/0245* (2013.01); *H04L 63/0254* (2013.01); *H04L 63/1416* (2013.01)

(58) Field of Classification Search
CPC . H04L 63/14; H04L 63/0254; H04L 63/1416; H04L 63/0245; G06F 17/30985; G06F 21/55; G06F 7/00
USPC ...................................... 726/14, 22
See application file for complete search history.

(56) References Cited

U.S. PATENT DOCUMENTS

| | | | |
|---|---|---|---|
| 5,428,554 A | 6/1995 | Laskoski | |
| 5,893,142 A * | 4/1999 | Moyer et al. | 711/125 |
| 7,046,848 B1 * | 5/2006 | Olcott | 382/176 |
| 7,225,188 B1 * | 5/2007 | Gai et al. | 1/1 |
| 7,260,558 B1 | 8/2007 | Cheng et al. | |
| 7,594,081 B2 * | 9/2009 | Bouchard et al. | 711/138 |
| 7,702,629 B2 * | 4/2010 | Cytron et al. | 707/999.006 |
| 7,710,988 B1 | 5/2010 | Tripathi et al. | |
| 7,870,161 B2 | 1/2011 | Wang | |

(Continued)

FOREIGN PATENT DOCUMENTS

| EP | 2276217 A2 | 1/2011 |
|---|---|---|
| WO | WO 2004/013777 A1 | 2/2004 |

(Continued)

OTHER PUBLICATIONS

Slawomir Chodnicki, An Introduction to Regular Expressions, Adventures with Open Source BI, available at http://type-exit.org/adventures-with-open-source-bi/2011/05/an-introduction-to-regular-expressions/ (last checked May 10, 2013).*

(Continued)

*Primary Examiner* — Taghi Arani
*Assistant Examiner* — Sharon Lynch
(74) *Attorney, Agent, or Firm* — Hamilton, Brook, Smith & Reynolds, P.C.

(57) ABSTRACT

In a processor of a security appliance, an input of a sequence of characters is walked through a finite automata graph generated for at least one given pattern. At a marked node of the finite automata graph, if a specific type of the at least one given pattern is matched at the marked node, the input sequence of characters is processed through a reverse non-deterministic finite automata (rNFA) graph generated for the specific type of the at least one given pattern by walking the input sequence of characters backwards through the rNFA beginning from an offset of the input sequence of characters associated with the marked node. Generating the rNFA for a given pattern includes inserting processing nodes for processing an input sequence of patterns to determine a match for the given pattern. In addition, the rNFA is generated from the given type of pattern.

34 Claims, 54 Drawing Sheets

(56) References Cited

U.S. PATENT DOCUMENTS

| | | | |
|---|---|---|---|
| 7,949,683 B2 | 5/2011 | Goyal | |
| 7,962,434 B2 | 6/2011 | Estan et al. | |
| 8,024,802 B1 | 9/2011 | Preston | |
| 8,051,085 B1* | 11/2011 | Srinivasan et al. | 707/737 |
| 8,180,803 B2 | 5/2012 | Goyal | |
| 8,301,788 B2 | 10/2012 | Bouchard et al. | |
| 8,392,590 B2 | 3/2013 | Bouchard et al. | |
| 8,407,794 B2 | 3/2013 | Kim et al. | |
| 8,473,523 B2 | 6/2013 | Goyal | |
| 8,554,698 B2* | 10/2013 | Bando et al. | 706/12 |
| 8,566,344 B2* | 10/2013 | Bando et al. | 707/769 |
| 2004/0059443 A1 | 3/2004 | Sharangpani | |
| 2004/0162826 A1* | 8/2004 | Wyschogrod et al. | 707/6 |
| 2004/0172234 A1* | 9/2004 | Dapp et al. | 704/1 |
| 2004/0225999 A1* | 11/2004 | Nuss | 717/114 |
| 2005/0278781 A1 | 12/2005 | Zhao et al. | |
| 2006/0069872 A1* | 3/2006 | Bouchard et al. | 711/121 |
| 2006/0075206 A1* | 4/2006 | Bouchard et al. | 711/202 |
| 2006/0085533 A1 | 4/2006 | Hussain et al. | |
| 2006/0101195 A1* | 5/2006 | Jain | 711/104 |
| 2007/0192863 A1* | 8/2007 | Kapoor et al. | 726/23 |
| 2008/0034427 A1* | 2/2008 | Cadambi et al. | 726/22 |
| 2008/0047012 A1 | 2/2008 | Rubin et al. | |
| 2008/0059464 A1* | 3/2008 | Law et al. | 707/6 |
| 2008/0071783 A1* | 3/2008 | Langmead et al. | 707/6 |
| 2008/0082946 A1* | 4/2008 | Zilic et al. | 716/5 |
| 2008/0097959 A1 | 4/2008 | Chen et al. | |
| 2008/0101371 A1* | 5/2008 | Law et al. | 370/392 |
| 2008/0229415 A1* | 9/2008 | Kapoor et al. | 726/22 |
| 2008/0262991 A1* | 10/2008 | Kapoor et al. | 706/20 |
| 2008/0270833 A1 | 10/2008 | McMillen | |
| 2008/0271141 A1 | 10/2008 | Goldman et al. | |
| 2009/0119279 A1 | 5/2009 | Goyal et al. | |
| 2009/0119399 A1* | 5/2009 | Hussain et al. | 709/224 |
| 2009/0138440 A1* | 5/2009 | Goyal | 707/3 |
| 2009/0138494 A1* | 5/2009 | Goyal | 707/101 |
| 2010/0095162 A1* | 4/2010 | Inakoshi | 714/45 |
| 2010/0114973 A1* | 5/2010 | Goyal | 707/802 |
| 2010/0146623 A1* | 6/2010 | Namjoshi et al. | 726/23 |
| 2010/0153420 A1* | 6/2010 | Yang et al. | 707/758 |
| 2010/0158394 A1* | 6/2010 | Chang et al. | 382/219 |
| 2010/0192225 A1* | 7/2010 | Ma et al. | 726/23 |
| 2010/0198850 A1 | 8/2010 | Cytron et al. | |
| 2011/0016154 A1 | 1/2011 | Goyal et al. | |
| 2011/0093484 A1* | 4/2011 | Bando et al. | 707/758 |
| 2011/0093496 A1* | 4/2011 | Bando et al. | 707/769 |
| 2011/0113191 A1* | 5/2011 | Pandya | 711/108 |
| 2011/0119440 A1* | 5/2011 | Pandya | 711/105 |
| 2011/0173490 A1* | 7/2011 | Narayanaswamy et al. | 714/4.11 |
| 2011/0185077 A1 | 7/2011 | Bremler-Barr et al. | |
| 2011/0238855 A1* | 9/2011 | Korsunsky et al. | 709/231 |
| 2011/0320397 A1* | 12/2011 | Podkolzin | G06F 7/02 706/48 |
| 2012/0017262 A1* | 1/2012 | Kapoor et al. | 726/1 |
| 2012/0143854 A1 | 6/2012 | Goyal et al. | |
| 2012/0221494 A1* | 8/2012 | Pasetto et al. | 706/12 |
| 2012/0221497 A1 | 8/2012 | Goyal et al. | |
| 2012/0311529 A1* | 12/2012 | Beveridge et al. | 717/107 |
| 2013/0191916 A1 | 7/2013 | Yao et al. | |
| 2014/0173254 A1 | 6/2014 | Ruehle | |
| 2014/0214749 A1 | 7/2014 | Ruehle | |
| 2015/0066927 A1 | 3/2015 | Goyal et al. | |
| 2015/0067123 A1 | 3/2015 | Goyal et al. | |
| 2015/0067200 A1 | 3/2015 | Goyal et al. | |
| 2015/0067776 A1 | 3/2015 | Goyal et al. | |
| 2015/0067836 A1 | 3/2015 | Billa et al. | |
| 2015/0067863 A1 | 3/2015 | Billa et al. | |
| 2015/0186786 A1 | 7/2015 | Goyal et al. | |
| 2015/0220454 A1 | 8/2015 | Goyal et al. | |
| 2015/0220845 A1 | 8/2015 | Goyal et al. | |

FOREIGN PATENT DOCUMENTS

| | | |
|---|---|---|
| WO | WO 2007/109445 A1 | 9/2007 |
| WO | WO 2008/005772 A2 | 1/2008 |
| WO | WO 2013/078053 | 5/2013 |

OTHER PUBLICATIONS

Hardeep Singh, Regular Expressions,2002, available at http://www.seeingwithc.org/topic7html.html.*

Michela Becchi and Patrick Crowley, Extending Finite Automata to Efficiently Match Perl-Compatible Regular Expressions, Proceedings of the 2008 ACM CoNext Conference, Article 25.*

Joel W. Branch et al., Denial of Service Intrusion Detection Using Time Dependent Deterministic Finite Automata in Walter Lincoln Hawkins Graduate Research Conference (2002).*

Simone Faro et al., Efficient Variants of the Backward-Oracle-Matching Algorithm, in Proceedings of the Prague Stringology Conference 146-160, Czech Technical University in Prague, Czech Republic (2008).*

Notification of Transmittal of the International Search Report and the Written Opinion of the International Searching Authority, or the Declaration for International Application No. PCT/US2012/065193 dated Mar. 1, 2013.

Rabin, M.O. and Scott, D., "Finite Automata and their Decision Problems," *IBM Journal of Research and Development*, 3(2): 114-125 (1959).

Sipser, M., "Introduction to the Theory of Computation," *PWS*, Boston (1997). ISBN 0-534-94728-X. (See section 1.2: Nondeterminism, pp. 47-63.).

Hopcroft, J.E. and Ullman, J.D., "Introduction to Automata Theory, Languages, and Computation," *Addison-Wesley Publishing*, Reading, Massachusetts (1979). ISBN 0-201-02988-X. (See chapter 2.).

Notification of Transmittal of the International Preliminary Report on Patentability for International Application No. PCT/US2012/065193 dated Jun. 5, 2014.

Becchi, M., "Data Structures, Algorithms and Architectures for Efficient Regular Expression Evaluation," Washington University in St. Louis School of Engineering & Applied Science, published May 2009.

Becchi, M., et al., "A Hybrid Finite Automation for Practical Deep Packet Inspection," published 2007.

Sun, W., et al., "HFilter: Hybrid Finite Automation Based Stream Filtering for Deep and Recursive XML Data," School of Computer Science and Tech., published 2008.

Navarro, G., "NR-grep: A Fast and Flexible Pattern Matching Tool," pp. 1-49, published 2000.

Navarro, G., "Pattern Matching," pp. 1-24, published 2002.

* cited by examiner

NFA for .*a[^\n]
Graph size of 4 nodes

NFA for .*a[^\n][^\n]
Graph size of 5 nodes

NFA for .*a[^\n][^\n][^\n]
Graph size of 6 nodes

DFA for the pattern: ".*a[^\n]"
Graph size of 4 nodes

Note: return arrows from each
state if '\n' is seen are not shown.

DFA for the pattern: ".*a[^\n][^\n]"
Graph size of 8 nodes

Note: return arrows from each
state if '\n' is seen are not shown.

| Pattern | Number of NFA-Nodes | Number of DFA-Nodes |
|---|---|---|
| .*a[^\n] | 4 | 4 |
| .*a[^\n][^\n] | 5 | 8 |
| .*a[^\n][^\n][^\n] | 6 | 16 |
| .*a[^\n][^\n][^\n][^\n] | 7 | 32 |
| .*a[^\n][^\n][^\n][^\n][^\n] | 8 | 64 |
| . | . | . |
| . | . | . |
| . | . | . |
| .*a[^\n]$_1$...[^\n]$_n$ | $n+3$ | $2^n$ |

FIG. 6A-I | FIG. 6A-II | FIG. 6A-III

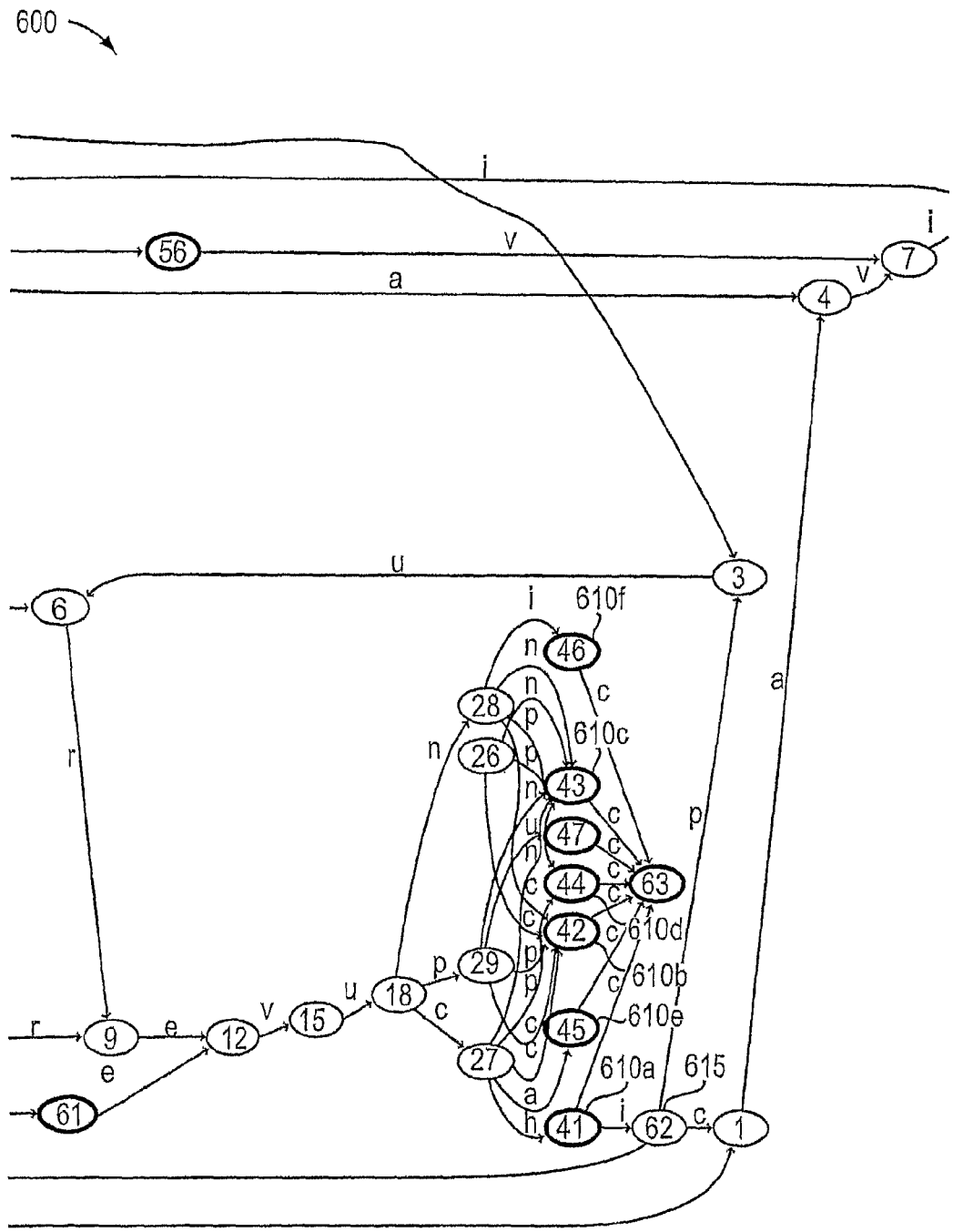
FIG.6A-II

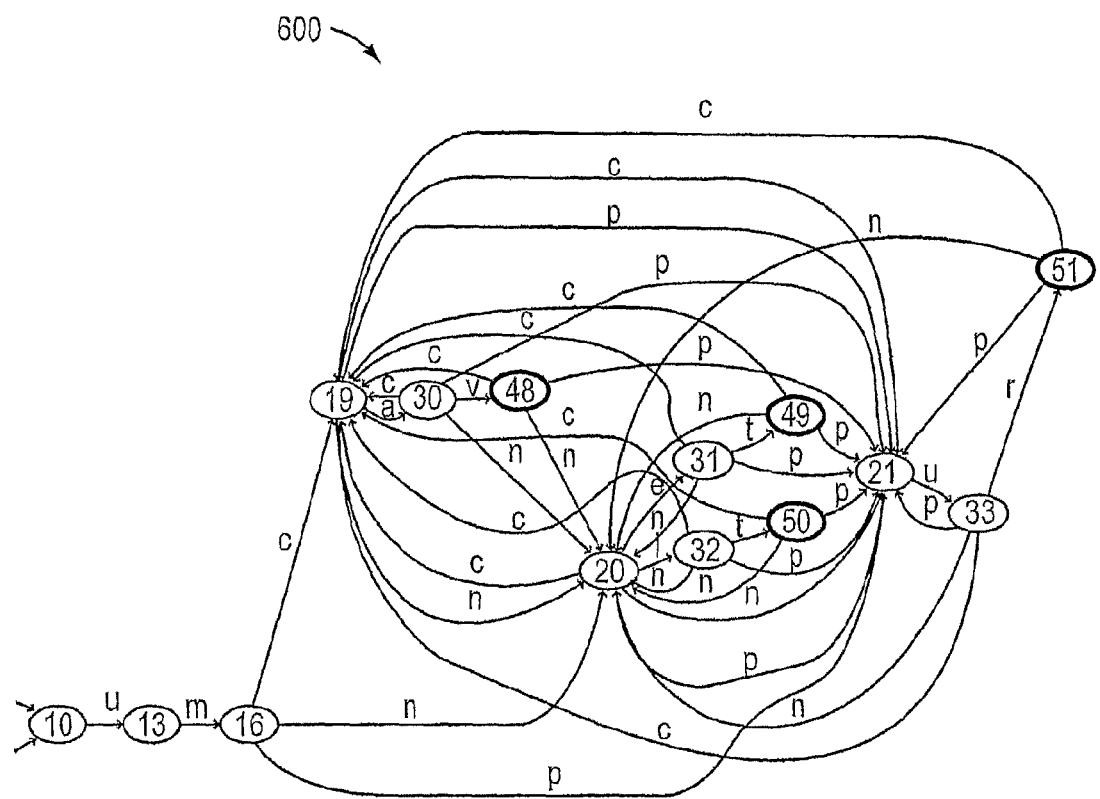
FIG.6A-III

FIG. 6B-I

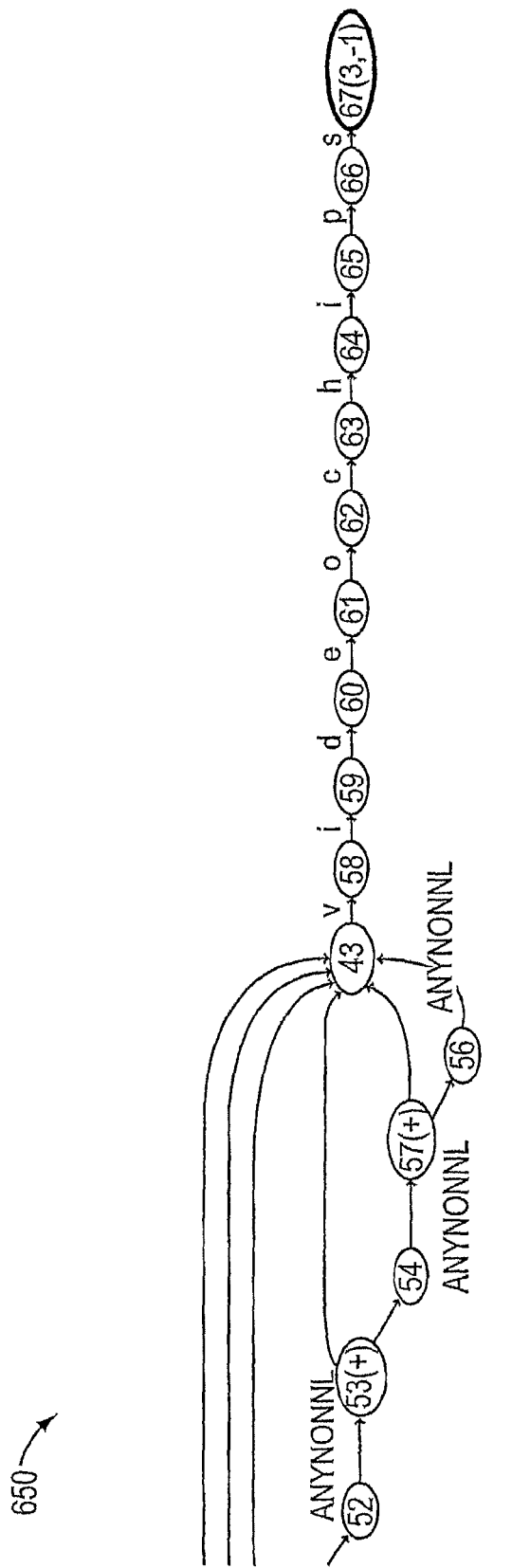
FIG. 6B-II

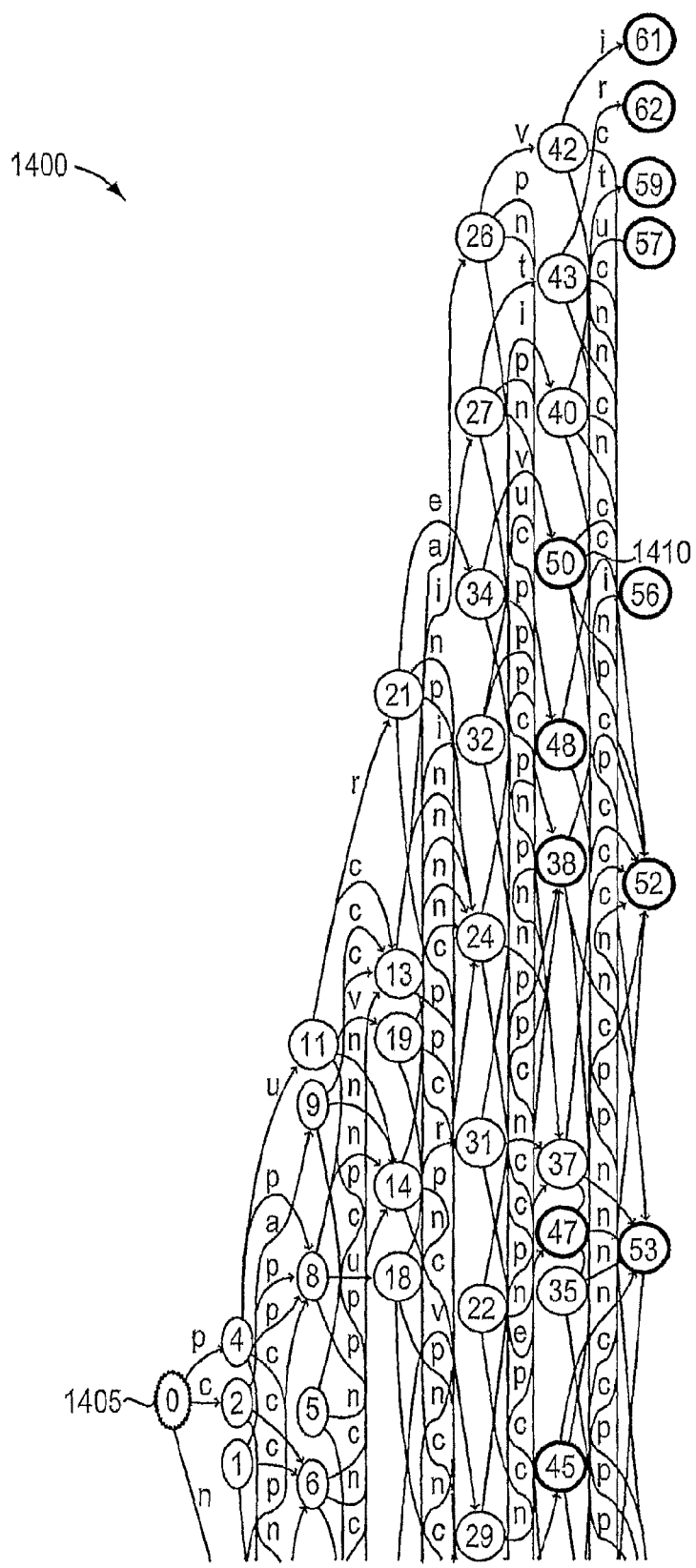
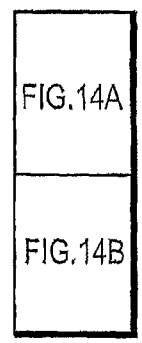
FIG. 14
FIG. 14A

| FIG.15A | FIG.15B | FIG.15C |

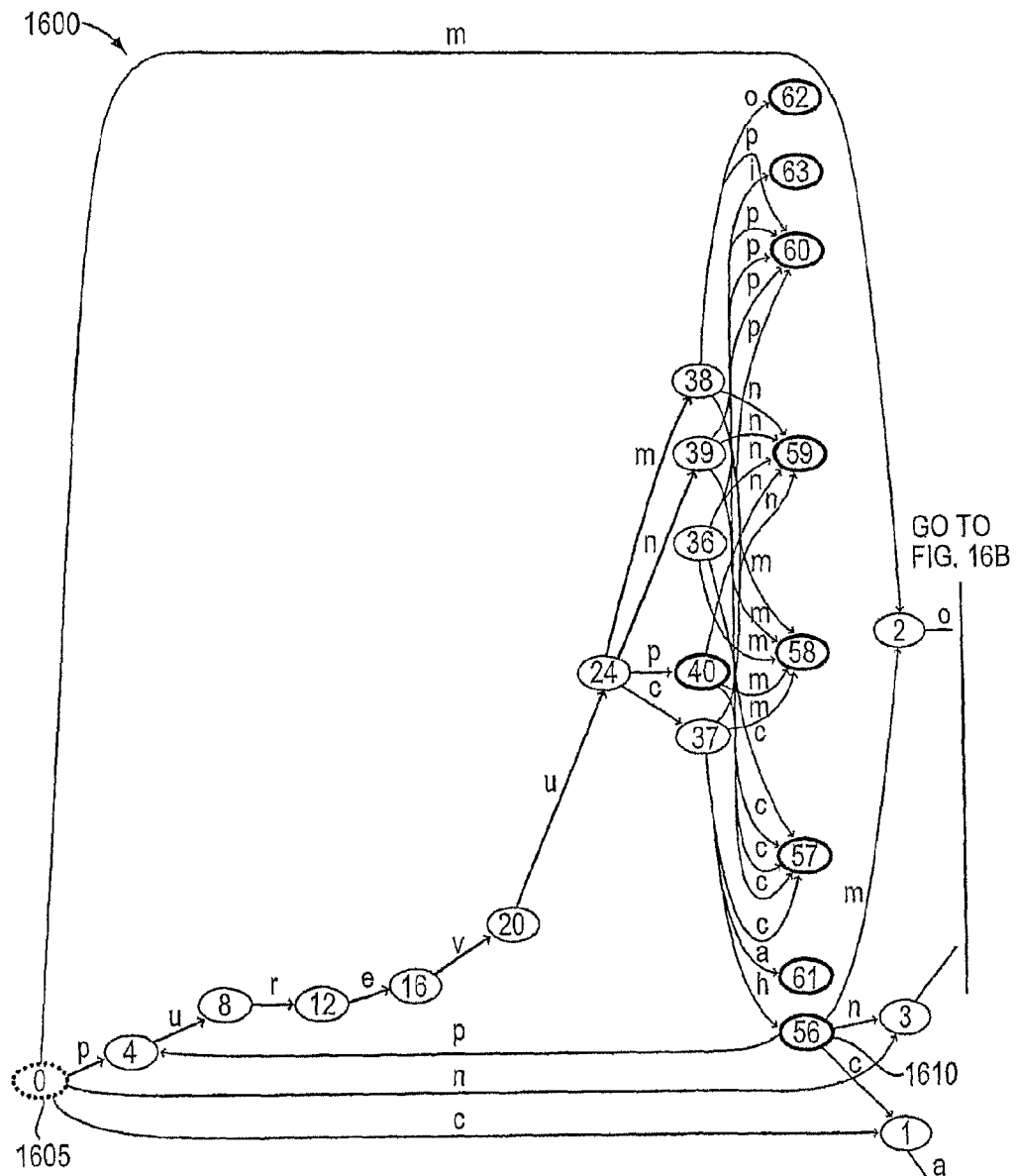
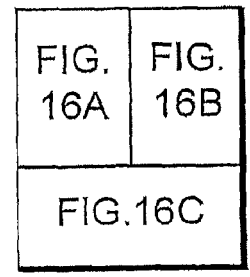
FIG. 16A
FIG. 16

REVERSE NFA GENERATION AND PROCESSING

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Network processors are available for high-throughput L2 and L3 network protocol processing, that is, performing packet processing to forward packets at wire-speed. Typically, a general purpose processor is used to process L4-L7 network protocols that require more intelligent processing. Although a general purpose processor can perform the compute intensive tasks, it does not provide sufficient performance to process the data so that it can be forwarded at wire-speed.

Content aware networking requires inspection of the contents of packets at "wire speed." The content may be analyzed to determine whether there has been a security breach or an intrusion. A large number of patterns and rules in the form of regular expressions are applied to ensure that all security breaches or intrusions are detected. A regular expression is a compact method for describing a pattern in a string of characters. The simplest pattern matched by a regular expression is a single character or string of characters, for example, /c/ or /cat/. The regular expression also includes operators and meta-characters that have a special meaning.

Through the use of meta-characters, the regular expression can be used for more complicated searches such as, "abc.*xyz". That is, find the string "abc", followed by the string "xyz", with an unlimited number of characters in-between "abc" and "xyz". Another example is the regular expression "abc.abc.*xyz;" that is, find the string "abc," followed two characters later by the string "abc" and an unlimited number of characters later by the string "xyz."

An Intrusion Detection System (IDS) application inspects the contents of all individual packets flowing through a network, and identifies suspicious patterns that may indicate an attempt to break into or compromise a system. One example of a suspicious pattern may be a particular text string in a packet followed 100 characters later by another particular text string.

Content searching is typically performed using a search algorithm such as, Deterministic Finite Automata (DFA) or Non-Deterministic Finite Automata (NFA) to process the regular expression.

SUMMARY

A method and corresponding apparatus relate to reverse non-deterministic finite automata (rNFA) generation and processing. In a processor of a security appliance coupled to a network, an input of a sequence of characters is walked through a finite automata graph generated for at least one given pattern. At a marked node of the finite automata graph, if a specific type of the at least one given pattern is matched at the marked node, the input sequence of characters is processed through a reverse non-deterministic finite automata (rNFA) graph generated for the specific type of the at least one given pattern by walking the input sequence of characters backwards through the rNFA beginning from an offset of the input sequence of characters associated with the marked node.

At the marked node, a match of the at least one given pattern may be reported if the at least one given pattern is not the specific type of the at least one given pattern. The specific type of the at least one given pattern may include at least one of the following: start offset, back reference, capture group, and assertion.

In addition, the start offset of the given pattern may be determined upon walking the sequence of characters through the rNFA graph. Further, determining the start offset may include marking an offset of the last character accepted by the rNFA graph as the start offset of the given pattern and reporting the start offset.

The processor may walk the rNFA from the offset associated with the matched pattern and determine whether the given pattern matched by the finite automata includes a matching back-reference. The processor may also determine at least one of the following: a start offset of a possible back-reference, end offset of the possible back-reference, and length of the possible back-reference.

Also, possible back-reference may be matched with an associated capture group of the at least one given pattern, where the capture group may be determined by the input of the sequence of characters. The processor may also determine at least one of the following: a start offset of the capture group, end offset of the capture group, and length of the capture group.

The following may also be determined: whether the length of the possible back-reference and associated capture group are equivalent and whether a character string of the possible back-reference and associated capture group are equivalent.

The processor may match the possible back-reference with at least one other possible back-reference, where the possible back-reference and the at least one other possible back-reference are associated with the same capture group. In addition, the processor may determine a non-matching back-reference of the given pattern if the possible back-reference does not match with the at least one other possible back-reference.

The processor may walk the rNFA from the offset associated with the matched pattern and determine whether the given pattern matched by the finite automata graph satisfies an assertion of the given pattern. Determining whether the given pattern satisfies the assertion may include determining a subset of the given pattern, where the subset of the given pattern corresponds to the assertion of the given pattern. Further, the processor may determine whether the subset of the given pattern is matched by the rNFA. If the assertion is a positive assertion, the processor may report the assertion is satisfied if the subset of the given pattern is matched by the rNFA. Alternatively, if the assertion is a negative assertion, the processor may report an unsatisfied assertion if the subset of the given pattern is matched by the rNFA.

Another method and corresponding apparatus relates to generating a reverse non-deterministic finite automata (rNFA) graph for a given pattern, where the rNFA includes processing nodes for processing an input sequence of patterns to determine a match for the given pattern. In addition, the rNFA is generated from the given type of pattern.

Generating the rNFA may include converting a given pattern including a back-reference into a revised pattern, wherein converting includes replacing the back-reference with a capture group corresponding to the back-reference and generating the rNFA using the revised pattern.

In addition, generating the rNFA may include determining locations of the given pattern requiring a back-reference match and inserting back-reference processing nodes into the rNFA corresponding to locations associated with a beginning offset of the back-reference and an end offset of the back-reference, the beginning offset and end offset of the back-reference corresponding to offset locations of the revised pattern.

Via the back-reference processing nodes, the method and apparatus may determine at least one of the following: a start offset of the back-reference corresponding to an offset of the input sequence of characters, end offset of the back-reference corresponding to an offset of the input sequence of characters, and length of the back-reference within the input sequence of characters.

Further, generating the rNFA may include determining locations of the given pattern including a capture group associated with the back-reference of the given pattern and inserting capture group processing nodes into the rNFA corresponding to locations associated with a beginning offset of the capture group and an end offset of the capture group, the beginning offset and end offset of the capture group corresponding to offset locations of the revised pattern.

Using the capture group processing nodes, the method and apparatus may determine at least one of the following: a start offset of the capture group corresponding to an offset of the input sequence of characters, end offset of the capture group corresponding to an offset of the input sequence of characters, and length of the capture group within the input sequence of characters.

Further, the method and apparatus may use the determined results of the processing nodes to determine matches between back-references and associated capture groups within the input sequence of characters, where the matches identify a match of the given pattern within the input sequence of characters.

Generating the rNFA may include converting a given pattern including an assertion into a revised pattern and removing the assertion. The method and apparatus may also determine a location of the removed assertion of the revised pattern and insert an assertion processing node in the rNFA corresponding to an offset of the revised pattern associated with the location of the removed assertion.

Further, the method and apparatus may identify a subset pattern of the given pattern corresponding to the removed assertion. For the subset pattern, the method and apparatus may generate a finite automata graph corresponding to a type of assertion and link the generated finite automata graph to the assertion processing node.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 5A-G are NFA and DFA graphs and table illustrating the concept of graph explosion.

FIG. 14A-B is a DFA graph of an example CARPA-DFA.

FIG. 16A-C is a DFA graph of an example CARPA-DFA.

DETAILED DESCRIPTION

Perl Compatible Regular Expression (PCRE) has become a de facto standard for regular expression syntax in security and networking applications. As more applications requiring deep packet inspections have emerged or more threats have become prevalent in the internet, corresponding signatures/patterns to identify virus/attacks or applications have also become more complex. Signature databases evolved from having simple string patterns to regular expression (regex) patterns with wild characters/ranges/character classes to advanced PCRE signatures. Advanced PCRE signatures specifically refer to features such as start offset, back references, captured groups, and assertions. Embodiments of the present invention support advanced PCRE features at wire speed.

Before describing example embodiments of the present invention in detail, an example security application in which the embodiments may be implemented and typical processing using DFA, NFA, and Cavium Regex Processing Automaton (CARPA) are described immediately below to help the reader understand the inventive features of the present invention.

Figure 1A:
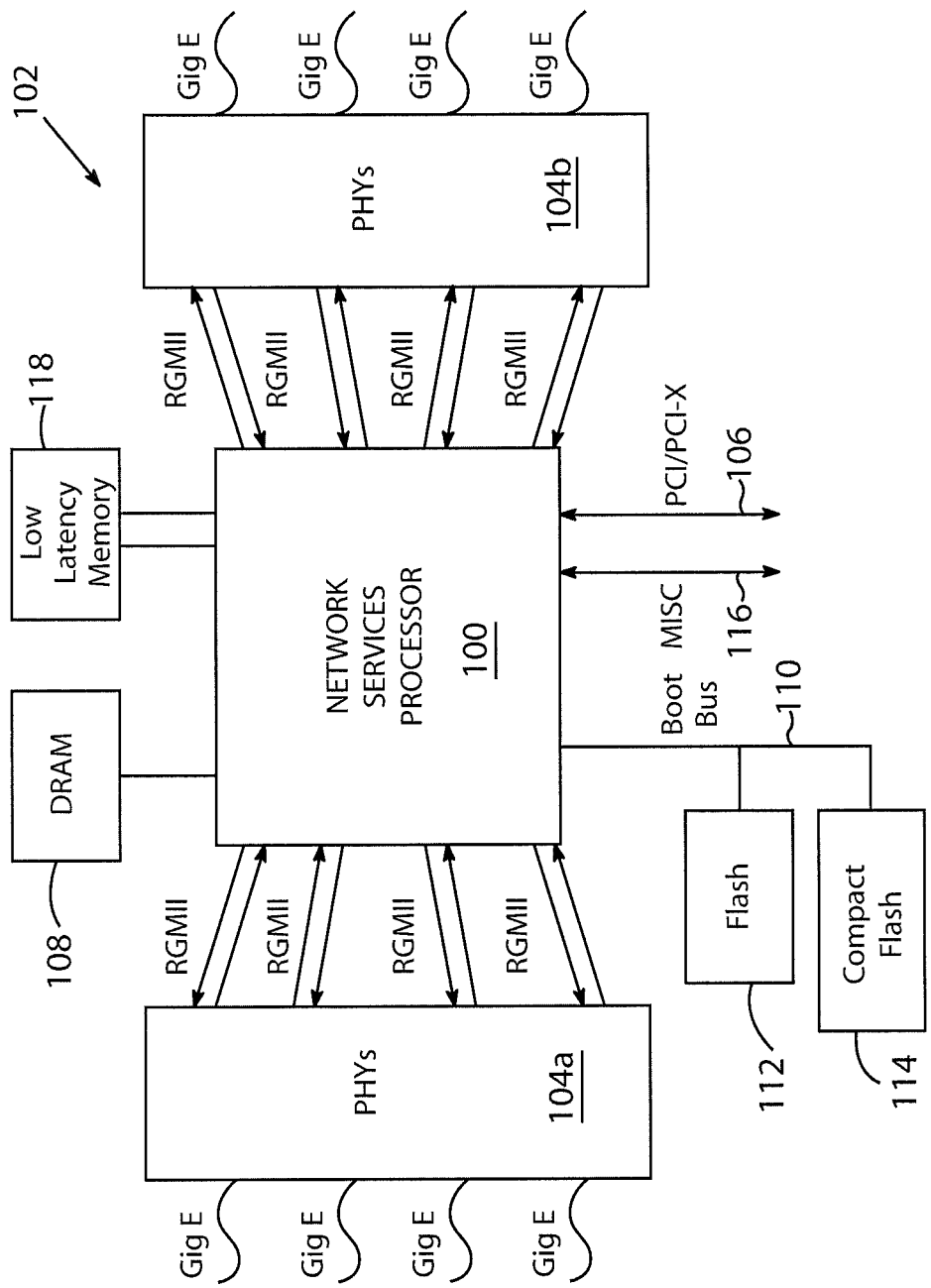
FIGS. 1A and 1B are block diagrams of a security appliance including a network services processor and a protocol processor, respectively, in which embodiments of the present invention may be implemented.

FIG. 1A is a block diagram of an example security appliance 102 including a network services processor 100. The security appliance 102 may be a standalone system that may switch packets received at one Ethernet port (Gig E) to another Ethernet port (Gig E) and perform a plurality of security functions on received packets prior to forwarding the packets. For example, the security appliance 102 may be used to perform security processing on packets received on a Wide Area Network prior to forwarding the processed packets to a Local Area Network.

The network services processor 100 processes Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

The network services processor 100 may include a plurality of Ethernet Media Access Control interfaces with standard Reduced Gigabit Media Independent Interface (RGMII) connections to the off-chip PHYs 104a, 104b.

The network services processor 100 may also receive packets from the Ethernet ports (Gig E) through the physical interfaces PHY 104a, 104b, and perform L2-L7 network protocol processing on the received packets and forwards processed packets through the physical interfaces 104a, 104b to another hop in the network or the final destination or through the PCI bus 106 for further processing by a host processor. The network protocol processing may include processing of network security protocols such as Firewall, Application Firewall, Virtual Private Network (VPN) including IP Security (IPSec) and/or Secure Sockets Layer (SSL), Intrusion Detection System (IDS) and Anti-virus (AV).

The network services processor 100 may also include a memory controller for controlling external local memory 118, such as Dynamic Random Access Memory (DRAM) and double-data-rate synchronous dynamic random access memory (DDR SDRAM).

The local memory 118 may be used for Internet Services and Security applications allowing fast lookups, including the string-matching that may be required for Intrusion Detection System (IDS) or Anti Virus (AV) applications and other applications that require string matching.

The network services processor 100 may perform pattern search, regular expression processing, content validation, transformation and security accelerate packet processing according to an embodiment of the present invention. The regular expression processing and pattern search may be used to perform string matching for AV and IDS applications and other applications that require string matching.

A DRAM controller in the network services processor 100 may control access to an external Dynamic Random Access Memory (DRAM) 108 that is coupled to the network services processor 100. The DRAM 108 may store data packets received from the PHYs interfaces 104a, 104b or the Peripheral Component Interconnect Extended (PCI-X) interface 106 for processing by the network services processor 100. In one embodiment, the DRAM interface supports 64 or 128 bit Double Data Rate II Synchronous Dynamic Random Access Memory (DDR II SDRAM) operating up to 800 MHz. The DRAM may also store rules data required for lookup and pattern matching in DFA and NFA graph expression searches.

A boot bus 110 may provide the necessary boot code which may be stored in flash memory 112 and may be executed by the network services processor 100 when the network services processor 100 is powered-on or reset. Application code may also be loaded into the network services processor 100 over the boot bus 110, from a device 114 implementing the Compact Flash standard, or from another high-volume device, which can be a disk, attached via the PCI bus.

The miscellaneous I/O interface 116 offers auxiliary interfaces such as General Purpose Input/Output (GPIO), Flash, IEEE 802 two-wire Management Data Input/Output Interface (MDIO), Universal Asynchronous Receiver-Transmitters (UARTs) and serial interfaces.

Figure 1B:
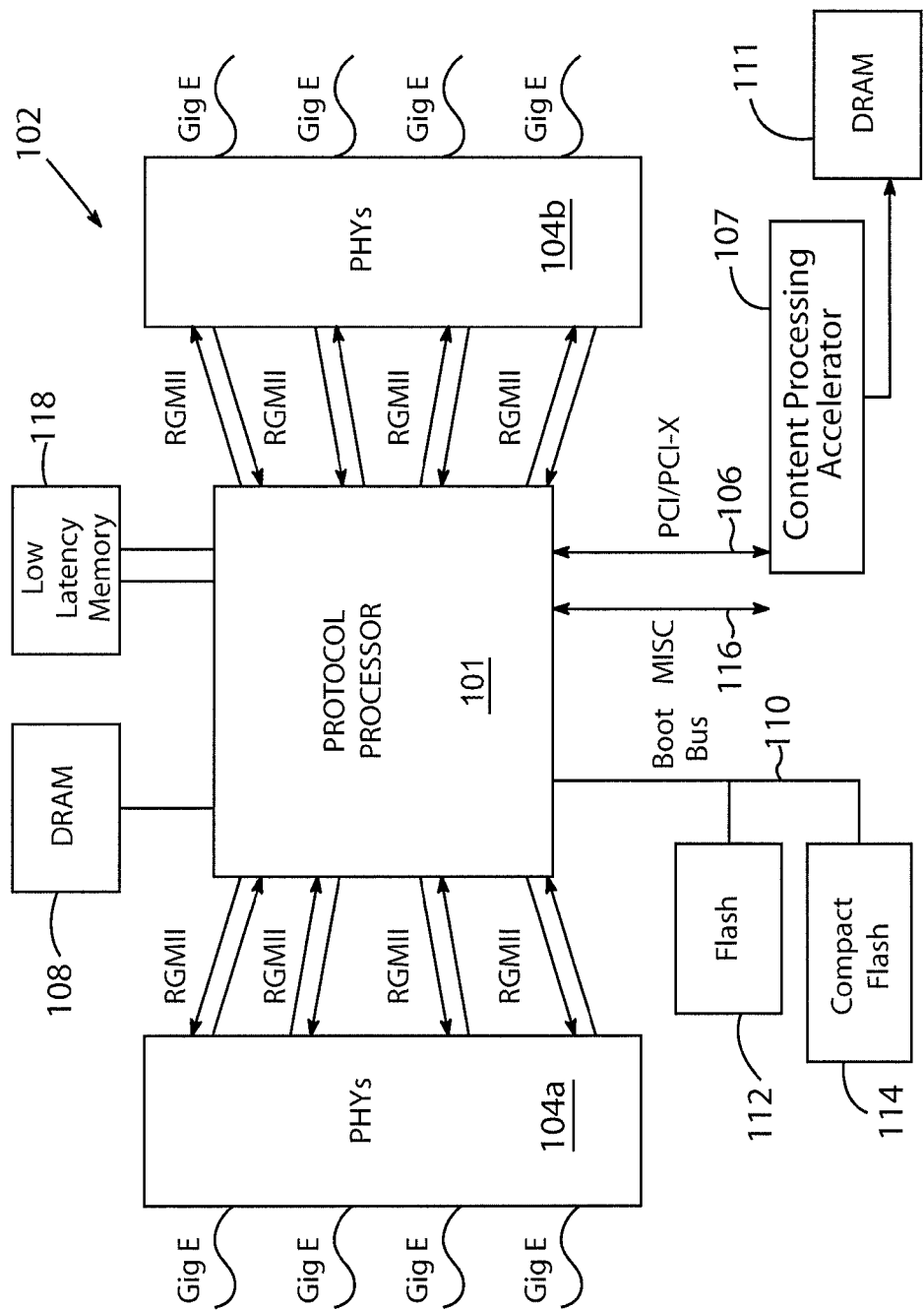

It should be appreciated that the example security appliance 102 may alternatively include a protocol processor 101 (FIG. 1B). The protocol processor 101 may include the element of the network services processor 100 with the addition of a content processing accelerator 107, connected to the processor 101 via the PCI/PCI-X connection 106, and an external DRAM 111 connected to the accelerator 107. The accelerator 107 and DRAM 111 may be employed in content search applications, therefore making all content searching operations external to the processor 101.

Figure 2:
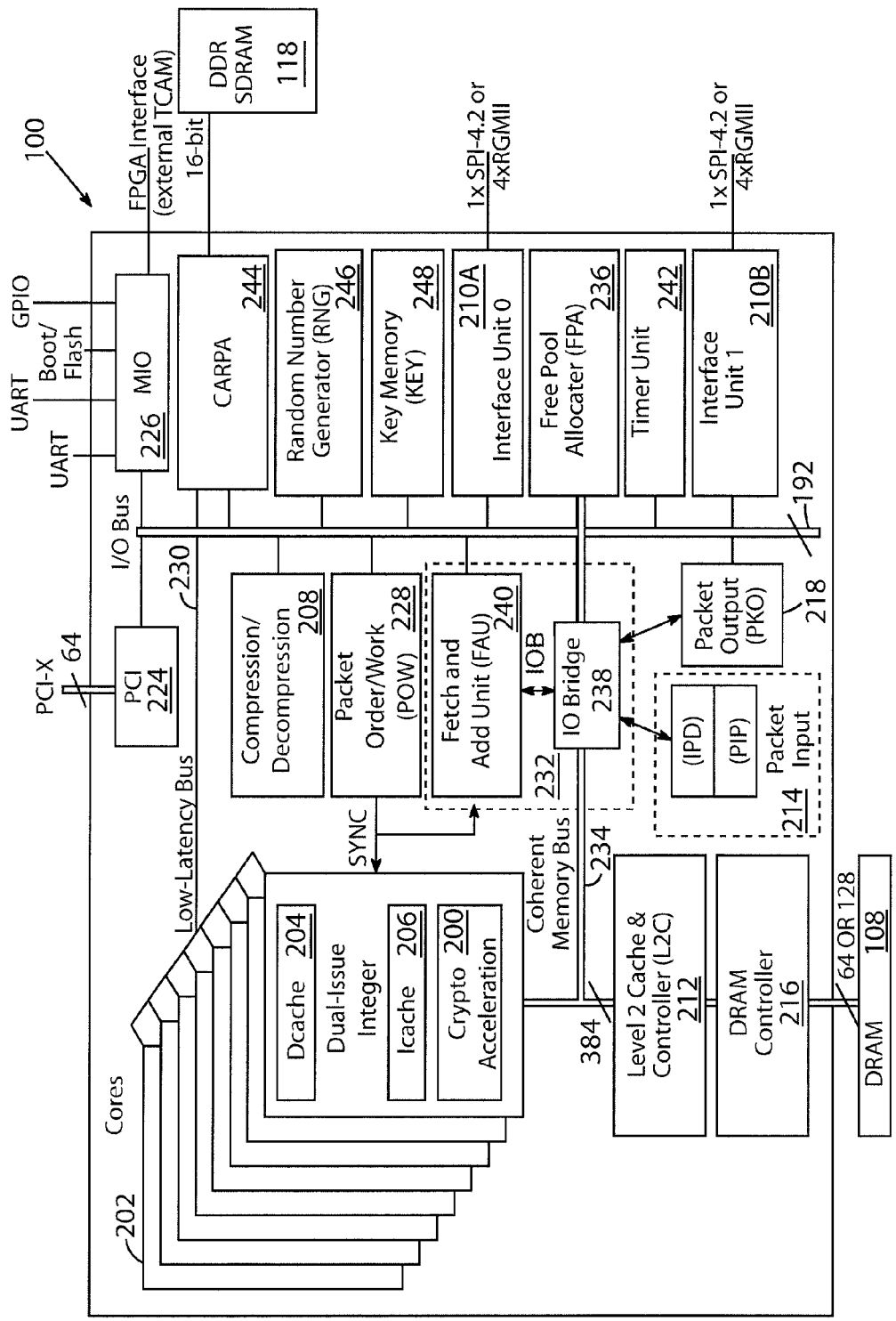
FIG. 2 is a block diagram of the network services processor shown in FIG. 1A in which embodiments of the present invention may be implemented.

FIG. 2 is a block diagram of the network services processor 100, or the protocol processor 101 shown in FIGS. 1A and 1B, respectively. The network services processor 100, and/or the protocol processor 101, delivers high application performance using a plurality of processors (cores) 202. Network applications may be categorized into data plane and control plane operations. Each of the cores 202 may be dedicated to performing data plane or control plane operations. A data plane operation may include packet operations for forwarding packets. A control plane operation may include processing of portions of complex higher level protocols such as Internet Protocol Security (IPSec), Transmission Control Protocol (TCP) and Secure Sockets Layer (SSL). A data plane operation may include processing of other portions of these complex higher level protocols.

A packet may be received by any one of the interface units 210a, 210b through a SPI-4.2 or RGM II interface. A packet may also be received by the PCI interface 224. The interface unit 210a, 210b handles L2 network protocol pre-processing of the received packet by checking various fields in the L2 network protocol header included in the received packet. After the interface unit 210a, 210b has performed L2 network protocol processing, the packet is forwarded to the packet input unit 214. The packet input unit 214 may perform pre-processing of L3 and L4 network protocol headers included in the received packet. The pre-processing includes checksum checks for Transmission Control Protocol (TCP)/User Datagram Protocol (UDP) (L3 network protocols).

The packet input unit 214 may write packet data into buffers in Level 2 cache 212 or DRAM 108 in a format that is convenient to higher-layer software executed in at least one processor 202 for further processing of higher level network protocols. The packet input unit 214 may also support a programmable buffer size and can distribute packet data across multiple buffers to support large packet input sizes.

The Packet order/work (POW) module (unit) 228 may queue and schedule work (packet processing operations) for the processor 202. Work is defined to be any task to be performed by a processor that is identified by an entry on a work queue. The task can include packet processing operations, for example, packet processing operations for L4-L7 layers to be performed on a received packet identified by a work queue entry on a work queue. Each separate packet processing operation is a piece of the work to be performed by a processor on the received packet stored in memory (L2 cache memory 212 or DRAM 108). For example, the work may be the processing of a received Firewall/ Virtual Private Network (VPN) packet. The processing of a Firewall/VPN packet may include the following separate packet processing operations (pieces of work): (1) defragmentation to reorder fragments in the received packet; (2) IPSec decryption; (3) IPSec encryption; and (4) Network Address Translation (NAT) or TCP sequence number adjustment prior to forwarding the packet.

The network services processor 100, and/or the protocol processor 101, may also include a memory subsystem. The memory subsystem may include level 1 data cache memory 204 in each processor 202, instruction cache in each processor 202, level 2 cache memory 212, a DRAM controller 216 for external DRAM memory and the interface 230 to external local memory 118 (e.g., DDR SDRAM). The memory subsystem is architected for multi-processor support and tuned to deliver both high-throughput and low-latency required by memory intensive content networking applications. Level 2 cache memory 212 and external DRAM memory 108 (of FIGS. 1A and 1B) may be shared by all of the processors 202 and I/O co-processor devices.

The network services processor 100, and/or the protocol processor 101, may also include application specific co-processors that offload the processors 202 so that the network services processor achieves high-throughput. The application specific co-processors include a co-processor 244 that performs the Cavium Regex Processing Automaton or CARPA described in greater detail below and a compression/decompression co-processor 208 that performs compression and decompression.

Each processor 202 may be a dual-issue, superscalar processor with instruction cache 206, Level 1 data cache 204, built-in hardware acceleration (crypto acceleration module) 200 for cryptography algorithms with direct access to local memory over the low latency memory bus 230. The low-latency direct-access path to local memory 118 bypasses the L2 cache memory 212 and can be directly accessed from both the processors (cores) 202 and the CARPA co-processor 244.

Prior to describing the operation of the content search macros used for regular expression processing and pattern search in further detail, the other modules in the network services processor 100 will be described. In an example, after the packet has been processed by the processors 202, a packet output unit (PKO) 218 reads the packet data from L2 cache or DRAM, performs L4 network protocol post-processing (e.g., generates a TCP/UDP checksum), forwards the packet through the interface unit 210a, 210b and frees the L2 cache 212 or DRAM 108 locations used to store the packet.

Each processor 202 is coupled to the L2 cache by a coherent memory bus 234. The coherent memory bus 234 is the communication channel for all memory and I/O transactions between the processors 202, an I/O Bridge (IOB) 232 and the Level 2 cache and controller 212.

A Free Pool Allocator (FPA) 236 maintains pools of pointers to free memory in level 2 cache memory 212 and DRAM 108. A bandwidth efficient (Last In First Out (LIFO)) stack is implemented for each free pointer pool. If a pool of pointers is too large to fit in the Free Pool Allocator (FPA) 236, the Free Pool Allocator (FPA) 236 builds a tree/list structure in level 2 cache 212 or DRAM 108 using freed memory in the pool of pointers to store additional pointers.

The I/O Bridge (IOB) 232 manages the overall protocol and arbitration and provides coherent I/O partitioning. The IOB 232 includes a bridge 238 and a Fetch and Add Unit (FAU) 240. The bridge 238 includes buffer queues for storing information to be transferred between the I/O bus, coherent memory bus, the packet input unit 214 and the packet output unit 218.

The Fetch and Add Unit (FAU) 240 is a 2 KB register file supporting read, write, atomic fetch-and-add, and atomic update operations. The Fetch and Add Unit (FAU) 240 can be accessed from both the processors 202 and the packet output unit 218. The registers store highly-used values and thus reduce traffic to access these values. Registers in the FAU 240 are used to maintain lengths of the output queues that are used for forwarding processed packets through the packet output unit 218.

The PCI interface controller 224 has a DMA engine that allows the processors 202 to move data asynchronously between local memory in the network services processor and remote (PCI) memory in both directions.

Typically, content aware application processing uses either a deterministic finite automata (DFA) or a non-deterministic finite automata (NFA) to recognize a pattern in the content of a received packet. The DFA and NFA are both finite state machines, that is, models of computation each including a set of states, a start-state, an input alphabet (set of all possible symbols) and a transition function. Computation begins in the start-state and changes to new states dependent on the transition function.

The pattern is commonly expressed using a regular expression that includes atomic elements, for example, normal text characters such as, A-Z, 0-9 and meta-characters such as, *, ˆ and |. The atomic elements of a regular expression are the symbols (single characters) to be matched. These are combined with meta-characters that allow concatenation (+) alternation (|), and Kleene-star (*). The meta-character for concatenation is used to create multiple character matching patterns from a single character (or sub-strings) while the meta-character for alternation (|) is used to create a regular expression that can match any of two or more sub-strings. The meta-character Kleene-star (*) allows a pattern to match any number of times, including no occurrences of the preceding character or string of characters. Combining different operators and single characters allows complex expressions to be constructed. For example, the expression (th(is|at)*) will match the following character strings: th, this, that, thisis, thisat, thatis, or thatat.

The character class construct [ . . . ] allows listing of a list of characters to search for, e.g. gr[ea]y looks for both grey and gray. A dash indicates a range of characters, for example, [A-Z]. The meta-character "." matches any one character.

The input to the DFA or NFA state machine is typically a string of (8-bit) bytes, that is, the alphabet is a single byte (one character or symbol). Each byte in the input stream results in a transition from one state to another state.

The states and the transition functions of the DFA or NFA state machine can be represented by a graph, where each node in the graph represents a state and arcs in the graph represent state transitions. The current state of the state machine is represented by a node identifier that selects a particular graph node.

Using DFA to process a regular expression and to find a pattern or patterns described by a regular expression in an input stream of characters is characterized by:

1) Deterministic run time performance: A next state of a DFA can be determined from an input character (or symbol) and a current state of the DFA. In other words, there is only one state transition per DFA state. As such, run time performance of the DFA is said to be deterministic and the behavior can be completely predicted from the input.

2) Smaller per flow context (e.g., state or node pointer) is required to support matches across multiple packets: In a search for a pattern in an input that spans several packets making up a flow, the search may stop at one packet and then resume at another packet. Generally, determining which state to resume the search requires tracking, remembering or otherwise storing (i.e., as state pointers) all states gone through thus far when the search stopped. In DFA, however, only the state at which a search stopped needs to be remembered in order to resume the search. As such, it can be said that a DFA is characterized as requiring smaller per flow context to support pattern matching across multiple input packets e.g., on the order of several bytes to store a state or node pointer.

3) A graph in which the number of nodes (or graph size) grows exponentially with the size of a pattern.

In contrast, using NFA to process a regular expression and to find a pattern(s) described by the regular expression in an input stream of characters is characterized by:

1) Non-deterministic run time performance: Given an input character (or symbol) and a current state of the NFA, it is possible there are more than one next states of the NFA to which to transition. In other words, a next state of the NFA cannot be uniquely determined from the input and the current state of the NFA. As such, run time performance of the NFA is said to be non-deterministic and the behavior cannot be completely predicted from the input.

2) Larger per flow context (e.g., state or node pointer) required to support match across packets: As described previously, pattern matching across multiple input packets, where a search stops at one packet and then resumes at another, requires tracking all states gone through thus far when the search stopped. In NFA, as more of the input is matched, the greater the number of states that are gone through and need to be tracked. As such, it can be said that a NFA is characterized as requiring larger per flow context to support pattern matching across multiple input packets when compared to DFA.

3) A graph in which the number of nodes (or graph size) grows linearly with the size of a pattern.

Figure 3A:
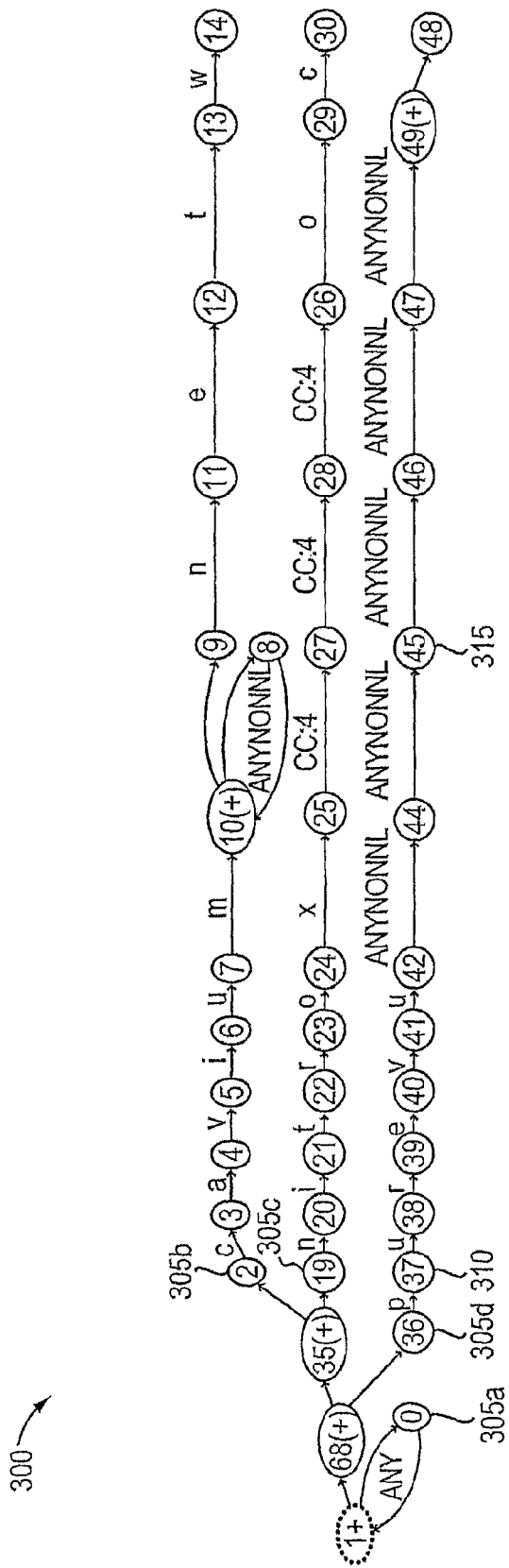
FIG. 3A-B is a NFA graph of an example NFA.
Figure 3:
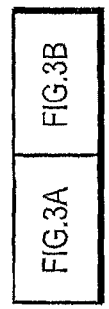
Figure 3B:
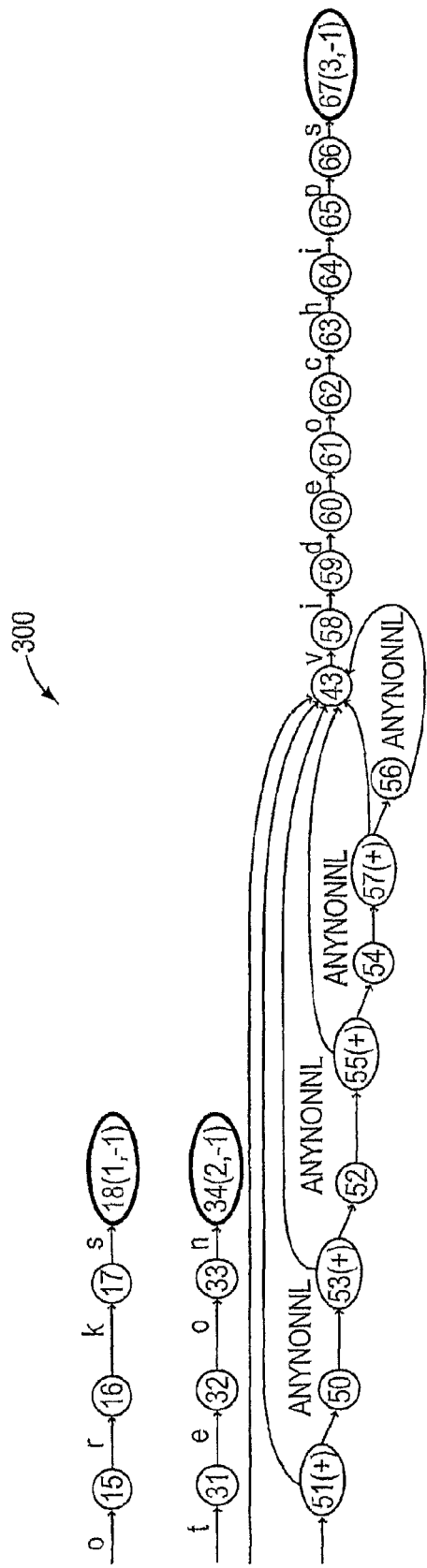
Figures 4, 4A:
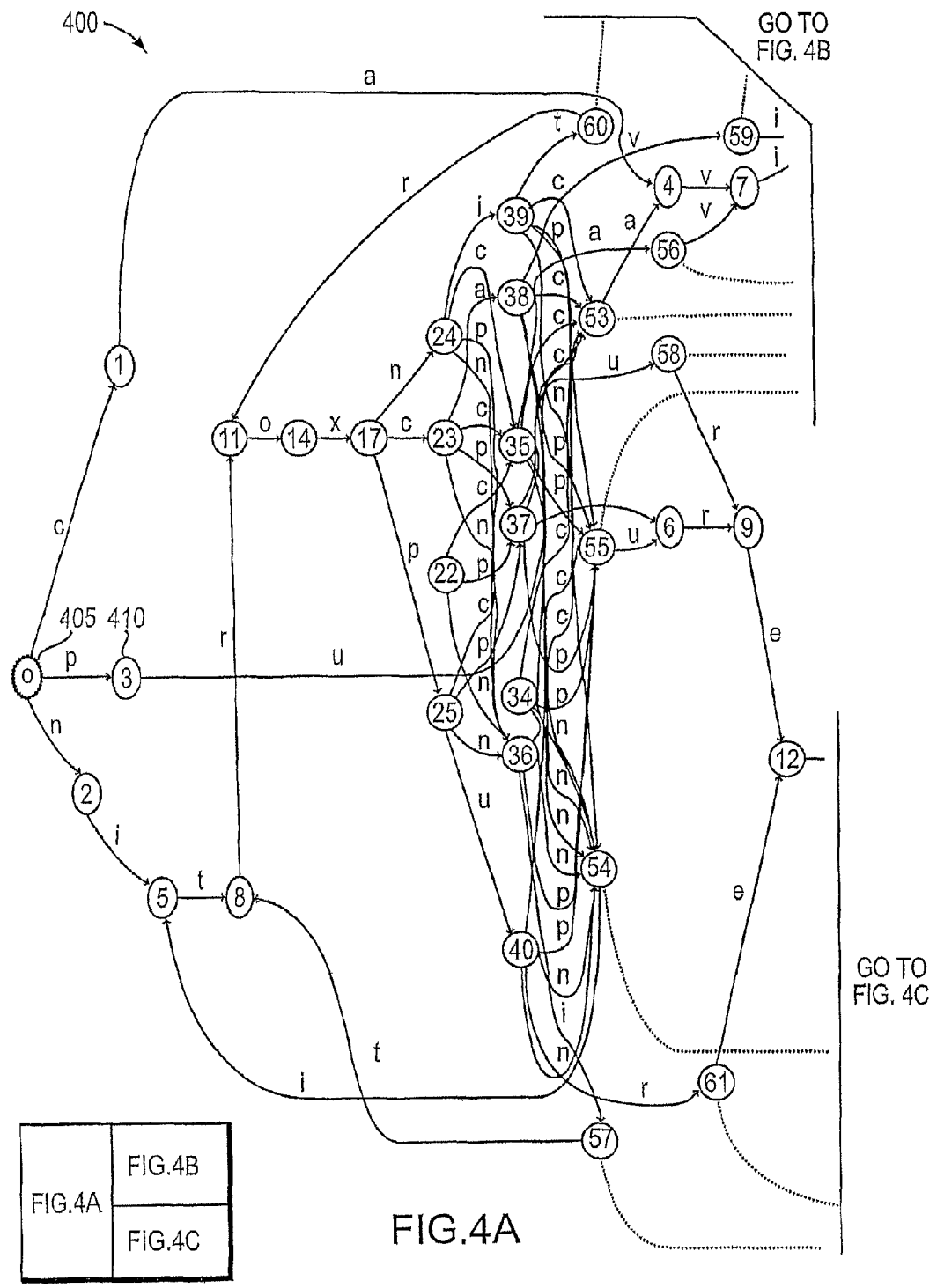
FIG. 4A-C is a DFA graph of an example DFA. It should be noted that for all DFA graphs shown in the figures, for brevity sake, arcs (state transitions) to node (state) 0 are not shown and arcs that point to the same node as pointed to by node 0 for the same character are also not shown.
Figure 4B:
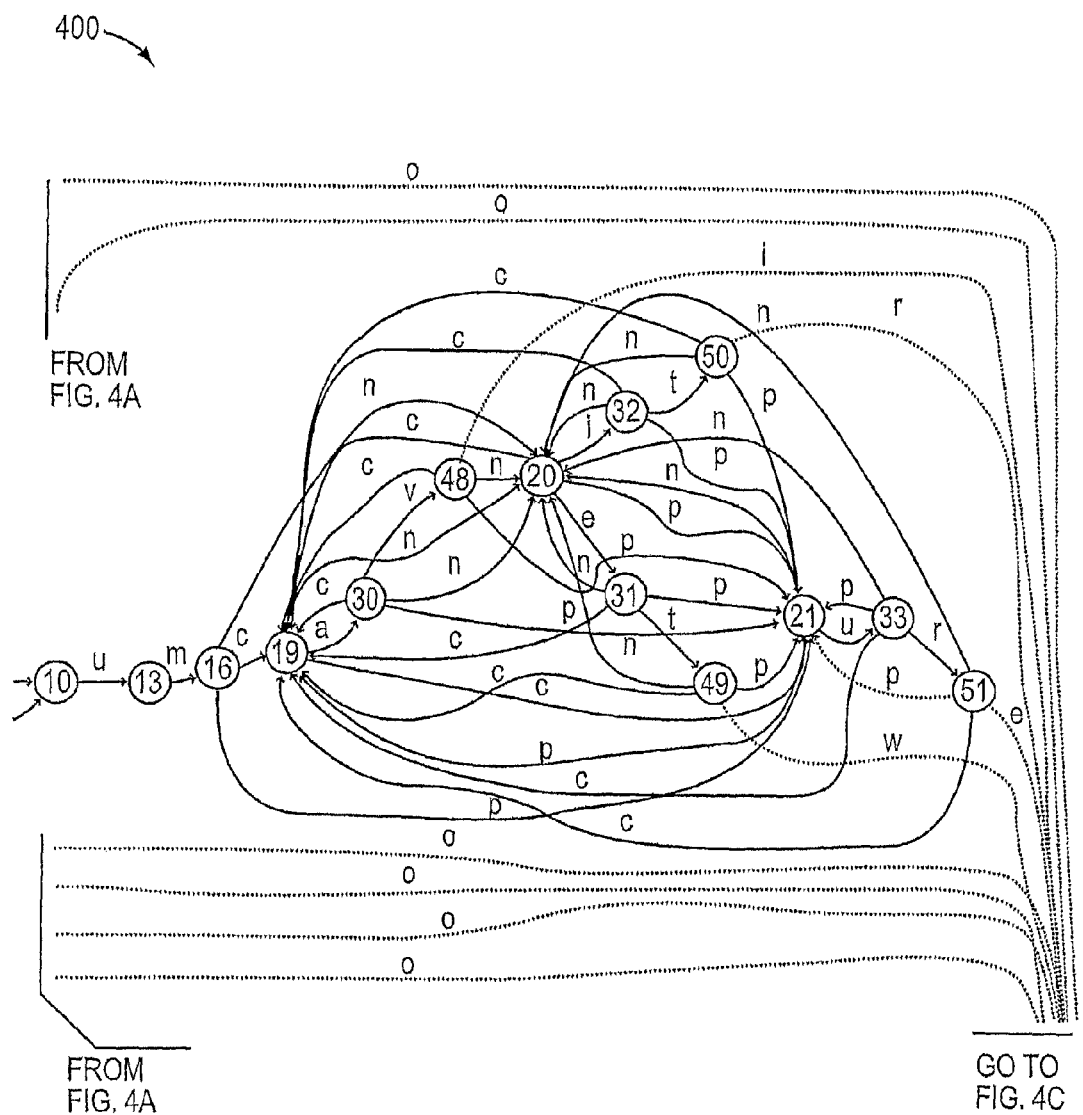
Figure 4C:
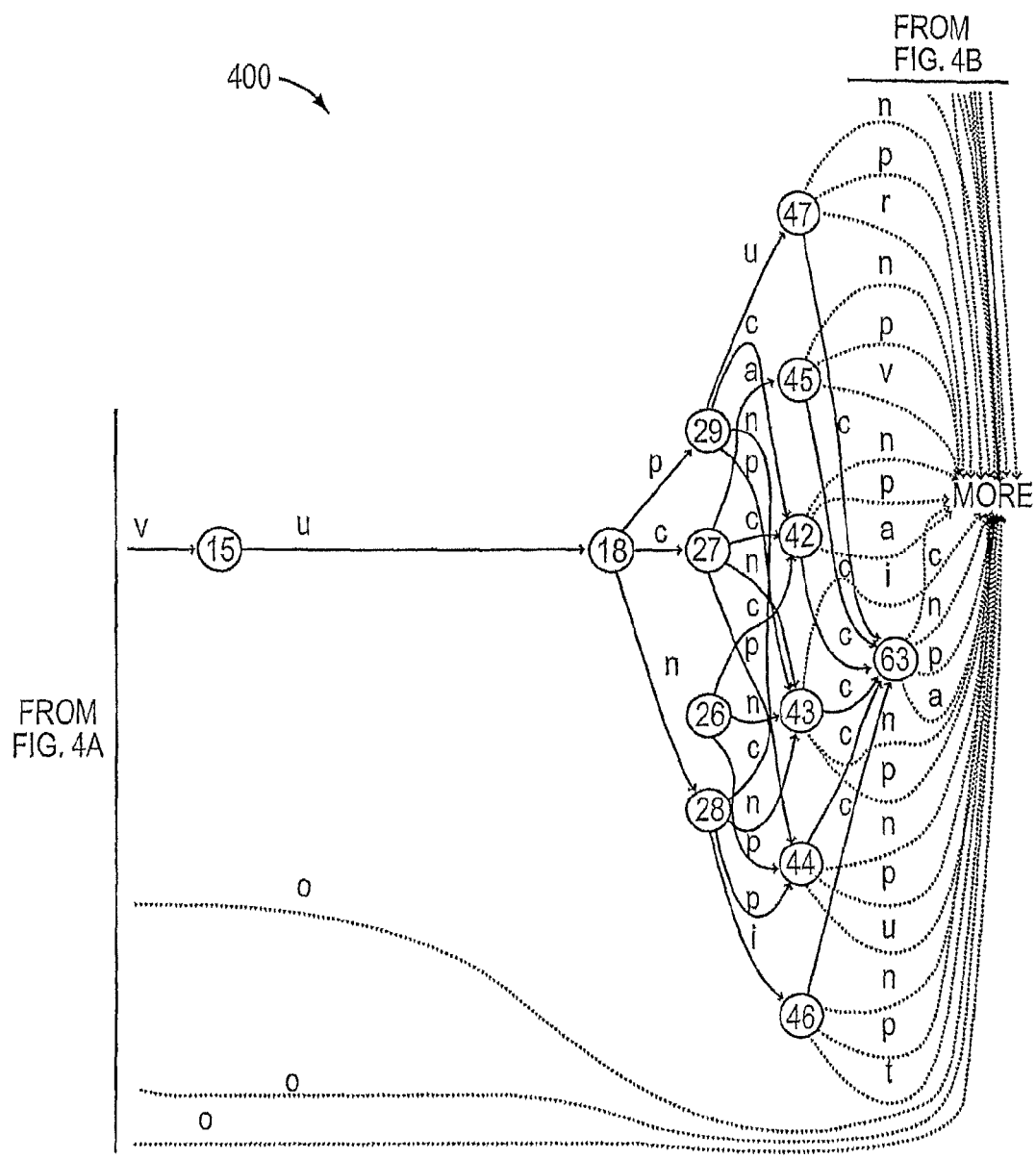

The DFA and NFA characteristics mentioned above are discussed further in reference to FIGS. 3, 4, and 5A-G. FIG. 3 shows a NFA graph 300 of an example NFA for searching for patterns "cavium.*networks," "nitrox[^\r\n\t\v\s]{3}octeon," and "purevu.{5,10}videochips." FIG. 4 shows a DFA graph 400 of an example DFA for searching for the same set of patterns. It should be noted that the DFA graph 400 and other DFA graphs provided herein are "simplified" for drawing purposes. Arcs to node 0, representing state transitions to DFA state 0, are not shown in the figures. Arcs pointing to the same node as pointed to by node 0 for the same character are also not shown in the figures.

For the same set of patterns, the NFA graph 300 of FIG. 3 has 69 nodes, representing 69 states, while the DFA graph 400 of FIG. 4 has 931 nodes (only a portion of which is shown in FIG. 4), representing 931 states. As shown, for a given pattern or patterns, a number of DFA states may be larger than a number of NFA states, typically on the order of several hundred or thousand more states. This is an example of "graph explosion," which is a hallmark characteristic of DFA.

Figure 5A:
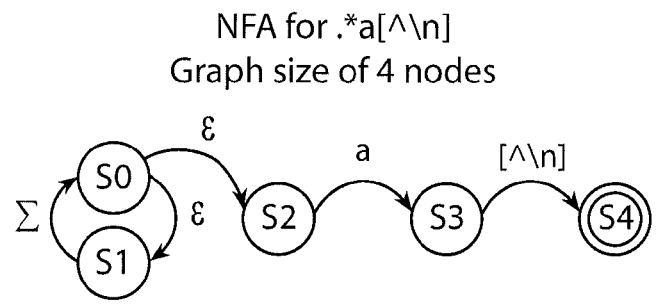
Figure 5B:
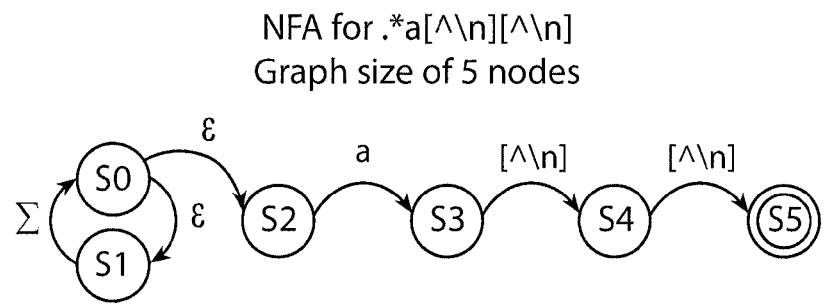
Figure 5C:
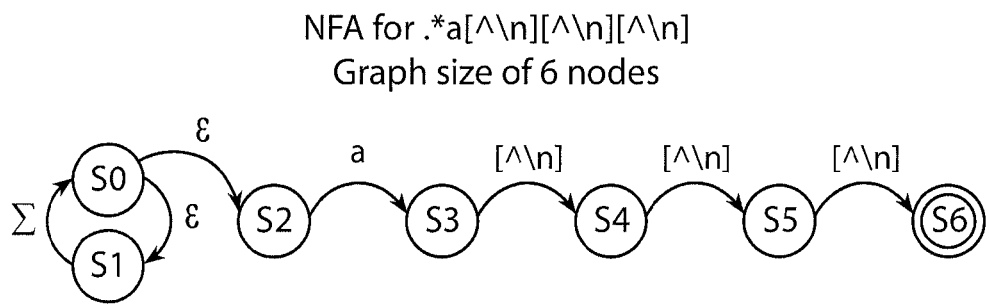
Figure 5D:
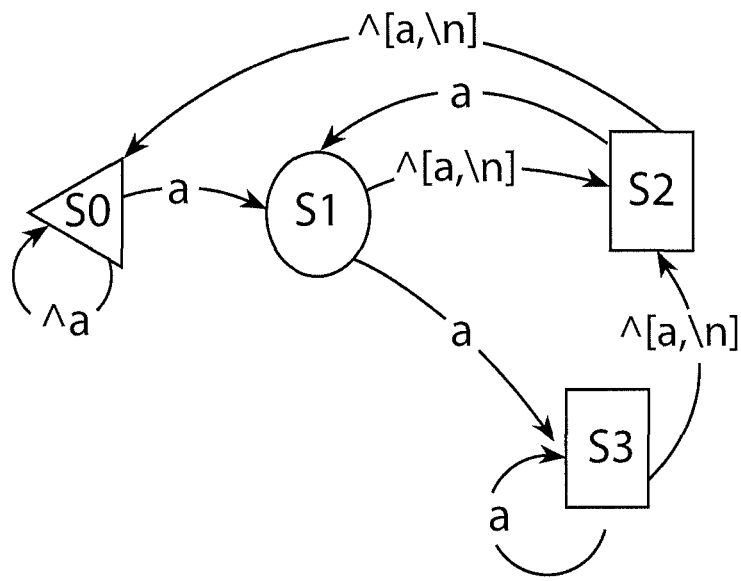
Figure 5E:
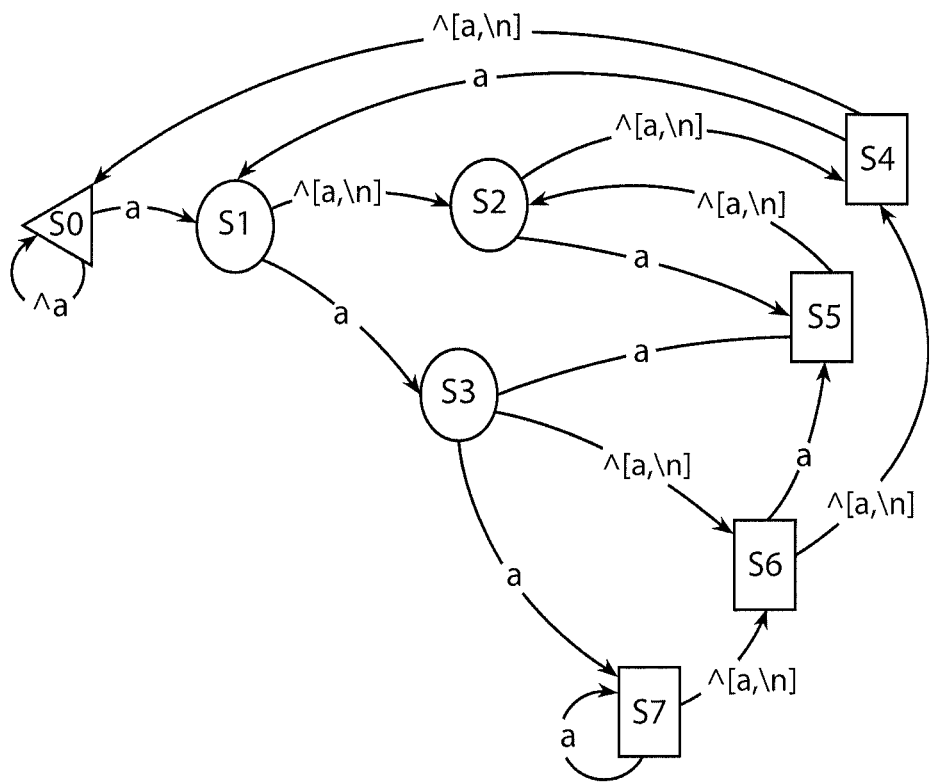
Figure 5F:
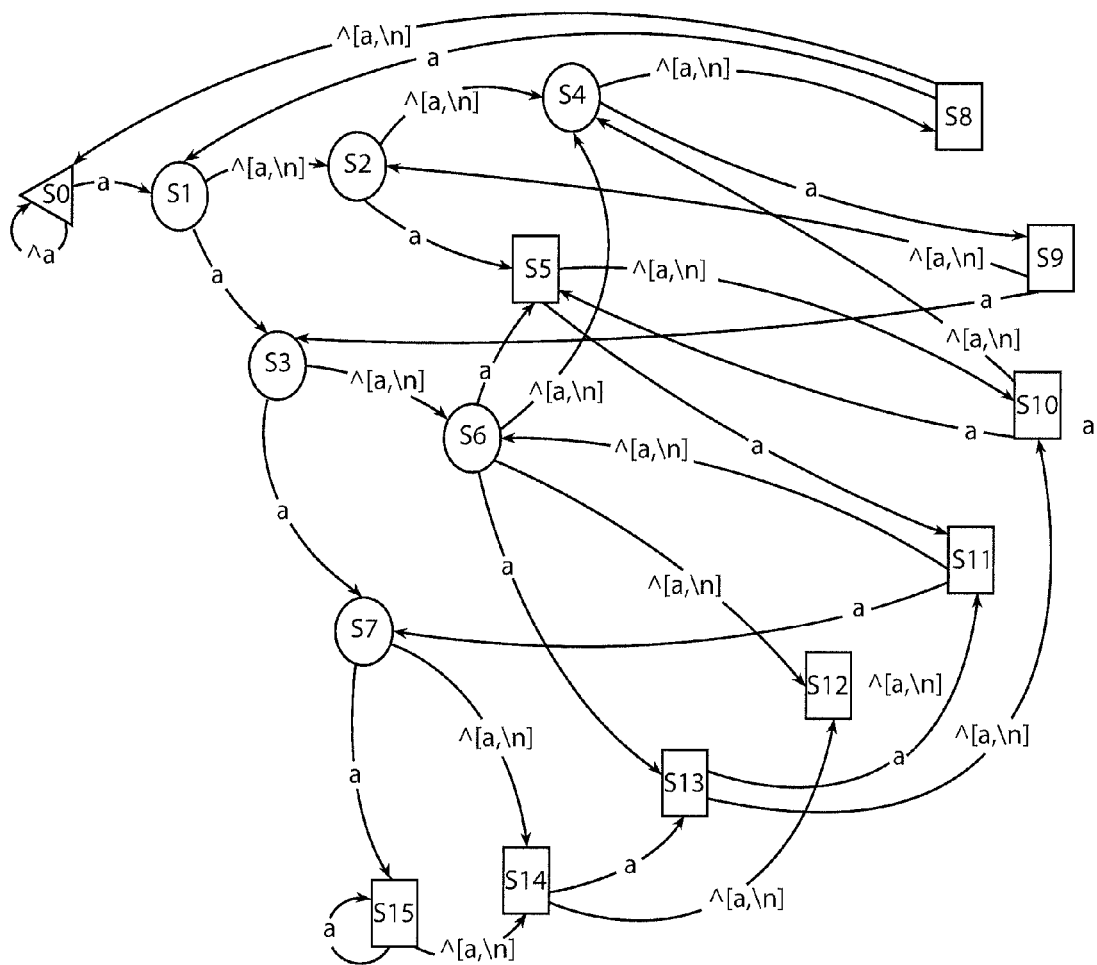

To further describe the concept of "graph explosion," consider FIGS. 5A, 5B, and 5C showing NFA graphs for patterns ".*a[^\n]," ".*a[^\n][^\n]," ".*a[^\n][^\n][^\n]," respectively, and FIGS. 5D, 5E, and 5F showing DFA graphs for the same patterns. As shown in FIGS. 5A-5F and summarized by the table of FIG. 5G, for some patterns, NFA can grow linearly while DFA can grow exponentially resulting in a graph explosion.

Returning to FIG. 3, using the NFA represented by the NFA graph 300 to search for the patterns in input stream "purevuchips are video chips," NFA processing or matching begins at NFA start-states 0, 2, 19, and 36, represented by nodes 305a-d and written in shorthand as, NFA START STATES={0, 2, 19, 36}. On character 'p' of the input stream, the NFA transitions to state 37 (represented by node 310) and tracks states 0, 2, and 19 (written in shorthand as on 'p'={0, 2, 19, 37}) and continues as follows:

on 'u'={0, 2, 19, 38}
on 'r'={0, 2, 19, 39}
on 'e'={0, 2, 19, 40}
on V={0, 2, 19, 41}
on 'u'={0, 2, 19, 42}
on 'c'={0, 2, 19, 44}
on 'h'={0, 2, 19, 45}
. . .
. . . etc.

Using the DFA represented by the DFA graph 400 of FIG. 4 to search for the same patterns in the same input, the DFA matching begins at DFA start-state 0 represented by node 405 and written in shorthand as DFA START STATE={0}. On character 'p' of the input stream, the DFA transitions to state 3, represented by node 410 and written in shorthand as on 'p'={3} and continues as follows:

on 'u'={6}
on 'r'={9}
on 'e'={12}
on 'v'={15}
on 'u'={18}
on 'c'={27}
on 'h'={41}
. . .
. . . etc.

As shown in the example above, in NFA, there are at least n+1 number of NFA states to track, where n is the number of patterns to search (e.g., with 3 patterns to search for there are at least 4 states to track). Also, it is possible that a single NFA state during transition on a single input alphabet may lead to multiple states, all of which need to be followed up. In contrast, in DFA, there is only one state to track per input character.

Now assume for illustration purposes that the input stream or flow "purevuchips are video chips," spans several packets with a first packet ending with "h" of "purevuchips" and a second packet starting with "i" of "purevuchips." In NFA, a search stops on "h" (end of the first packet) with four states to track (viz., states 0, 2, 19, and 45). To resume the search on "i"

(start of the second packet) requires remembering these four states. In contrast, in DFA, a search stops on "h" (end of the first packet) with one state being tracked (viz., state 41). To resume the search on "i" (start of the second packet) requires remembering this one state. This example shows that in NFA, the per flow context required to support matching across multiple packets is four states (e.g., by storing four state pointers), while in DFA, the per flow context is one state. Therefore, NFA requires a per flow context larger than the per flow context required for a DFA of the same patterns. Likewise, DFA requires a per flow context smaller than the per flow context required for a NFA of the same patterns.

Having described the example security application in which example embodiments of the present invention may be implemented and the typical processing using DFA and NFA, example embodiments of the present invention are described in detail immediately below.

Herein, example embodiments of the present invention are collectively referred to as "Cavium Regex Processing Automaton" or "CARPA." There are two parts to the CARPA solution or approach.

Part one of the CARPA solution is run time processing (herein, referred to as "CARPA run time processing"). Run time processing refers to the act of looking for the existence of or matching a pattern in an input, such as the payload portion of an Internet Protocol (IP) datagram, or an input stream. In one embodiment, a run time processor (or a corresponding run time processor implemented in hardware, such as the CARPA co-processor 244 of FIG. 2.) performs CARPA run time processing. Part two of the CARPA solution is a compiler (herein, referred to as the "CARPA compiler") that compiles a pattern or an input list of patterns (also known as signatures or rules) into binary data structures, such as graphs and tables. CARPA run time processing will now be described in greater detail. A detailed description of the CARPA compiler will then follow.

The CARPA solution implements CARPA run time processing in two stages. Stage one of CARPA run time processing is implemented as DFA (herein, referred to simply as "Stage One" or "DFA Stage") and stage two of CARPA run time processing is implemented as NFA (herein, referred to simply as "Stage Two" or "NFA Stage"). The CARPA solution uses a CARPA-DFA, CARPA-NFA, and mappings between some DFA states to some NFA states to implement CARPA run time processing. The CARPA-DFA, CARPA-NFA, and mappings are created by the CARPA compiler (described later in greater detail).

To describe CARPA run time processing in more detail, as well as to highlight several distinctive features, consider an example of searching for patterns "cavium.*networks," "nitrox[^\r\n\t\v\s]{3}octeon," and "purevu.{5,10}videochips" in an input stream "purevuchips are video chips."

Figure 6A:
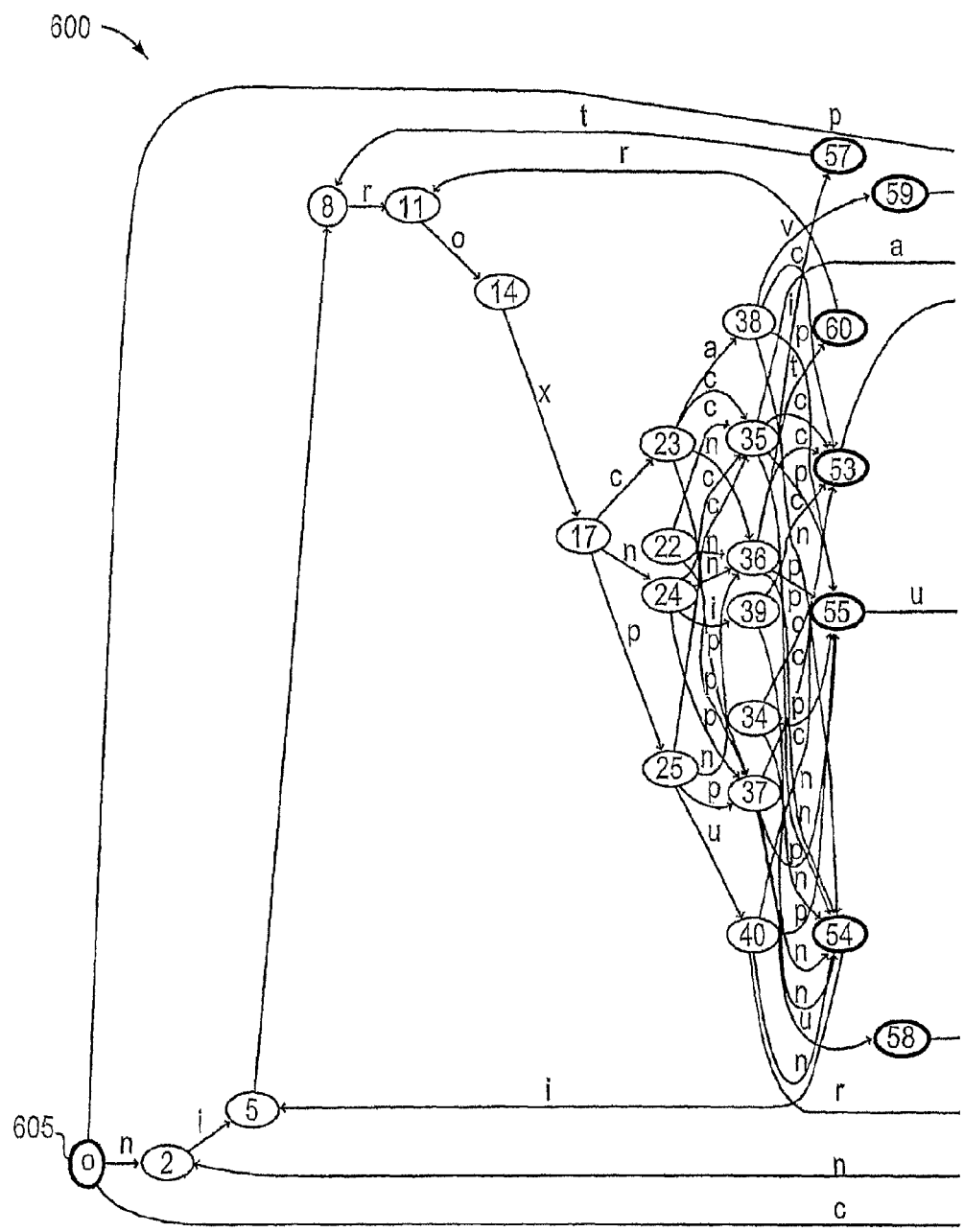
FIGS. 6A and 6B are graphs of an example CARPA-DFA and corresponding CARPA-NFA, respectively.

FIG. 6A shows a DFA graph 600 of an example CARPA-DFA for patterns "cavium.*networks," "nitrox[^\r\n\t\v\s]{3}octeon," and "purevu.{5,10}videochips." In the DFA graph 600, node 605 represents a stage one start-state and marks the beginning of Stage One of CARPA run time processing. In the DFA graph 600, several nodes, for example, nodes 610a-f represent stage one end-states and mark the end of Stage One of CARPA run time processing for some portion of the patterns.

Stage One of CARPA run time processing begins at DFA state 0 (represented as the node 605) written in shorthand as CARPA-DFA START STATE={0}. On character 'p' of the input stream, the CARPA-DFA transitions to state 3 (written in shorthand as on 'p'={3}) and continues as follows:
on 'u'={6}
on 'r'={9}
on 'e'={12}
on 'v'={15}
on V={18}
on 'c'={27}.

On character 'h' of the input stream, the CARPA-DFA transitions to state 41 (represented as the node 610a) which is one of the stage one end-states.

The CARPA solution ends Stage One of CARPA run time processing and continues onto Stage Two at one or more states of a CARPA-NFA, called stage two start-states, according to a mapping. The mapping associates stage one end-states with stage two start-states and is described below in greater detail in the context of the CARPA compiler.

Figure 6B:
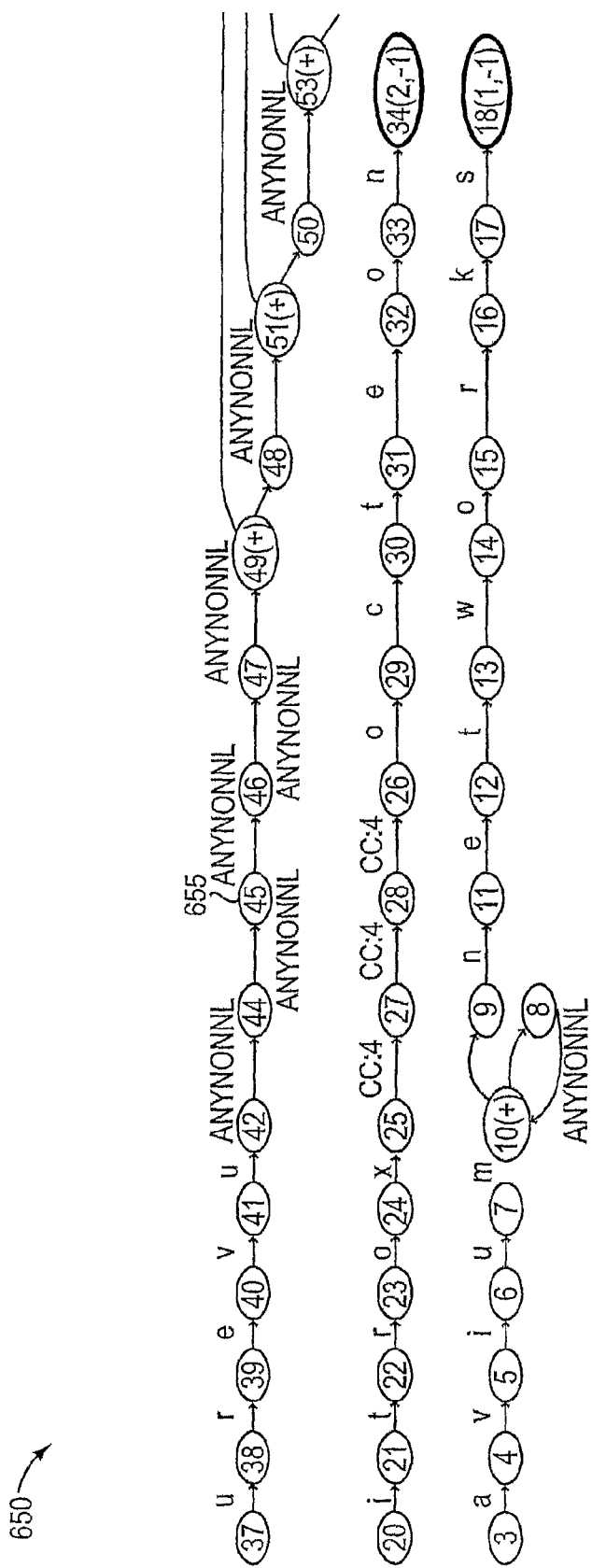
Figure 6B:
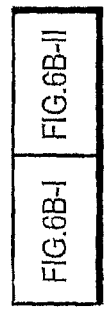

Continuing with a description of the Stage Two of CARPA run time processing, FIG. 6B shows a NFA graph 650 of an example CARPA-NFA for the patterns "cavium.*networks," "nitrox[^\r\n\t\v\s]{3}octeon," and "purevu.{5,10}videochips." In this example, stage one end-state 41 is mapped to stage two start-state 45 represented in the NFA graph 650 as node 655. Stage Two starts at the stage two start-state 45, written in shorthand as CARPA-NFA START STATES={45}. Stage Two proceeds as follows:
on 'i'={46}
on 'p'={47}
on 's'={43, 48}
. . .
. . . etc.

The CARPA-NFA includes, at least, stage two start-states (e.g., node 655) from which to continue CARPA run time processing in Stage Two and NFA states to process in Stage Two. As such, in a convenient embodiment, the CARPA-NFA may include fewer NFA states (as shown in FIG. 6B) than a typical, non-CARPA NFA for the same pattern set (compare, for example, FIG. 3, NFA graph 300 of a typical NFA for the same patterns above). In other words, it may be said that the CARPA-NFA is a truncated NFA.

In FIG. 6B, NFA states already converted into DFA states of the CARPA-DFA (as described above) are not shown in the NFA graph 650. These NFA states are not stored to save the memory footprint of the CARPA-NFA. Only states relevant or required for a CARPA-NFA walk (i.e., Stage Two of CARPA run time processing) are stored in memory.

Returning to FIG. 6A, Stage One continues with the next character 'i' and the CARPA-DFA transitions to state 62 (represented as node 615), and so on.

In the example provided above in reference to FIGS. 6A and 6B, one of the patterns is found in the input i.e., there is a pattern match. Now consider an example in which there is no pattern match. For example, none of the following patterns "cavium.*networks," "nitrox[^\r\n\t\v\s]{3}octeon," and "purevu.{5,10}videochips" appear in an input stream "surevuchips are video chips."

Referring again to the DFA graph 600 of FIG. 6A, in this example, Stage One of CARPA run time processing begins at DFA state 0. On character 's' of the input stream, the CARPA-DFA transitions back (through a backward arc, not shown) to state 0. On successive characters of the input stream until the end of the input, the CARPA-DFA transitions back (through other backward arcs, not shown) to state 0 indicating no match found. As such, for input that does not match, even partially, CARPA run time processing remains in Stage One, i.e., the DFA stage, and run time performance is deterministic.

In another example in which there is a partial match (e.g., "purgechips are video chips"), several characters are matched in the DFA Stage only and thus, run time performance is deterministic.

NFA and DFA are typically used to detect intrusions or viruses by looking for (or matching) attack patterns or signatures in traffic. The vast majority of traffic, however, does not include such patterns or signatures and is aptly named "clear traffic." As such, the CARPA solution processing predominately clear traffic (i.e., no match is present) mainly operates in Stage One and run time performance is predominately deterministic. It may be said that the foregoing example is a "design case" of the CARPA solution.

With the CARPA solution, for a given pattern or set of patterns, a number of DFA states in a CARPA-DFA is less than a number of DFA states found in a typical, non-CARPA, DFA. For example, in FIG. 6A, the CARPA-DFA graph 600 represents a CARPA-DFA for a set of patterns with 64 DFA states. In comparison, in FIG. 4, a DFA graph 400 represents a typical DFA for the same set of patterns with 931 DFA states (only a portion of which are represented in FIG. 4). Therefore, the CARPA solution addresses a typical DFA characteristic of requiring a large number of DFA states to represent patterns with a relatively small number of states.

Additionally, with the CARPA solution, the number of NFA states tracked in Stage 2 processing per input character or symbol is less than the number of NFA states tracked without the CARPA solution. For example, in reference to FIG. 3, by starting Stage Two of CARPA run time processing at the stage two start-state 45 (as described above) on character 'i' of the input stream, there is one state to track viz., NFA state 46.

In contrast, given the same input, by starting at NFA states {0, 2, 19, 37}, as is done in non-CARPA run time processing, on character 'i' of the input stream, there are four states to track viz., NFA states 0, 2, 19, 46. Therefore, the CARPA solution addresses a typical NFA characteristic of requiring a large per flow context and limits the non-deterministic nature of a "pure" NFA performance.

Described above in reference to FIGS. 6A and 6B is a depth-first approach to CARPA run time processing, i.e., run time processing goes from Stage One to Stage Two and returns back to Stage One, and so on.

In a breadth-first approach to CARPA run time processing, Stage One continues until all stage one end-states that can be reached with a given input are reached. Stage Two then starts at stage two start-states mapped from the stage one end-states reached in Stage One. In a convenient embodiment, a breadth-first approach to CARPA run time processing is done with several passes of input. In a first pass of the input, finish Stage One of CARPA run time processing and note all stage one end-states reached along with corresponding offsets in the input. In a second pass (or passes) of the input, continue CARPA run time processing in Stage 2 at stage two start-states mapped to the stage one end-states noted in the first pass and start processing the input stream at the offsets noted in the first pass. The stage one end-states and offsets are reported from Stage One to Stage Two. Stage Two can be implemented in a couple of ways characterized by a number of times input is scanned or otherwise processed. These ways are described in greater detail immediately below.

Figure 7A:
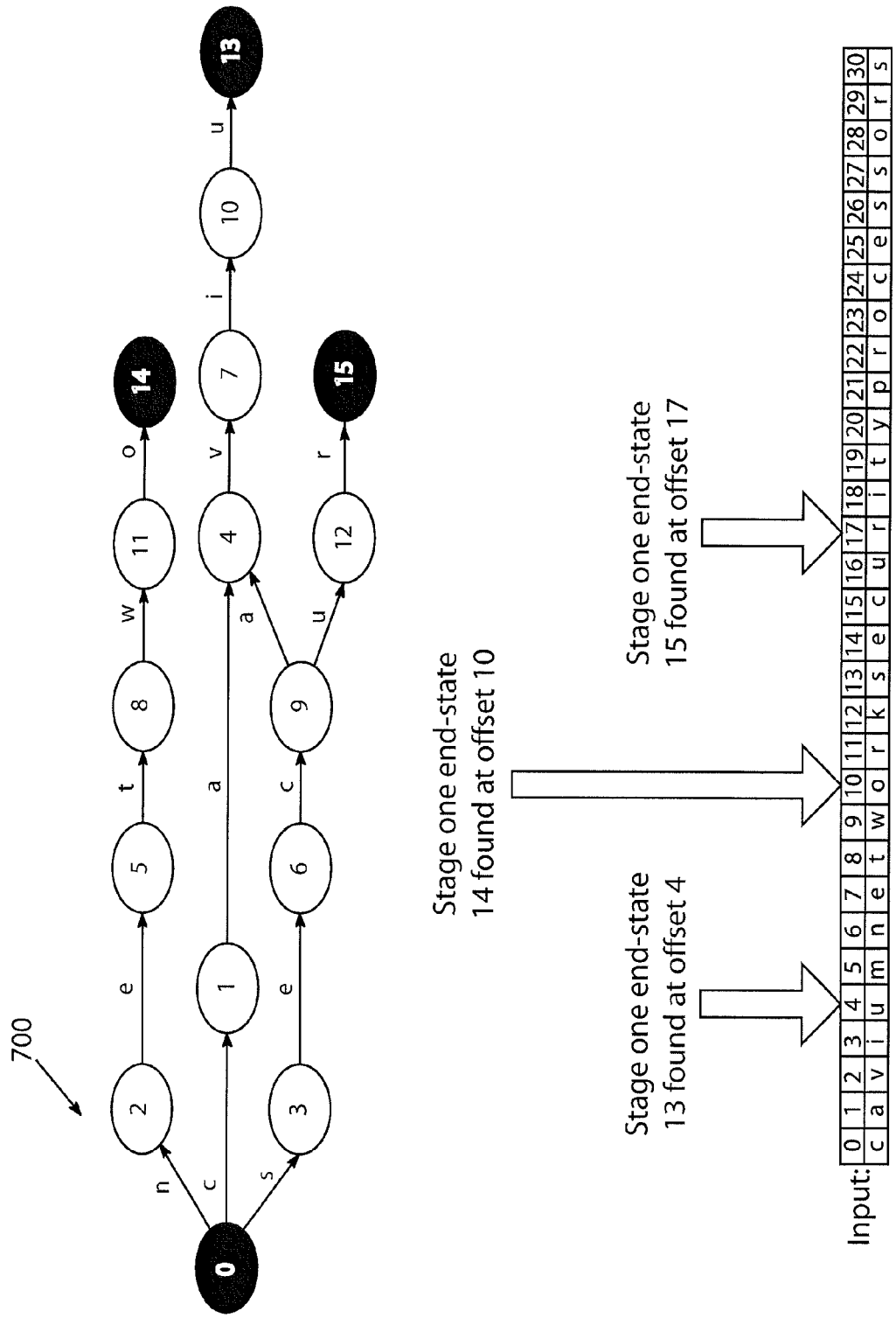
FIGS. 7A-D are graphs of an example CARPA-DFA and corresponding CARPA-NFA.
Figure 7B:
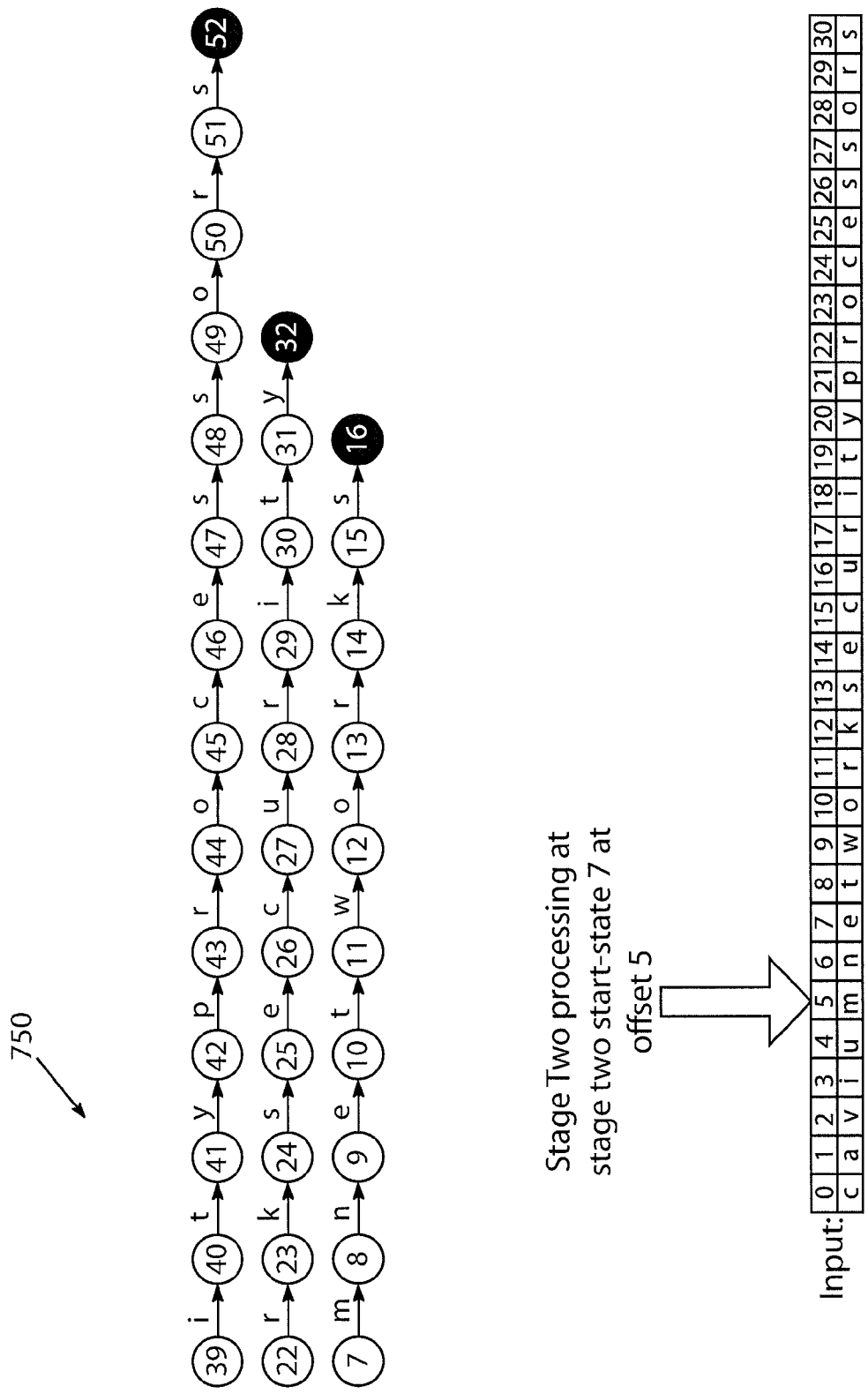
Figure 7C:
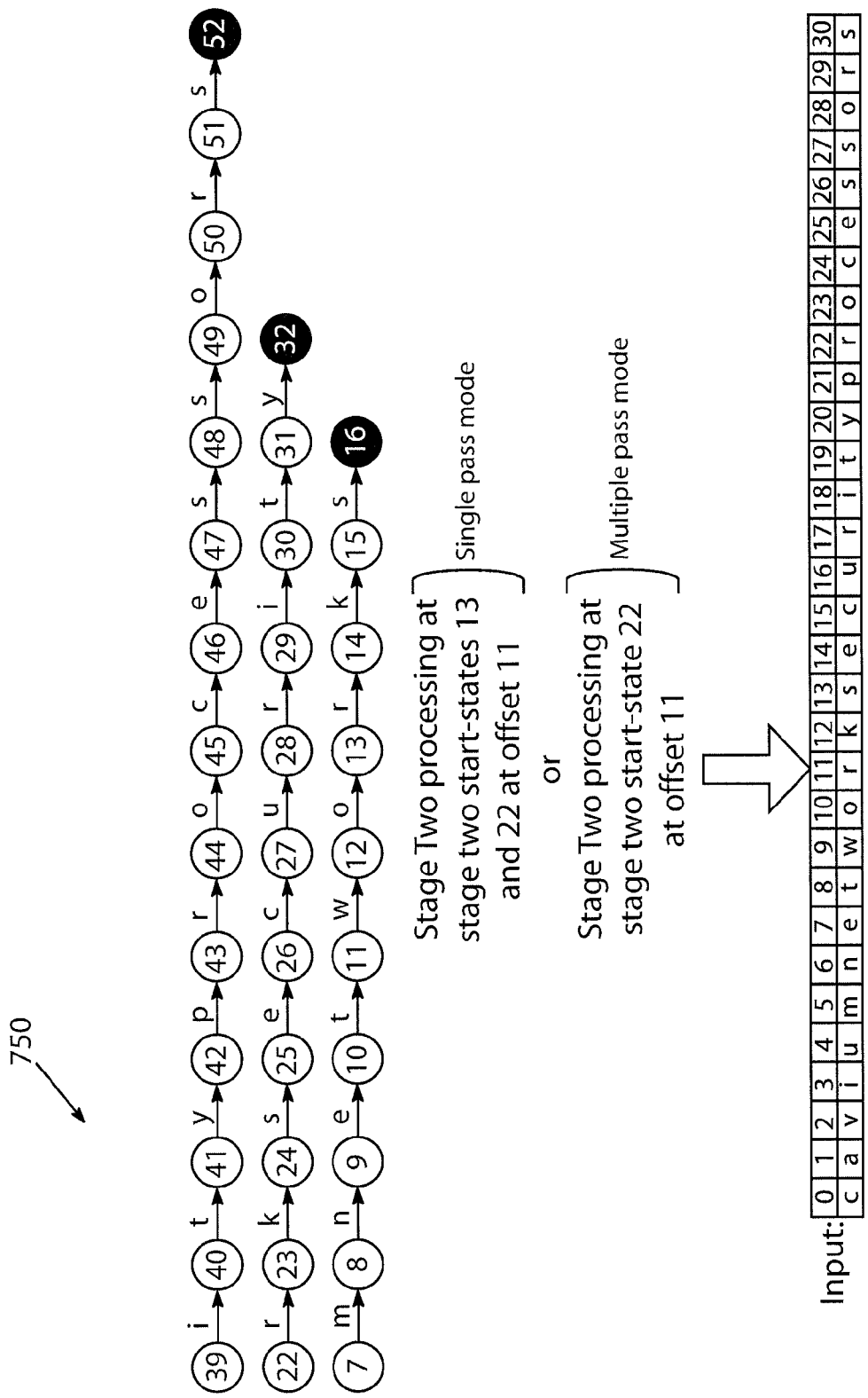
Figure 7D:
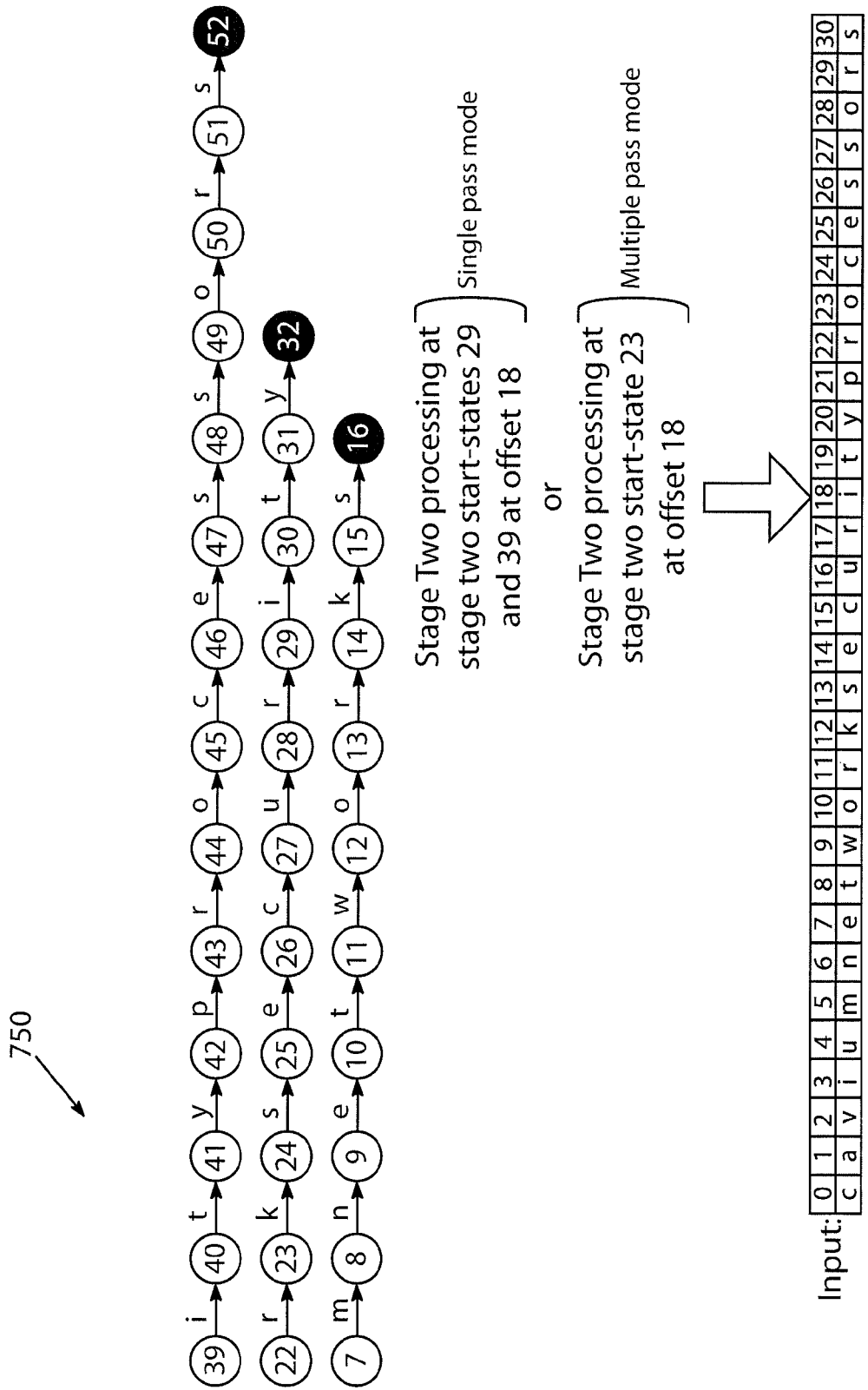

FIG. 7A shows a DFA graph 700 of an example DFA for searching for patterns "caviumnetworks," "networksecurity," and "securityprocessors." FIGS. 7B-D show a NFA graph 750 of an example CARPA-NFA for searching for the patterns. In the DFA graph 700 and NFA graph 750, DFA and NFA states are represented by enumerated nodes, for example, in the DFA graph 700, node 0 represents DFA state 0. In the description, the terms "state" and "node" are used interchangeably. In describing embodiments in reference to FIGS. 7A-D, for ease of readability the state/node numbers also serve as reference numbers.

Table 1 below is a transition table mapping each stage one end-state of the CARPA-DFA of FIG. 7A to one or more stage two start-states of the CARPA-NFA of FIG. 7B. When Stage One of CARPA run time processing reaches a stage one end-state (e.g., DFA state 13), CARPA run time processing continues onto Stage Two starting at a corresponding stage two start-state or states (e.g., NFA state 7) according to the mapping.

TABLE 1

A transition table mapping each stage one end-state of the CARPA-DFA of FIG. 7A to one or more stage two start-states:

| stage one end-states | stage two start-states |
|---|---|
| {13} | {7} |
| {14} | {22} |
| {15} | {39} |

For input "caviumnetworksecurityprocessors," the CARPA solution using the CARPA-DFA of FIG. 7A finds the following matches:
stage one end-state 13 found at offset 4 in the input;
stage one end-state 14 found at offset 10 in the input; and
stage one end-state 15 found at offset 17 in the input, The above results from Stage One are then passed to Stage Two for continued processing. FIGS. 7B-D, together with the description below, show the progress of Stage Two processing of the Stage One results.

A "single pass mode" implementation of Stage Two is described first. At a high level, in Stage Two processing (single pass mode), each Stage One result is processed until the next Stage One result or end of input.

In FIG. 7B, for the Stage One result "stage one end-state 13 found at offset 4" and using the transition table mapping stage one end-state 13 to stage two start-state 7, Stage Two processing (single pass mode) starts at start-state 7 at offset 5 of the input (written in shorthand as START STATE={7}) and continues as follows:
on 'm'={8}
on 'n'={9}
on 'e'={10}
on 't'={11}
on 'w'={12}
on 'o'={13}

At offset 10 in the input, Stage Two processing (single pass mode) reaches the next Stage One result "stage one end-state 14 found at offset 10." Using the transition table stage one end-state 14 maps to stage two start-state 22.

In FIG. 7C, Stage Two processing continues at stage two start-state 22 at offset 11 in the input. NFA state 22 is added to the current running set {13} (written in shorthand as NEW RUNNING SET ={13, 22}) and Stage Two processing (single pass mode) continues as follows:
on 'r'={14, 23}
on 'k'={15, 24}
on 's'={16, 25}

Representing NFA state 16, node 16 is a marked node of the pattern "caviumnetworks" and hence a pattern match is reported and NFA state is dropped from the RUNNING SET (or a corresponding NFA thread dies) and Stage Two processing continues (single pass mode) as follows:

on 'e'={26}
on 'c'={27}
on 'u'={28}
on 'r'={29}

At offset 17 in the input, Stage Two processing (single pass mode) reaches the next Stage One result "stage one end-state 15 found at offset 17." Using the transition table stage one end-state 15 maps to stage two start-state 39.

In FIG. 7D, Stage Two processing continues at start-state 39 at offset 18 in the input. NFA state 39 is added to the current running set {29} (written in shorthand as RUNNING SET={29, 39}) and Stage Two processing (single pass mode) continues as follows:
on 'i'={30, 40}
on 't'={31, 41}
on 'y'={32, 42}

Representing NFA state 32, node 32 is a marked node of the pattern "networksecurity" and hence a pattern match is reported and NFA state 32 is dropped from the RUNNING SET (or a corresponding NFA thread dies) and Stage Two processing continues (single pass mode) as follows until the end of the input because there are no more Stage One results:
on 'p'={43}
...
on 's'={52}

Representing NFA state 52, node 52 is a marked node of the pattern "securityprocessors" and hence a pattern match is reported. This completes Stage Two processing (single pass mode).

Having described the "single pass mode" implementation of Stage Two above, a "multiple pass mode" implementation of Stage Two is described below in reference to FIGS. 7B-D. At a high level, in Stage Two processing (multiple pass mode), each Stage One result is processed separately until the end of input or until a current RUNNING SET is empty.

In FIG. 7B, for the Stage One result "stage one end-state 13 found at offset 4" and using the transition table mapping stage one end-state 13 to stage two start-state 7, Stage Two processing starts at start-state 7 at offset 5 of the input (written in shorthand as START STATE={7}) and continues as follows until the end of the input:
on 'm'={8}
on 'n'={9}
on 'e'={10}
on 't'={11}
on 'w'={12}
on 'o'={13}
on 'r'={14}
on 'k'={15}
on 's'={16}

Representing NFA state 16, node 16 is a marked node of the pattern "caviumnetworks" and hence a pattern match is reported. As the current running set is empty, Stage Two is done with the Stage One result "stage one end-state 13 found at offset 4."

In FIG. 7C, Stage Two processing (multiple pass mode) starts with the next Stage One result "stage one end-state 14 found at offset 10." Using the transition table mapping stage one end-state 14 to stage two start-state 22, Stage Two processing begins at start-state 22 at offset 11 in the input (written in shorthand as START STATE={22}) and Stage Two processing (multiple pass mode) continues as follows until the end of the input:
on 'r'={23}
on 'k'={24}
on 's'={25}
on 'e'={26}
on 'c'={27}
on 'u'={28}
on 'r'={29}
on 'i'={30}
on 't'={31}
on 'y'={32}

Representing NFA state 32, node 32 is a marked node of the pattern "networksecurity" and hence a pattern match is reported. As the current running set is empty, Stage Two is done with the next Stage One result "stage one end-state 14 found at offset 10."

In FIG. 7D, Stage Two processing (multiple pass mode) starts with the next Stage One result "stage one end-state 15 found at offset 17." Using the transition table mapping stage one end-state 15 to stage two start-state 39, Stage Two processing begins at start-state 39 at offset 18 in the input (written in shorthand as START STATE={39}) and Stage Two processing (multiple pass mode) continues as follows until the end of the input:
on 'i'={40}
on 't'={41}
on 's'={52}

Representing NFA state 52, node 52 is a marked node of the pattern "securityprocessors" and hence a pattern match is reported. The current running set is empty and there are no more Stage One results to process. This completes Stage Two processing (multiple pass mode).

Having described the single pass mode and multiple pass mode implementations of Stage Two, the differences between the modes include:

1) In single pass mode, input (e.g., a packet) is traversed only once. That is an advantage to this approach. But with single pass mode, only one hardware thread (or engine) of Stage Two can be deployed to process the input. Hence, single flow (of packets) processing speed is limited by throughput of a single thread. Another side effect is that the amount of states required for processing input can be large. The example described above shows a two fold difference between the sizes of a running set in single pass mode and multiple pass mode. For example, to process the Stage One result "stage one end-state 15 found at offset 17," in single pass mode, the running set is {29, 39} while in multiple pass mode, the running set is {39}.

2) In multiple pass mode, the same input is traversed N times. Where N is a number of Stage One results. An advantage is that up to N (or some fraction of N) different Stage Two threads or engines can be deployed in parallel to process each Stage One result in parallel. This increases single flow performance, in particular, single packet processing time (or latency involved with such processing) is reduced by 1/N as multiple threads are working on an amount of work represented by the N number of Stage One results.

Another advantage of multiple pass mode is that a running set size remains small. The same running set space can be reused while processing different result entries if single thread is used to process input. In contrast, in single pass mode, the running set needs to track NFA states corresponding to each Stage One result simultaneously.

In practice, Stage One of CARPA run time processing may be carried out by a stage one engine (or thread) and Stage Two of CARPA run time processing may be carried out by a stage two engine (or thread). The stage one engine and stage two engines may be, for example, special-purpose processors.

Figure 8:
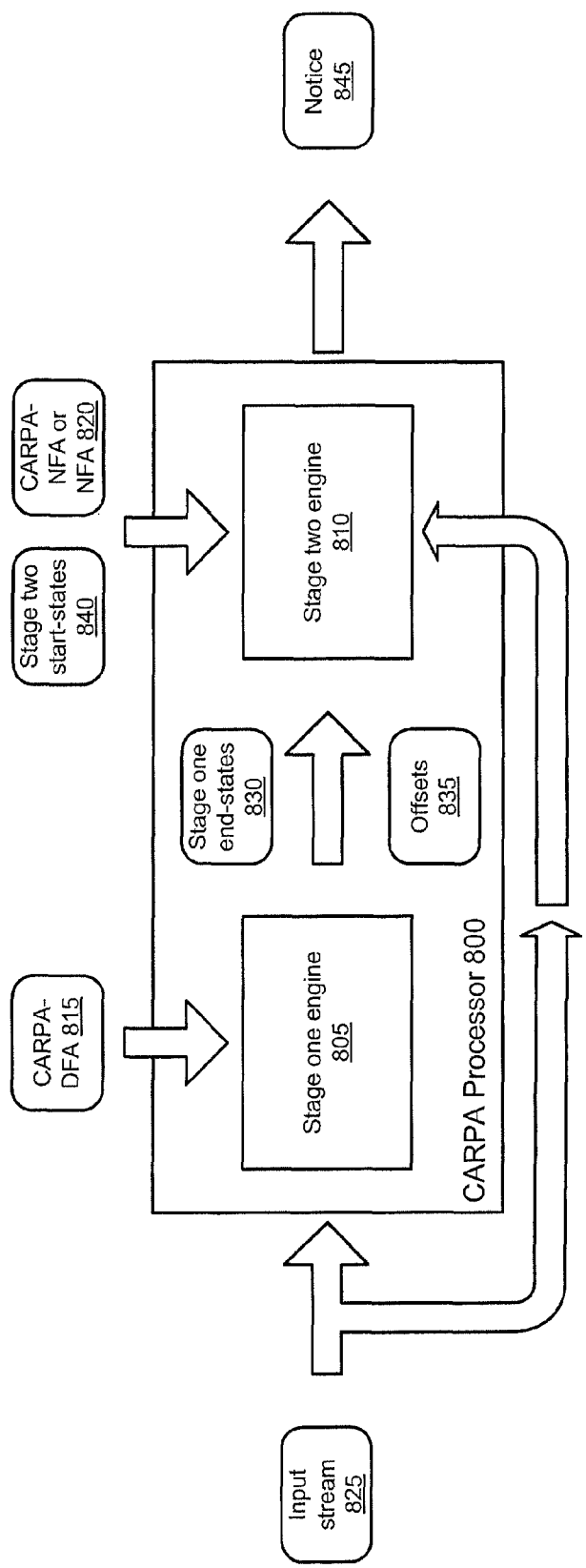
FIG. 8 is a block diagram of example CARPA processor, in accordance with an embodiment of the present invention.

FIG. 8 shows a CARPA processor 800 (e.g., the CARPA co-processor 244 of FIG. 2) with a stage one engine 805 carrying out Stage One of CARPA run time processing and a stage two engine 810 carrying out Stage Two of CARPA run time processing, as described above. The stage one engine 805 may be programmed or provided with a CARPA-DFA 815 defining a pattern or patterns to look for in an input stream. The stage two engine 810 may be programmed or provided with a CARPA-NFA or NFA 820 defining a pattern or patterns to look for in an input stream. All or part of the CARPA-DFA 815 and CARPA-NFA (or NFA) 820 may be stored in external memory (e.g., the DDR SDRAM 118 of FIG. 2), on-chip memory, or stored in a combination of on-chip and external memory.

The input to the stage one engine 805 is an input stream 825. The output of the stage one engine 805 includes all stage one end-states 830 reached while processing the input stream 825 and offsets 835 identifying where in the input stream 825 did input characters occur that caused transition changes to the stage one end-states 830. In one embodiment, the stage one engine 805 outputs the stage one end-states 830 and offsets 835 in an array (not shown). The array includes N entries of "one end-state, offset" at the end of Stage One processing for a particular input, depending on how many partial matches happened and need to be processed in Stage Two.

The input to the stage two engine 810 is the output of the stage one engine 805 (stage one end-states 830 and offsets 835). The stage two engine 810 references a table (not shown) mapping the stage one end-states 830 to stage two start-states 840. Such table may be stored in external memory, such as the DDR SDRAM 118 of FIG. 2, on-chip memory, or stored in a combination of chip and external memory. The stage two engine 810 uses the stage two start-states 840 to determine in which state or states to start Stage Two and uses the offsets 835 to determine where in the input stream 825, i.e., from which character, to start Stage Two and continue CARPA run time processing. The output of the stage two engine 810 is a notice 845 or other signal that Stage Two of CARPA run time processing ended. The notice 845 may be used to determine whether the pattern or patterns are found in the input stream 825.

FIG. 8 shows a configuration of one embodiment. Other embodiments include configurations having multiple Stage One engines and multiple Stage Two engines. In such configurations, multiple packets of one or several input streams are inspected in parallel. In some configurations, a number of Stage One engines and a number of Stage Two engines are different so that, for example, any idle Stage Two engine can pick up work from a Stage One engine. In other configurations, a number of Stage One engines and a number of Stage Two engines are the same and there may be one-to-one binding between a Stage One engine and Stage Two engine to form a multi-stage pipeline. In a convenient embodiment, Stage One engines and Stage Two engines are organized into 2-stage pipelines, where multiple engines are available for each stage.

Yet another embodiment includes a single engine handling CARPA-DFA and CARPA-NFA, and transitioning back and forth between Stage One and Stage Two to implement a depth-first approach to CARPA run time processing.

The CARPA compiler will now be described in greater detail. From a pattern or a set of patterns, the CARPA compiler generates a CARPA-DFA for use in Stage One of CARPA run time processing, CARPA-NFA for use in Stage Two of CARPA run time processing, and a mapping for transitioning from Stage One to Stage Two. In a convenient embodiment, the CARPA compiler may generate the CARPA-DFA, CARPA-NFA, and mapping from or based on a typical NFA, which itself may be generated by the CARPA compiler in any number of well-known ways or provided to the CARPA compiler. In one embodiment, the CARPA-DFA and CARPA-NFA are represented data structure-wise as graphs, and the mapping is represented data structure-wise as a table.

For the sake of description, the CARPA-DFA generated by the CARPA compiler in the first instance may be called an initial CARPA-DFA. The initial CARPA-DFA for a pattern includes at least one end-state that maps to one or more states of a NFA for the pattern. The end-state represents a change from processing the pattern as DFA to processing the pattern as NFA. The number of states in the initial CARPA-DFA may be limited by an amount of memory (physical or virtual) allocated to Stage One of CARPA run time processing, a so-called "low watermark," and this amount may be user or system defined. In a convenient embodiment, the CARPA compiler uses an optimization level flag to calculate a number of DFA states in the initial CARPA-DFA with a reasonable default value calculated using a number of NFA states and quality of the NFA states.

The CARPA compiler may add more DFA states (above the low watermark) to the initial DFA. A state transition from an end-state of the initial CARPA-DFA leads to a state being added. It may be said that the added state extends from the end-state. As such, adding DFA states to the initial CARPA-DFA results in what may be called an extended or augmented CARPA-DFA. An initial CARPA-DFA for multiple patterns may have one or more DFA states that are common to some of the patterns. When adding DFA states to such DFA, there may be one or more state transitions from a common DFA state, each leading to a state being added. In one embodiment, to add DFA states to an initial CARPA-DFA for a pattern, the CARPA compiler converts NFA states of a NFA for the pattern (e.g., a CARPA-NFA) to DFA states. As such, the resulting extended DFA, together with the NFA, may be thought as having at least a complete set of states for the given pattern.

The CARPA compiler adds more DFA states to the initial CARPA-DFA to achieve one or more of the following goals: adding DFA states that reduce the number of times or instances CARPA run time processing transitions from Stage One to Stage Two and adding DFA states that reduce the number of NFA states to track in Stage Two after transition from Stage One to Stage Two. Adding DFA states to reach some of these goals is described later in greater detail.

The CARPA compiler may continue adding DFA states to process during Stage One as long as one or more of the above goals is met. However, there is no advantage to augmenting a CARPA-DFA with a number of DFA states such that the number of DFA states of the CARPA-DFA equals the number of DFA states of a typical, non-CARPA DFA for the same pattern or pattern set. Having the same number of DFA states as a typical DFA would not solve the problem of graph explosion described earlier. As such, it may be said that the upper limit or "high watermark" for a number of DFA states of a CARPA-DFA is less than the number of DFA states of a typical DFA for the same pattern.

The CARPA compiler maps at least one of the DFA states added to one or more states of the NFA to form an end-state of the extended CARPA-DFA. When this end-state is processed, CARPA run time processing changes from Stage One to Stage Two as described previously. In a convenient embodiment, mapping includes replacing a mapping between an end-state of an initial CARPA-DFA and one or more states of a NFA with a mapping between an end-state of an extended CARPA-DFA and one or more states of the NFA.

Figure 9A:
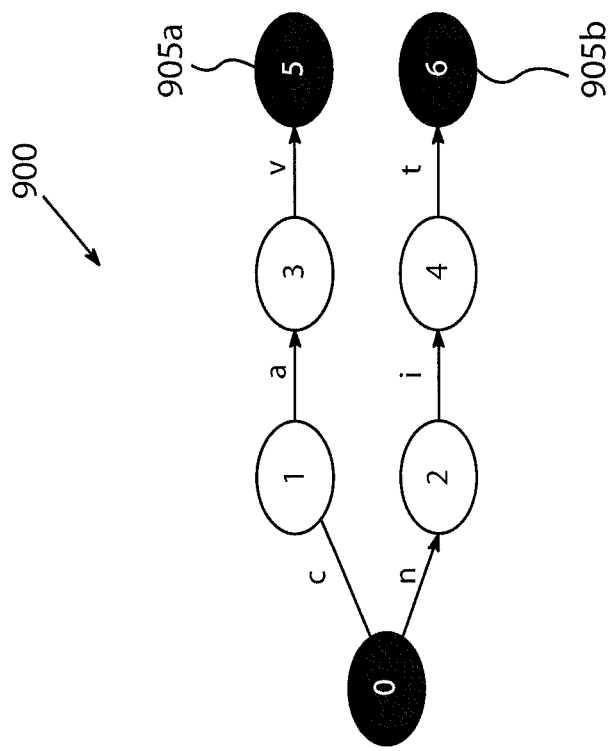
FIGS. 9A and 9B are DFA graphs of example CARPA-DFAs.
Figure 9B:
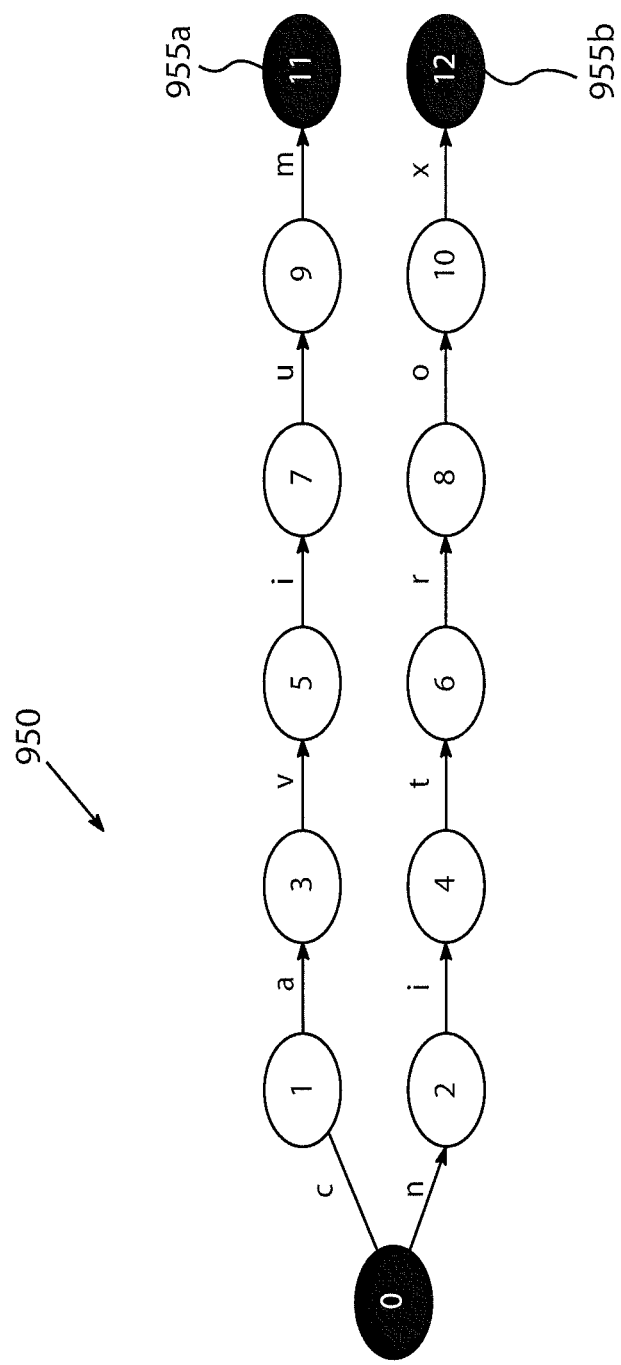

To describe the CARPA compiler mechanism in which adding more DFA states in an initial CARPA-DFA reduces the number of times or instances CARPA run time processing transitions from Stage One to Stage Two, consider the following examples discussed in reference to FIGS. 9A and 9B.

FIG. 9A shows a DFA graph 900 of an example CARPA-DFA for the patterns "cavium.*networks" and "nitrox.*octeon." (The CARPA-DFA is an example of an initial CARPA-DFA with an initial low watermark for number of DFA states set to seven and is used as example to explain concept.) In the graph 900, nodes represent DFA states. Nodes 905a and 905b represent stage one end-states (viz., DFA states 5 and 6, respectively) that when reached cause CARPA run time processing to transition from Stage One (DFA stage) to Stage Two (NFA stage).

Given the CARPA-DFA of FIG. 9A, Stage Two is triggered for all input starting with "cav" or "nit," like "caveat," "cavity," "nitty" and other false positives. Transitioning to Stage Two on these false positives can result in non-deterministic run time processing and thus, reduces run time performance. Run time performance is also reduced because a walk of the CARPA-NFA is triggered that will declare no matches. The idea is to avoid transitioning to Stage Two for false positives. The CARPA compiler can improve run time performance by augmenting the CARPA-DFA by adding more DFA states as long as the total number of states is below the high watermark.

FIG. 9B shows a DFA graph 950 of an example CARPA-DFA for the same patterns above but having DFA states in addition to those of the CARPA-DFA of FIG. 9A, viz., DFA states 7-12. The additional DFA states 11 and 12 are stage one end-states represented by nodes 955a and 955b, respectively.

Given the CARPA-DFA of FIG. 9B, Stage Two is not triggered unless "cavium" or "nitrox" is found in an input stream. Extending the CARPA-DFA with additional DFA states reduces the number of instances (i.e., partial matches or false positives) in which Stage Two is triggered. So rather than going to Stage Two on "caveat," "cavity," and "caviar," (i.e., three instances), as is this case with the CARPA-DFA of FIG. 9A, Stage Two is triggered on "cavium" with the CARPA-DFA of FIG. 9B. An extension of the foregoing concept would be not to "push" a single letter literal of any pattern into Stage One because each occurrence of a literal will cause run time processing to continue into Stage Two resulting in non-deterministic performance, and thus, reducing performance.

By transitioning to Stage Two on matches more complete than the partial matches found with the CARPA-DFA of FIG. 9A, CARPA run time processing remains in Stage One for a longer time, where "time" may be measured by a number or an amount of input processed (e.g., number of input characters processed). In this way, CARPA run time processing is more deterministic when Stage One is carried out with the extended CARPA-DFA of FIG. 9B than with the CARPA-DFA of FIG. 9A. Thus, the CARPA-DFA of FIG. 9B, having additional DFA states to process in Stage One before continuing with Stage Two, is an improvement over the CARPA-DFA of FIG. 9A.

To describe the CARPA compiler mechanism in which adding DFA states that reduce the number of NFA states to track in Stage Two, consider the following example discussed in reference to FIGS. 10A, 10B, 11, and 12.

Figure 10A:
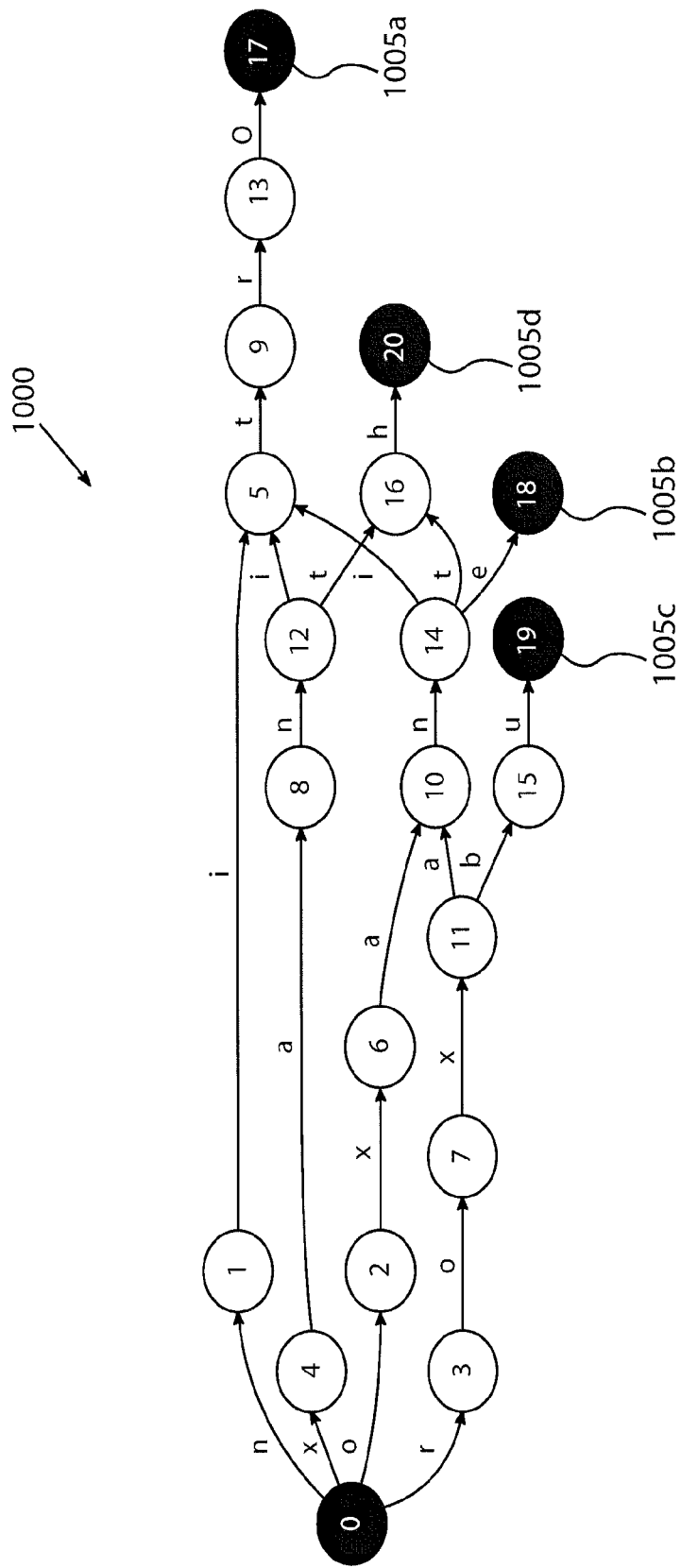
FIGS. 10A and 10B are graphs of an example CARPA-DFA and corresponding CARPA-NFA, respectively.

FIG. 10A shows a DFA graph 1000 of an example CARPA-DFA for patterns "nitroxchip," "roxburyburger," "oxanetank," and "xanthide." Nodes 1005a-d represent stage one end-states that when reached cause the transition from Stage One to Stage Two of CARPA run time processing.

Table 2 below is a transition table mapping each stage one end-state of the CARPA-DFA of FIG. 10A to one or more stage two start-states. When Stage One of CARPA run time processing reaches a stage one end-state (e.g., DFA state 17), CARPA run time processing continues onto Stage Two starting at a corresponding stage two start-state or states (e.g., NFA states 7, 15, 29) according to the mapping. The transition table and its mappings may be determined from or based on the CARPA-DFA because each DFA state may be represented by a set of NFA states.

TABLE 2

A transition table mapping each stage one end-state of the CARPA-DFA of FIG. 10A to one or more stage two start-states:

| stage one end-states | stage two start-states |
|---|---|
| {17} | {7, 15, 29} |
| {18} | {33} |
| {19} | {18} |
| {20} | {44} |

Figure 10B:
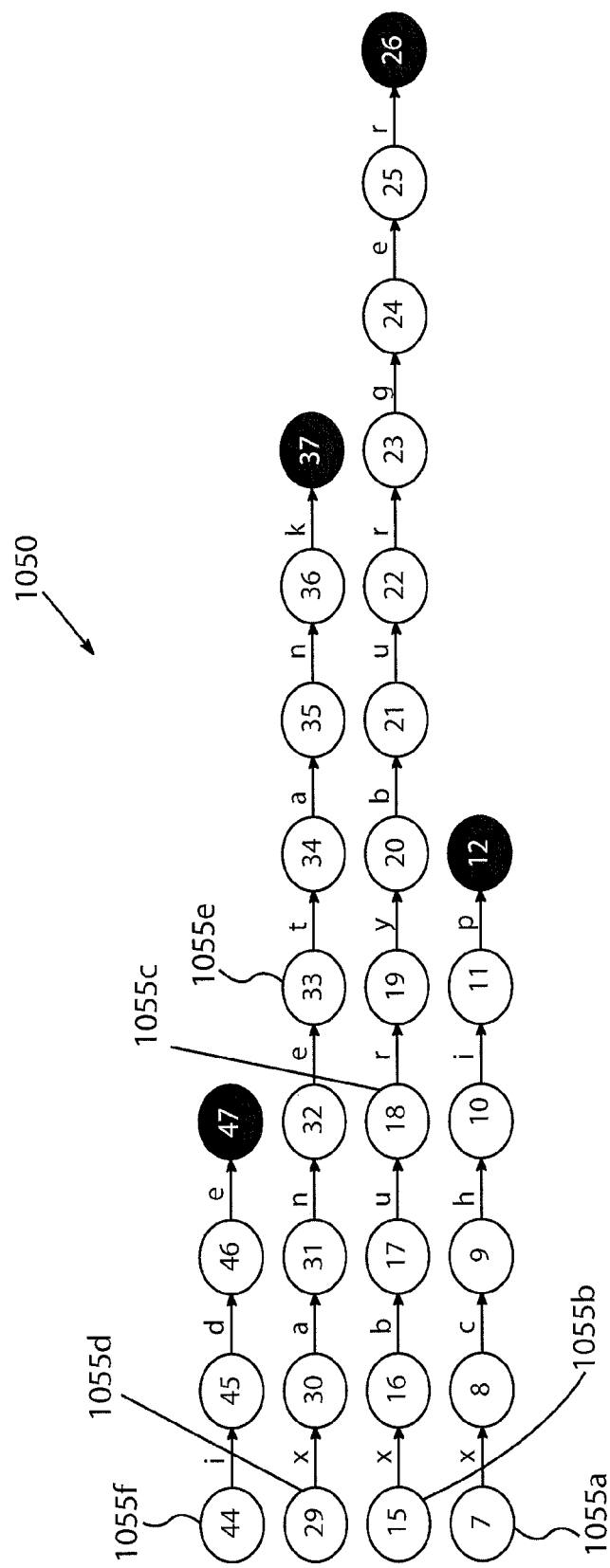

FIG. 10B shows a NFA graph 1050 of an example CARPA-NFA for the same patterns ("nitroxchip," "roxburyburger," "oxanetank," and "xanthide"). The CARPA-NFA includes, at least, the stage two start-states (represented by nodes 1055a-f) from which to continue CARPA run time processing in Stage Two and NFA states to process in Stage Two.

As shown in the example above, when transitioning from Stage One to Stage Two, there may be three NFA states to track in Stage Two. For example, Table 2 shows DFA state 17 in Stage One leads to NFA states 7, 15, and 29 to track in Stage Two. The CARPA compiler can improve run time performance by adding more DFA states in Stage One that reduce the number of NFA states to track in Stage Two.

Figure 11:
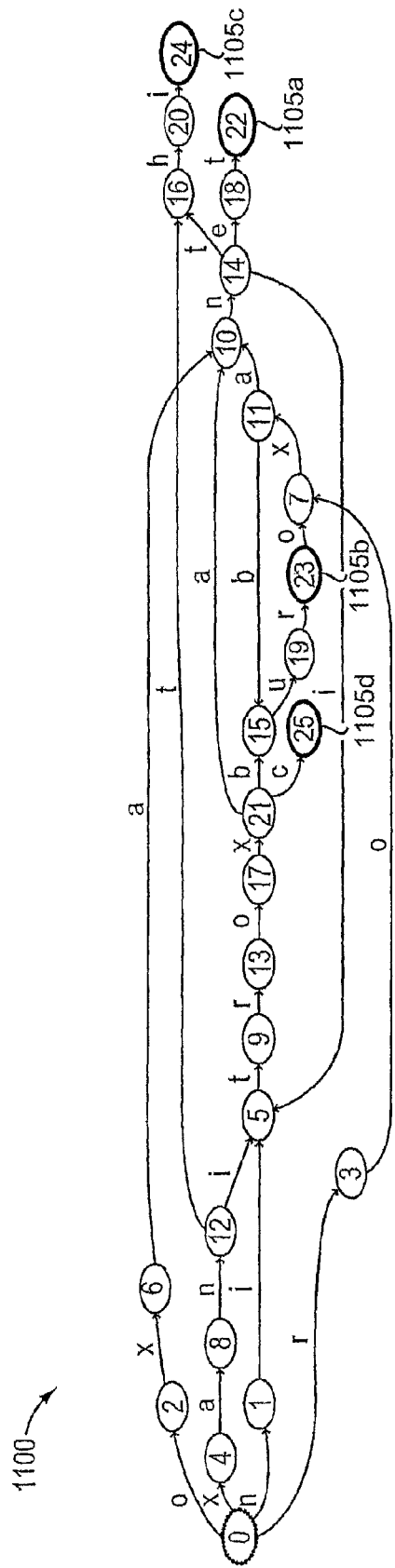
FIGS. 11 and 12 are graphs of an example CARPA-DFA and corresponding CARPA-NFA, respectively.

FIG. 11 shows a DFA graph 1100 of an example CARPA-DFA for the same patterns above but having DFA states in addition to those of the CARPA-DFA of FIG. 10A, viz., DFA states 21-24. The additional DFA states 22-25 are stage one end-states represented by nodes 1105a-d, respectively. Table 3 below is a transition table mapping each stage one end-state of the CARPA-DFA of FIG. 11 to one or more stage two start-states.

TABLE 3

A transition table mapping each stage one end-state of the CARPA-DFA of FIG. 11 to one or more stage two start-states:

| Stage One end-states | Stage Two start-states |
|---|---|
| {22} | {34} |
| {23} | {19} |
| {24} | {45} |
| {25} | {9} |

Figure 12:
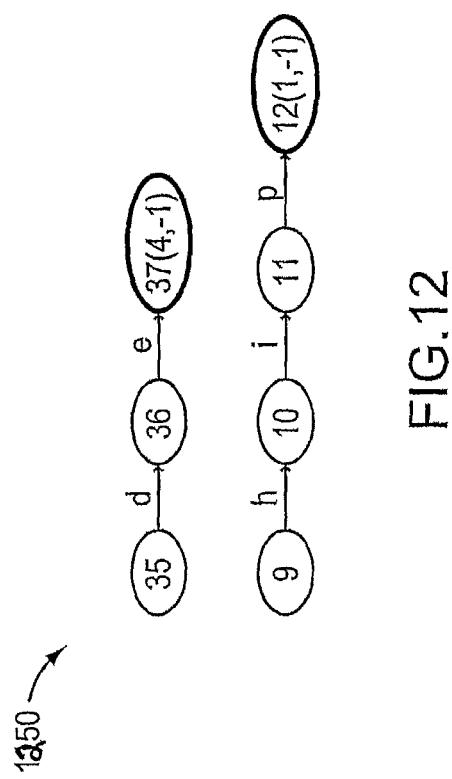

FIG. 12 shows a NFA graph 1250 of an example CARPA-NFA for the same patterns above but include the stage two start-states from which to continue CARPA run time processing in Stage Two according to the transition table of Table 3. As shown in the example above, when transitioning from Stage One to Stage Two, there is one NFA state to track in Stage Two. For example, Table 3 shows DFA state 22 in Stage One leads to NFA state 34 to track in Stage Two. By reducing the number of states to track in Stage Two, the size of a per flow context (e.g., in terms of buffer or memory size) can be smaller and also improves run time performance.

Accordingly, it may be said that principles of the CARPA solution or approach include:

i) pushing parts of patterns, which may be strings, regular expressions (commonly referred to as "regex") or combinations, thereof, that cause "graph explosion" into the Stage Two from a graph generation point of view;

ii) using Stage One to "contain" or "cap" an amount or number of NFA states to track in the Stage Two to keep run time performance deterministic; and iii) splitting patterns such that a majority of run time is spent in Stage One for any input, in particular, inputs that do not include attack patterns or signatures, so called "clear traffic," making the overall run time performance deterministic. The majority of run time is spent in Stage One because the majority of traffic is clear traffic.

These principles enable the CARPA approach to reach objectives including:

i) fewer number of matches in Stage One (also known as false positives or partial matches) to avoid Stage Two as much as possible;

ii) fewer number of NFA states to track in Stage Two; and iii) size of DFA graph generated for Stage One is not overwhelming.

In some situations, Stage One and Stage Two of CARPA run time processing is followed by another stage, Stage Three, of run time processing. Before describing Stage Three in detail, consider an example of searching for the patterns: "cavium.*networks," "nitrox[^\r\n\t\v\s]{3}octeon," "purevu.{5,10}videochips," and "[^\n]{16}montavista" in an input stream "purevuchips are video chips."

Figures 13, 13A:
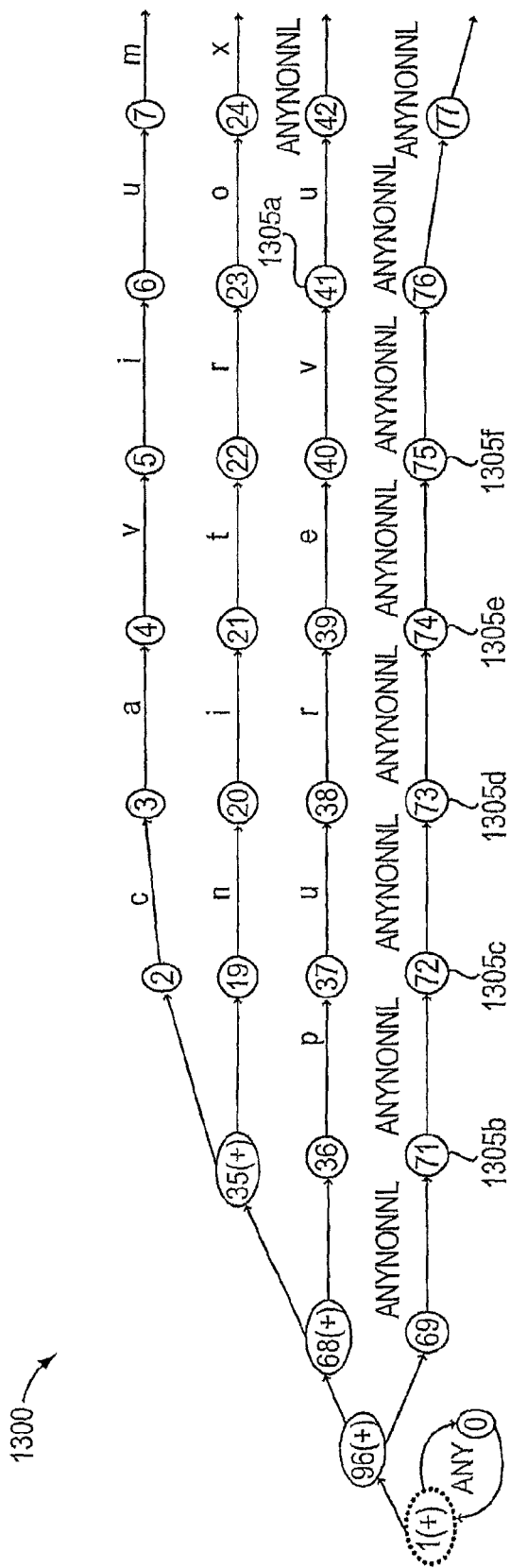
FIG. 13A-C is a NFA graph of an example NFA.
Figure 13B:
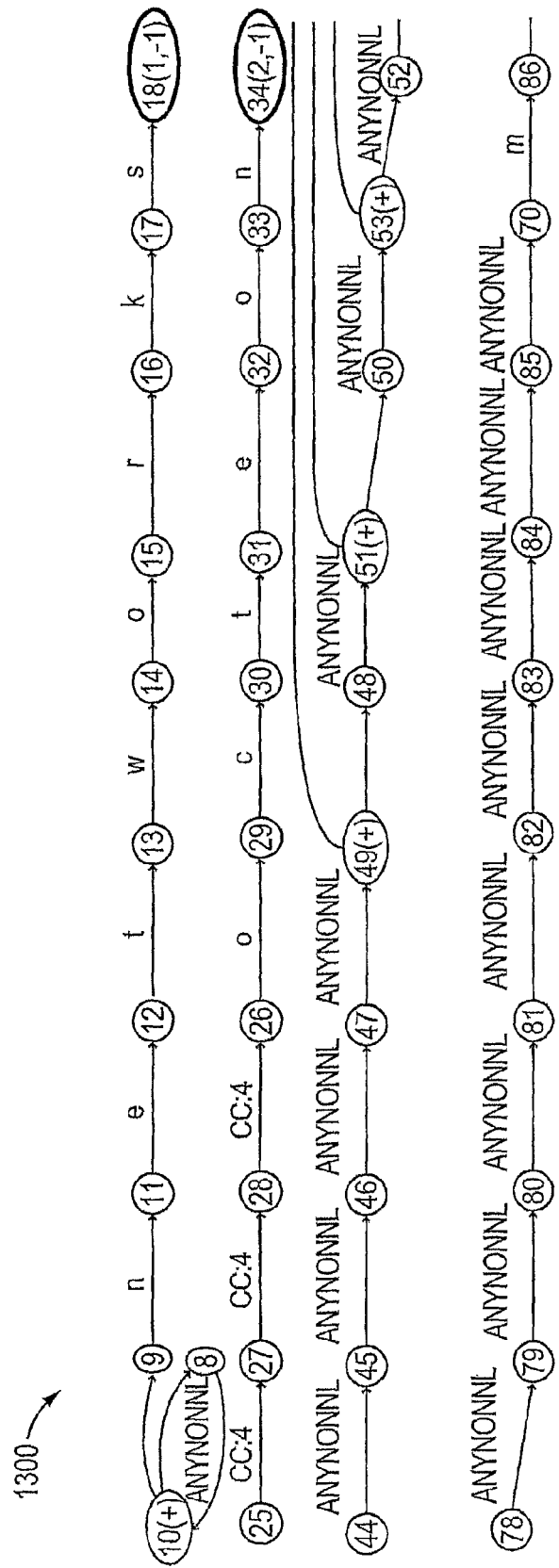
Figure 13C:
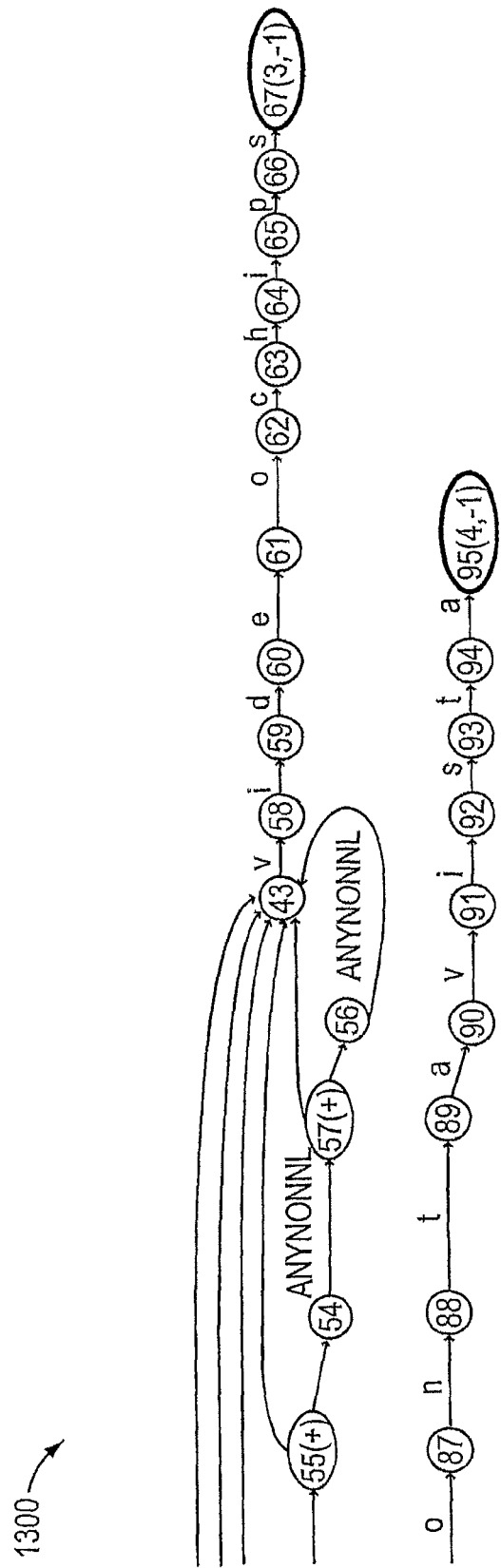
Figure 14B:
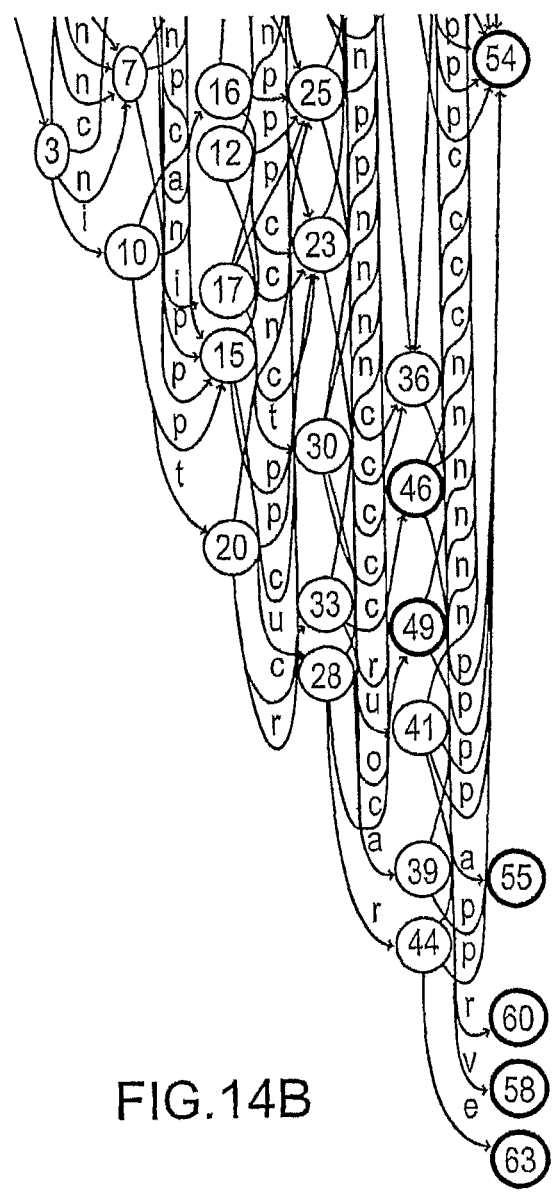

FIG. 13 shows a NFA graph 1300 of an example NFA for patterns "cavium.*networks," "nitrox[^\r\n\t\v\s]{3}octeon," "purevu.{5,10}videochips," and "[^\n] {16}montavista." FIG. 14 shows a DFA graph 1400 of an example CARPA-DFA for the same set of patterns.

Referring to FIG. 14, Stage One of CARPA run time processing starts at DFA state 0, represented in the DFA graph 1400 as node 1405 and written in shorthand as CARPA-DFA START STATE={0}. On character 'p' of the input stream, the CARPA-DFA transitions to state 4 (written in shorthand as on 'p'={4}) and continues as follows:
on 'u'={11}
on 'r'={21}
on 'e'={34}
on 'v'={50}

On character 'v' of the input stream, the CARPA-DFA transitions to state 50, which is a stage one end-state (represented in the DFA graph 1400 of FIG. 14 as node 1410) and is one of several stage one end-states. A transition table (not shown) maps stage one end-state 50 to stage two start-states 41, 71, 72, 73, 74, and 75.

Continuing with FIG. 13, Stage Two of CARPA run time processing starts at the stage two start-states 41, 71, 72, 73, 74, and 75 represented in the NFA graph 1300 as nodes 1305a-f and written in shorthand as CARPA-NFA START STATES={41, 71, 72, 73, 74, 75}. Stage Two of CARPA run time processing proceeds as follows:
on 'u'={42, 72, 73, 74, 75, 76}
on 'c'={44, 73, 74, 75, 77}
. . .
. . . etc.

Stage One continues with the next character 'u' and the CARPA-DFA transitions to state 1, and so on. As described earlier, transitioning during CARPA run time processing between Stage One and Stage Two may be either depth-first or breadth-first.

As the example above demonstrates, a number of NFA states to track in Stage Two may be large (e.g., six NFA states) when transitioning to Stage Two. The large number of tracked NFA states is due to a pattern having a pattern format in which the prefix of the pattern is a wild character or larger character class repeated multiple times e.g., [^\n]* and [^\n]{16}. Given such pattern format, the schemes mentioned above may not be enough to meet the goals provided above, such as avoiding transitions to Stage Two processing and if a transition happens, reducing a number of NFA states to track. If a set of patterns includes a pattern having such prefix, the prefix of the pattern overlaps with some or all of other patterns in the set. Such prefix may be called an "overlapping pattern prefix." In the example above, from the last pattern, "[^\n]{16}montavista," the pattern prefix "[^\n]{16}" overlaps the first three patterns "cavium.*networks," "nitrox[^\r\n\t\v\s]{3}octeon," and "purevu.{5,10}videochips. Because of the overlapping pattern prefix, either a very large number of DFA states will need to be added in Stage One to meet the above goals or in some instances, the number of DFA states needed will be so large so as to make it impractical (e.g., on the order of a number of DFA states in a complete DFA).

Stage Three of CARPA run time processing addresses this overlapping pattern prefix situation. It should be noted that Stage Three also applies to situations in which there is just one pattern and that pattern's prefix overlaps with itself. Stage Three is now described in greater detail immediately below.

As an overview, Stage Three of CARPA run time processing and compilation related to this stage can be broken down as follows:

i) Given a set of patterns, where one or more patterns (pattern prefixes) overlap with other patterns.

The CARPA compiler removes or strips a portion of the overlapping pattern(s) (portion of pattern prefix) to produce a stripped pattern(s) and a stripped portion. In one embodiment, the aforementioned is applied when one or more of patterns (pattern prefixes) overlap. The prefix of each pattern of above format is stripped.

ii) The CARPA compiler generates a CARPA-DFA and CARPA-NFA (or non-CARPA NFA) for a new set of patterns including stripped pattern and the other patterns.

iii) The CARPA compiler generates an individual "reverse" NFA for each stripped pattern(s).

iv) Process input until the stripped pattern is found with the CARPA-DFA in Stage One or with the CARPA-DFA and CARPA-NFA (or non-CARPA NFA) in Stage One and Stage Two.

v) If any of the stripped pattern(s) is found after the above processing then process the input with its corresponding reverse NFA to find the stripped portion in the input as part of Stage Three of CARPA run time processing.

vi) Report a final match if the reverse NFA finds a match.

Stage Three of CARPA run time processing also applies when there is only one pattern to process because DFA explosion can occur in the case of a single pattern e.g., <[^>]{100}href=. . .>.

In a convenient embodiment, portions of patterns removed by the CARPA compiler include:

i) A character class of a size greater than a number (e.g., 10) repeatedly concatenated. For example, " . . . cavium" becomes "cavium" and "[^\r\n\t\v\s][^<][^>][^0-9]cavium" becomes "cavium."

ii) A character class of a size greater than a number (e.g., 10) repeated using a closure. For example, "[^\n]*[^\t]*cavium" becomes "cavium" and "[^\n]*[a-zA-Z0-9]*cavium" becomes "cavium."

iii) If a pattern is to be entirely stripped because the entire pattern falls within the one of the character classes defined above, then the pattern may be dropped and not added to a CARPA-DFA and CARPA-NFA (or NFA). For example, " . . . " is dropped and "[^\n]*[^0-9]* . . . " is dropped. Dropping the pattern may be flagged during a compilation stage to process this pattern separately.

iv) If there is an alternation (|), then i)-iii) are repeated in each branch. For example, "([^\n]*|cav)ium" becomes "cavium."

Using patterns "cavium.*networks," "nitrox[^\r\n\t\v\s]{3}octeon," "purevu.{5,10}videochips," and "[^\n]{16}montavista" as an example, the overlapping pattern "[^\n]{16}montavista" becomes the stripped pattern "montavista."

Figures 15, 15A:
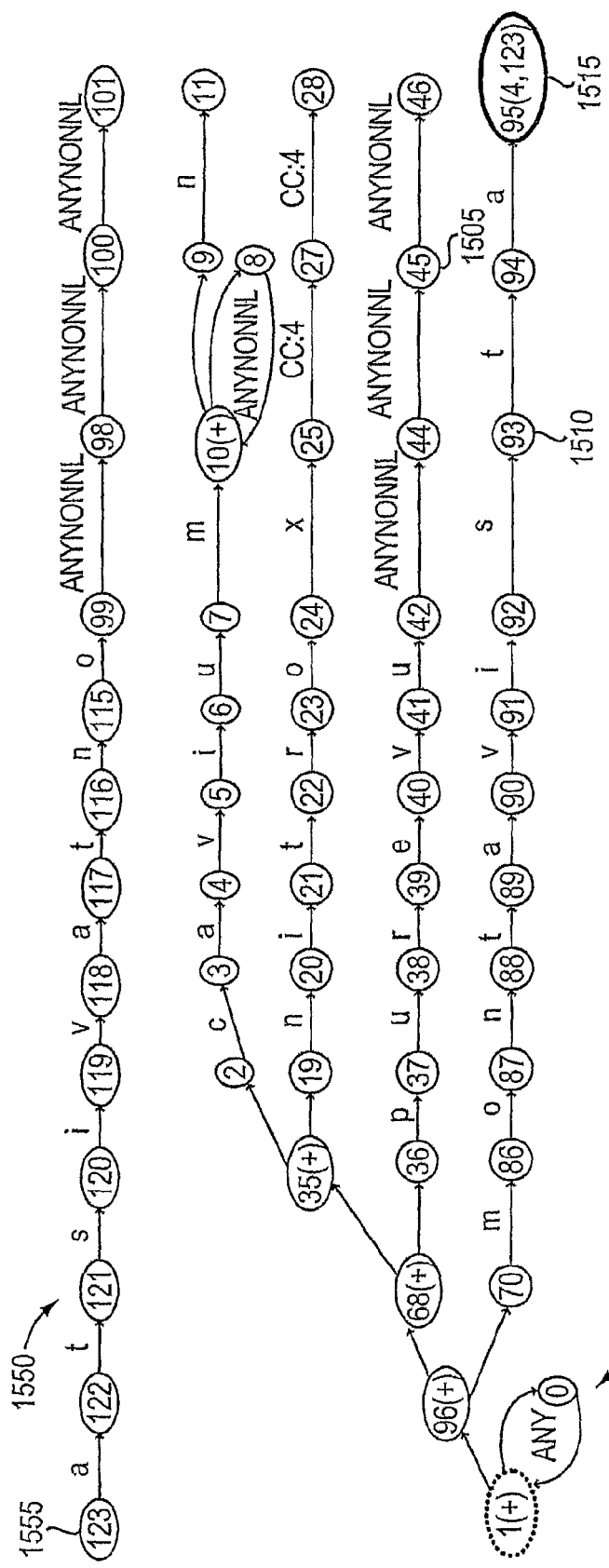
FIG. 15A-C is a NFA graph of an example NFA.
Figure 15B:
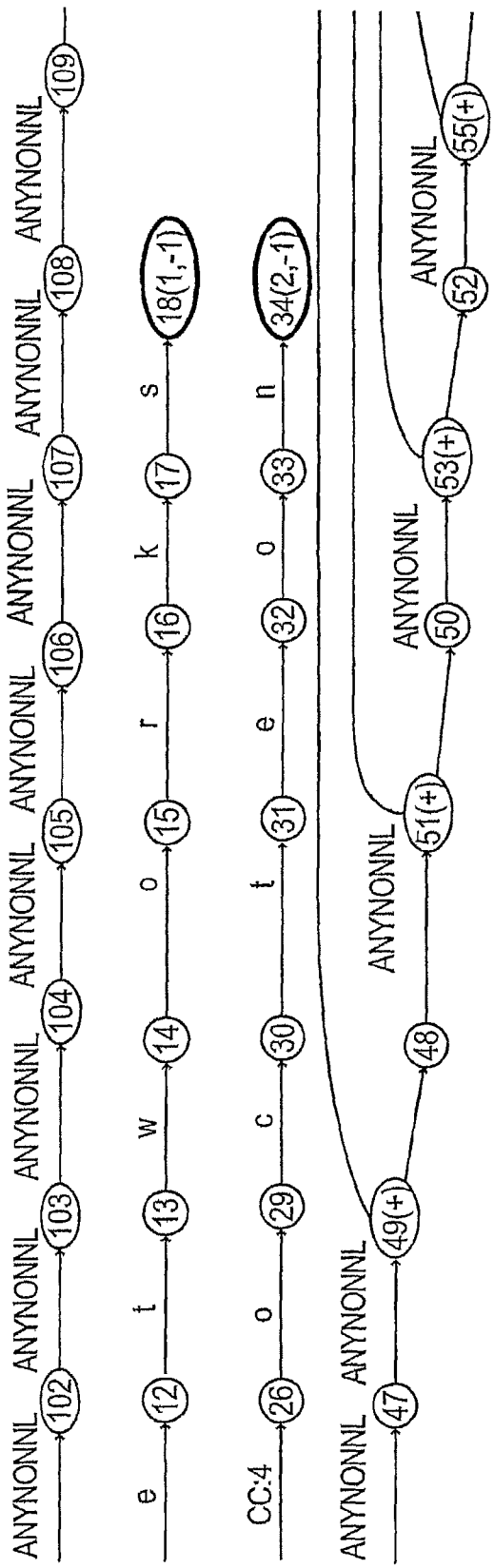
Figure 15C:
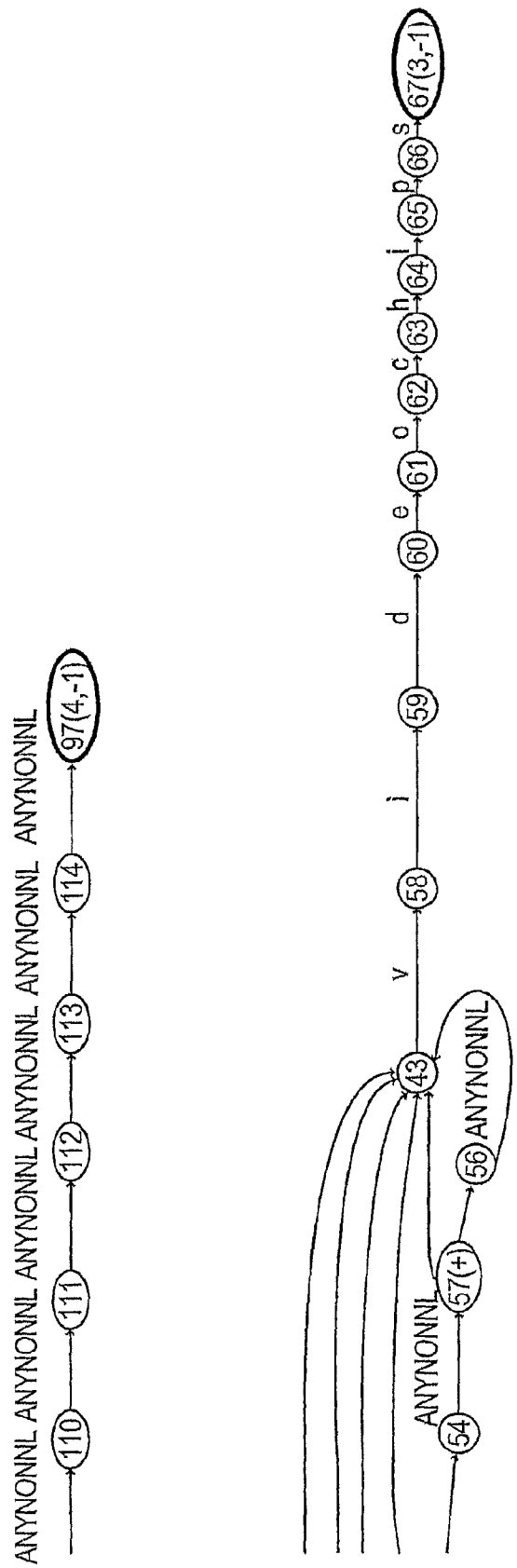
Figure 16B:
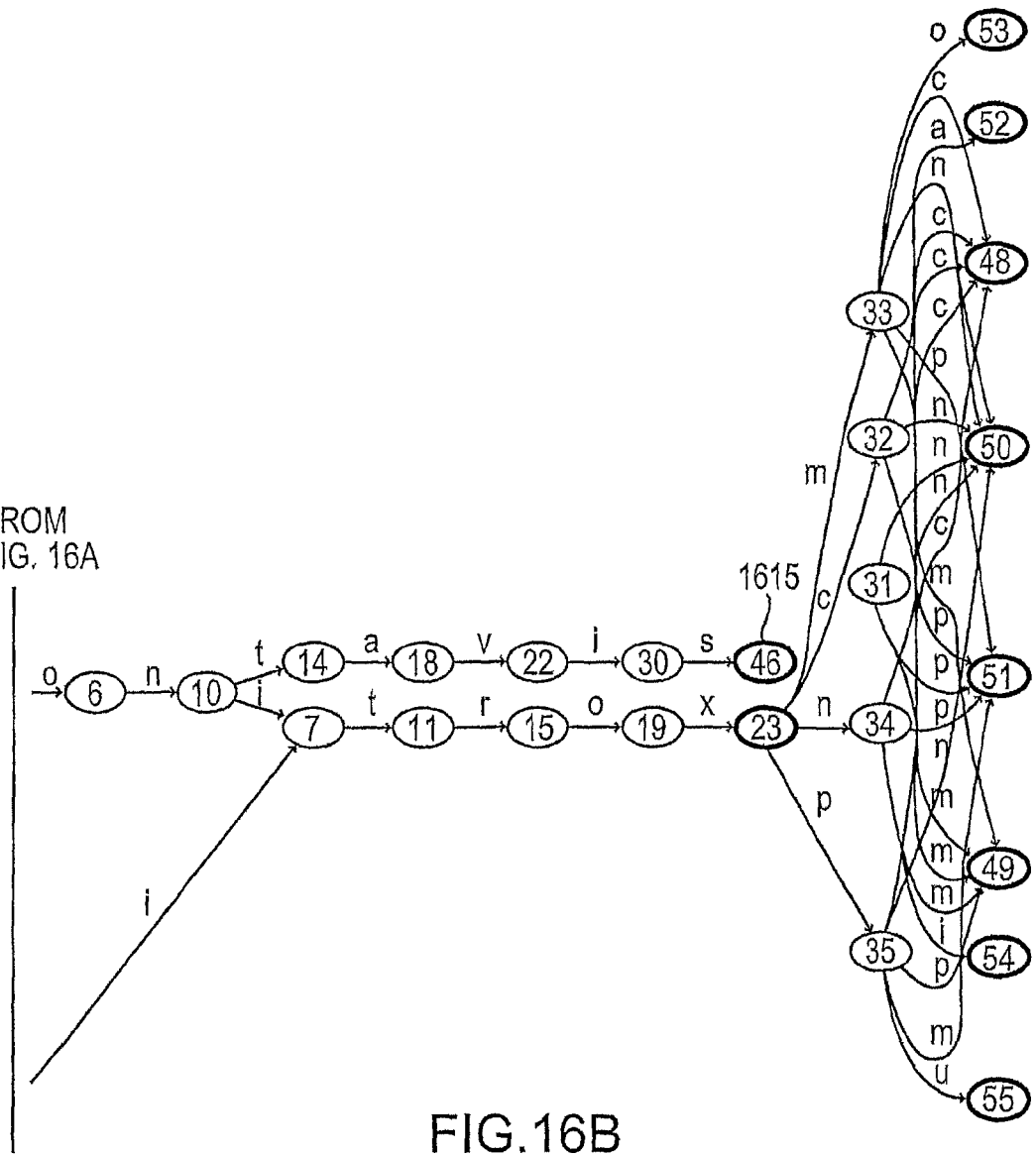
Figure 16C:
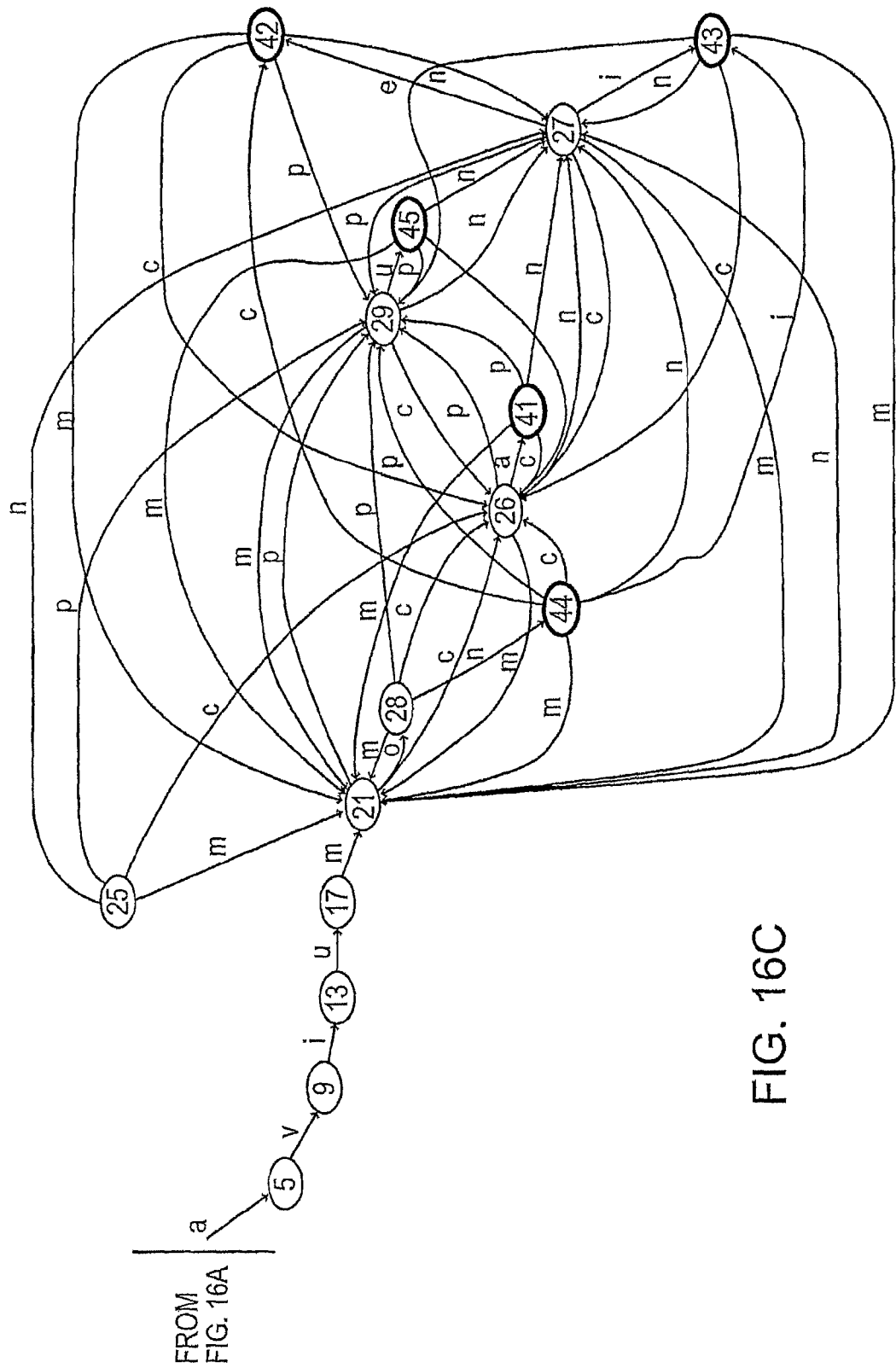

FIG. 15 shows a NFA graph 1500 of an example NFA for patterns "cavium.*networks," "nitrox[^\r\n\t\v\s]{3}octeon," "purevu.{5,10}videochips," and stripped pattern "montavista." FIG. 15 also shows a NFA graph 1550 of an example "reverse" NFA for the overlapping pattern "[^\n]{16}montavista." The CARPA compiler creates the reverse NFA by reversing a concatenation operator during the creation of a NFA. The reverse NFA accepts all the regular languages accepted by a "forward" NFA except that input is read backward. FIG. 16 shows a DFA graph 1600 of an example CARPA-DFA for patterns "cavium.*networks," "nitrox[^\r\n\t\v\s]{3}octeon," "purevu.{5,10}videochips," and the stripped pattern "montavista."

In operation, Stage One, Stage Two, and Stage Three looking for patterns "cavium.*networks," "nitrox[^\r\n\t\v\s]{3}octeon," "purevu.{5,10}videochips" and the stripped pattern "montavista" in an input stream "purevuchips are video chips" goes as follows. Referring to FIG. 16, Stage One of CARPA run time processing starts at DFA state 0, represented in the DFA graph 1600 as node 1605 and written in shorthand as CARPA-DFA START STATE={0}. On character 'p' of the input stream, the CARPA-DFA transitions to state 4 (written in shorthand as on 'p'={4}) and continues as follows:
on 'p'={4}
on 'u'={8}
on 'r'={12}
on 'e'={16}
on 'v'={20}
on 'u'={24}
on 'c'={37}
on 'h'={56}

On character 'h' of the input stream, the CARPA-DFA transitions to state 56 which is a stage one end-state (represented in the DFA graph 1600 as node 1610) and is one of several stage one end-states. A transition table (not shown) maps stage one end-state 56 to stage two start-state 45.

Continuing with FIG. 15, Stage Two of CARPA run time processing starts at the stage two start-state 45 represented in the NFA graph 1500 as node 1505 and written in shorthand as CARPA-NFA START STATES={45}. Stage Two of CARPA run time processing proceeds as follows:
on 'i'={46}
on 'p'={47}
...0
...etc.

Stage One continues with the next character 'i' and the CARPA-DFA transitions to state 1, and so on. As described earlier CARPA run time processing may be either depth-first or breadth-first from the point of view of transitioning between Stage One and Stage Two processing.

As the example above demonstrates, by stripping the overlapping pattern "[^\n]{16}montavista" to stripped pattern "montavista," the number of NFA states to track when Stage Two is triggered is reduced to one NFA state from six NFA states (when the overlapping pattern [^\n]{16}montavista is not stripped). Also, it should be noted that Stage three processing is not triggered in this particular case.

In another example, in operation, Stage One, Stage Two, and Stage Three looking for patterns "cavium.*networks," "nitrox[^\r\n\t\v\s]{3}octeon," "purevu.{5,10}videochips" and the stripped pattern "montavista" in an input stream "CGe6 linux from montavista" goes as follows. Referring to FIG. 16, Stage One of CARPA run time processing starts at DFA state 0, represented in the DFA graph 1600 as the node 1605 and written in shorthand as CARPA-DFA START STATE={0}. On character 'C' of the input stream, the CARPA-DFA transitions to state 0 (written in shorthand as on 'C'={0}) and continues as follows:
on 'G'={0}
...
...
on 'm'={2}
on 'o'={6}
on 'n'={10}
on 't'={14}
on 'a'={18}
on 'v'={22}
on 'i'={30}
on 's'={46}

On character 's' of the input stream, the CARPA-DFA transitions to state 46, which is a stage one end-state (represented in the DFA graph 1600 as node 1615) and is one of several stage one end-states. A transition table (not shown) maps stage one end-state 46 to stage two start-state 93.

Continuing with FIG. 15, Stage Two of CARPA run time processing starts at the stage two start-state 93 represented in the NFA graph 1500 as node 1510 and written in shorthand as CARPA-NFA START STATES={93}. Stage Two of CARPA run time processing proceeds as follows:
on 't'={94}
on 'a'={95}

On character 'a' of the input stream, the CARPA-NFA transitions to state 95 (represented in the NFA graph 1500 as node 1515) which marks the end of Stage Two and signifies that the stripped pattern "montavista" is found in the input.

To find the stripped portion of the overlapping pattern "[^\n] {16}montavista" in the input a reverse NFA is used. The CARPA compiler creates the reverse NFA by reversing a concatenation operator during the creation of a NFA. The reverse NFA accepts all the regular languages accepted by a "forward" NFA except that input is read backward.

Referring to FIG. 15, Stage Three of CARPA run time processing starts at reverse NFA state 123 represented in the NFA graph 1550 as node 1555 and written in shorthand as REVERSE NFA START STATES={123}. On character 'a' of the input stream, the reverse NFA transitions to state 122 (written in shorthand as on 'a'={122}) and continues as follows:
on 't'={121}
on 's'={120}
on 'i'={119}
on 'v'={118}
on 'a'={117}
...
...
on 'G'={114}
on 'C'={97}

On character 'C' of the input stream, the reverse NFA transitions to state 97 (represented in the NFA graph 1550 as node 1560) signifying that the reverse NFA found a match and the final match is reported.

As described earlier, CARPA run time processing may be either depth-first or breadth-first. As such, when Stage Two of CARPA run time processing started at the stage two start-state 93, as described above, Stage One may have continued with a next character 't' and the CARPA-DFA may have transitioned to state 0, and so on.

In one embodiment, in Stage Three of CARPA run time processing, where a reverse NFA is run to process a stripped part of a pattern, the CARPA compiler tries to avoid preparing a reverse NFA for the entire pattern, if possible, so that the run time processing need not run the reverse NFA for the entire pattern. The CARPA compiler performs the aforementioned optimization of Stage Three when the length of a portion of the pattern processed in Stage One and Stage Two can be calculated (e.g., in case of a string).

Figure 17A:
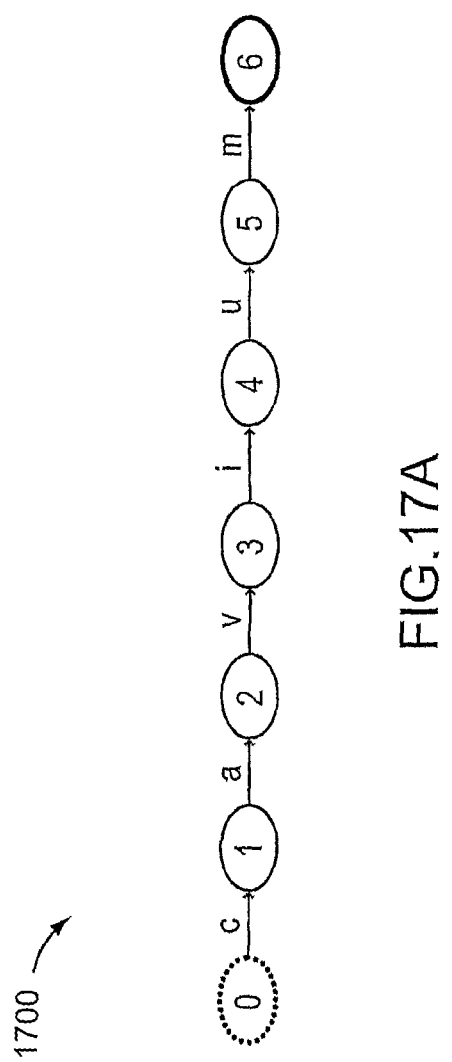
FIGS. 17A-C are graphs of an example CARPA-DFA, corresponding CARPA-NFA, and reverse NFA, respectively.

FIG. 17A shows a DFA graph 1700 of an example CARPA-DFA for pattern ".{2}(?:\d|w)caviumnitrox" with the prefix ".{2}(?:\d|x)" stripped from the pattern resulting in stripped pattern "caviumnitrox." In this example, the length of the stripped pattern can be calculated as a string, viz., 12.

Figure 17B:
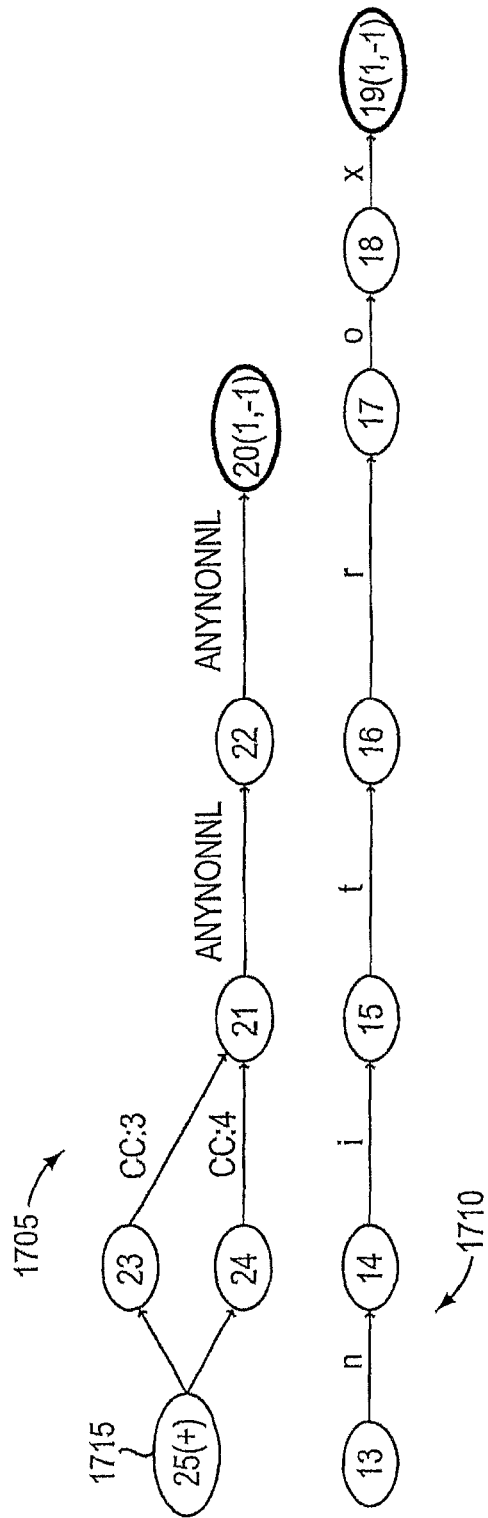

FIG. 17B shows a NFA graph 1705 of an example reverse NFA for the stripped pattern ".{2}(?:\d|w)" generated by the CARPA compiler in accordance with the optimization of Stage Three. FIG. 17B also shows a NFA graph 1710 of an example CARPA-NFA for the pattern "caviumnitrox" generated by the CARPA compiler in accordance the optimization of Stage Two as described previously in reference to FIG. 6B. CC, as shown in FIG. 17B, stands for Character Class. The CARPA Compiler finds out all unique character classes in the input pattern file. Based on the unique character classes, the CARPA compiler assigns unique character class numbers to each character class and remembers the mapping from the unique character class number to corresponding character class. CC:3 in FIG. 17B represents character class "\d" and CC:4 in FIG. 17B represents character class "\w". This way, the CARPA NFA only needs to have single arc representing whole character class.

Figure 17C:
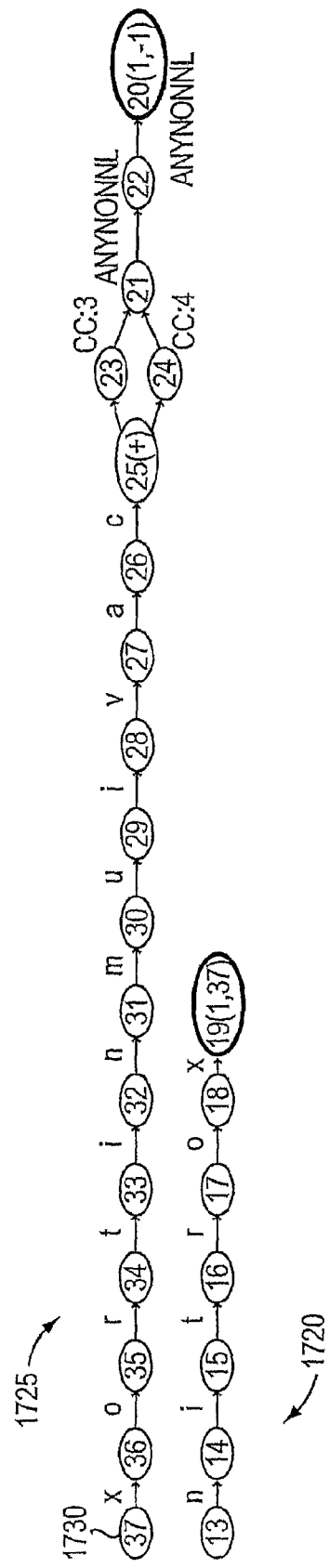

In contrast, FIG. 17C shows a NFA graph 1720 of an example NFA and a NFA graph 1725 of a example reverse NFA for the pattern ".{2}(?: \d|\w)caviumnitrox" generated without optimization of Stage Three.

The CARPA compiler using the CARPA-DFA of FIG. 17A, and the CARPA-NFA and reverse NFA of FIG. 17B, generates a Stage One-to-Stage Two transition table mapping stage one end-state 6 to stage two start-state 13, and a Stage Two-to-Stage Three transition table mapping stage two end-state 19 to stage three start-state 25.

In operation, while CARPA run time processing input "&&5caviumnitrox," Stage One transitions from DFA state 6 to NFA state 13 (in the CARPA-NFA of FIG. 17B) in Stage Two upon matching "cavium" in the input. Upon matching the "nitrox" part in Stage Two, CARPA run time processing transitions to NFA state 25 in the reverse NFA of FIG. 17B (represented in the reverse NFA graph 1705 as node 1715) instead of NFA state 37 in the reverse NFA of FIG. 17C (represented in the reverse NFA graph 1725 as node 1730). The offset in the input or "input offset" used to finish Stage Three processing is calculated as: input offset when transitioned to Stage Two end-state minus length of stripped pattern. Stage Three uses this input offset to start backwards in the original input. It should be noted that Stage Two and Stage Three processing can also be done in parallel or they can be done in sequence and in any order (i.e., Stage 2 followed by Stage 3 or Stage 3 followed by Stage 2). Going forward example embodiments of the present invention will be described using one of these schemes.

In this example (and as illustrated in the figures), given the input offset when transitioned to NFA state 19 (Stage Two end-state) is X and the length of stripped pattern is 12, the input offset used to start Stage Three is Y=X−12.

In practice, Stage One, Stage Two, and Stage Three of CARPA run time processing may be each carried out by an engine or thread. The stage one, stage two and stage three engines may be, for example, special-purpose processors.

Figure 18:
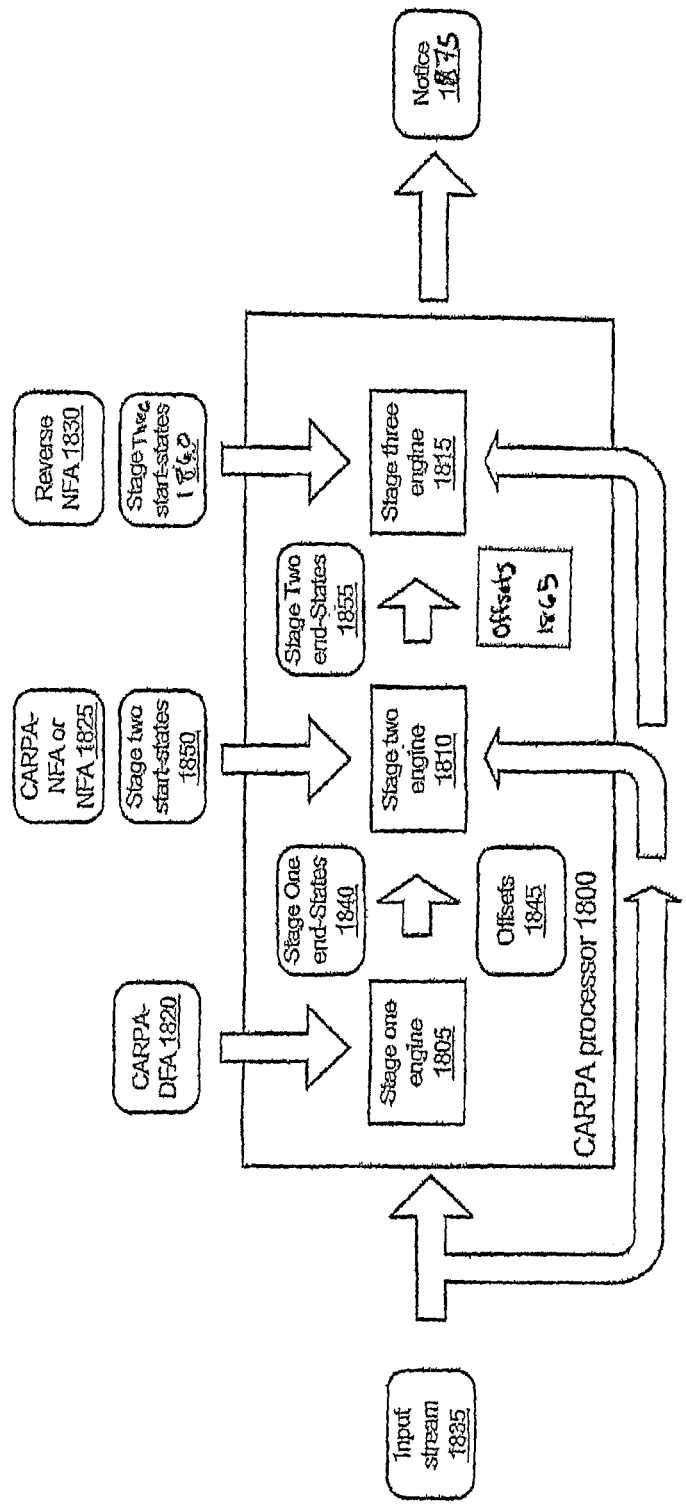
FIG. 18 is a block diagram of an example CARPA processor.

FIG. 18 shows a CARPA processor 1800 (e.g., the CARPA co-processor 244 of FIG. 2) with a stage one engine 1805 carrying out Stage One of CARPA run time processing, a stage two engine 1810 carrying out Stage Two of CARPA run time processing, and a stage three engine 1815 carrying out Stage Three of CARPA run time processing. The stage one engine 1805 may be programmed or provided with a CARPA-DFA 1820 defining a pattern or patterns to look for in an input stream. The stage two engine 1810 may be programmed or provided with a CARPA-NFA or NFA 1825 defining a pattern or patterns to look for in an input stream. The stage three engine 1815 may be programmed or provided with a "reverse" NFA 1830 defining a pattern (e.g., the stripped pattern described previously in reference to FIG. 17B) to look for in an input stream. All or part of the CARPA-DFA 1820, CARPA-NFA (or NFA) 1825, and reverse NFA 1830 may be stored in external memory (e.g., the DDR SDRAM 118 of FIG. 2), chip memory, or stored in a combination of chip and external memory.

The input to the stage one engine 1805 is an input stream 1835. The output of the stage one engine 1805 includes all stage one end-states 1840 reached while processing the input stream 1835 and offsets 1845 identifying where in the input stream 1835 did input characters occur that caused transition changes to the stage one end-states 1840. In one embodiment, the stage one engine 1805 outputs the stage one end-states 1840 and offsets 1845 in an array (not shown). The array includes N entries of "Stage One end-state, offset" at the end of Stage One processing for a particular input, depending on how many partial matches happened and need to be processed in Stage Two.

The input to the stage two engine 1810 is the output of the stage one engine 1805 (stage one end-states 1840 and offsets 1845). The stage two engine 1810 references a table (not shown) mapping the stage one end-states 1840 to stage two start-states 1850. Such table may be stored in external memory, such as the DDR SDRAM 118 of FIG. 2, chip memory, or stored in a combination of chip and external memory. The stage two engine 1810 uses the stage two start-states 1850 to determine in which state or states to start Stage Two and uses the offsets 1845 to determine where in the input stream 1835, i.e., from which character, to start Stage Two and continue CARPA run time processing. The output of the stage two engine 1810 includes stage two end-states 1855.

The input to the stage three engine 1815 is the output of the stage two engine 1810 (stage two end-states 1855 and offsets 1865). The stage three engine 1815 references a table (not shown) mapping the stage two end-states 1855 to stage three start-states 1860. Like the table mapping the stage one end-states 1840 to stage two start-states 1850, the present table may be stored in external memory, such as the DDR SDRAM 118 of FIG. 2, chip memory, or stored in a combination of chip and external memory. The stage three engine 1815 uses the stage three start-states 1860 to determine in which state or states to start Stage Three and continue CARPA run time processing. The output of the stage three engine 1815 is a notice 1875 or other signal that Stage Three of CARPA run time processing ended. The notice 1875 may be used to determine whether the pattern or patterns are found in the input stream 1835.

FIG. 18 shows a configuration of one embodiment. Other embodiments include configurations having multiple Stage One, Stage Two, and Stage Three engines. In such configurations, multiple packets of one or several input streams are inspected in parallel. In some configurations, a number of Stage One, Stage Two, and Stage Three engines are different so that, for example, any idle Stage Two engine can pick up work from a Stage One engine. In other configurations, a number of Stage One, Stage Two, and Stage Three engines are the same and there may be one-to-one binding between the engines to form a multi-stage pipeline. In a convenient embodiment, Stage One, Stage Two, and Stage Three engines are organized into 3-stage pipelines, where multiple engines are available for each stage.

The following examples demonstrate a general form of CARPA when "non-exploding" parts of the patterns are used to build the Stage One DFA of the CARPA. The "non-exploding" part chosen from a give pattern can be a simple string or a regex. If it is a string or a simple regex whose length can be calculated, the prefix of this pattern is inspected using a partial reverse NFA as the length is known during CARPA Stage Three processing. If it is a complex regex (when the length of sub-pattern cannot be determined easily), the entire reverse NFA for the pattern is traversed to inspect the prefix of this pattern during CARPA Stage 3 processing. Stage 1 processing is broken into Stage 1A and Stage 1B.

Figure 18A:
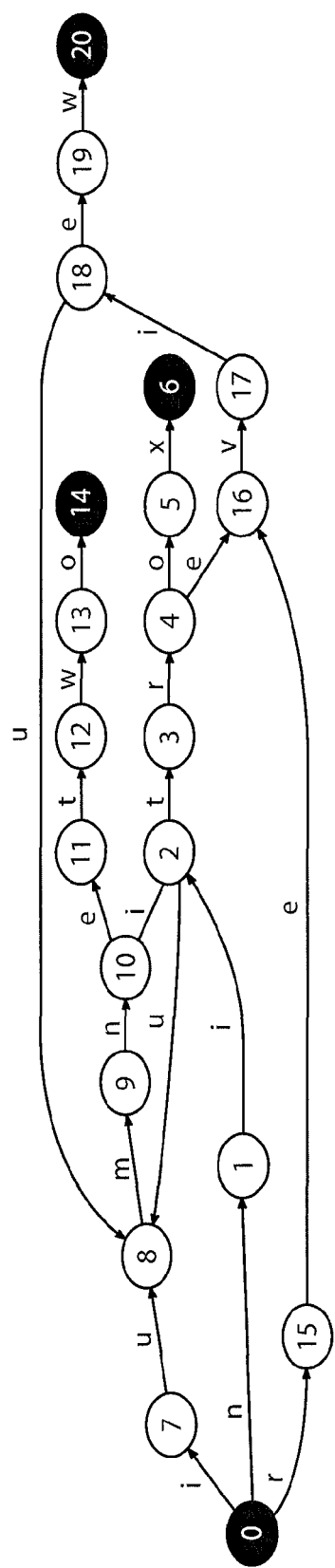
FIGS. 18A-C are graphs of a CARPA-DFA and corresponding CARPA-NFA, respectively, in accordance with embodiments of the present invention.
Figure 18B:
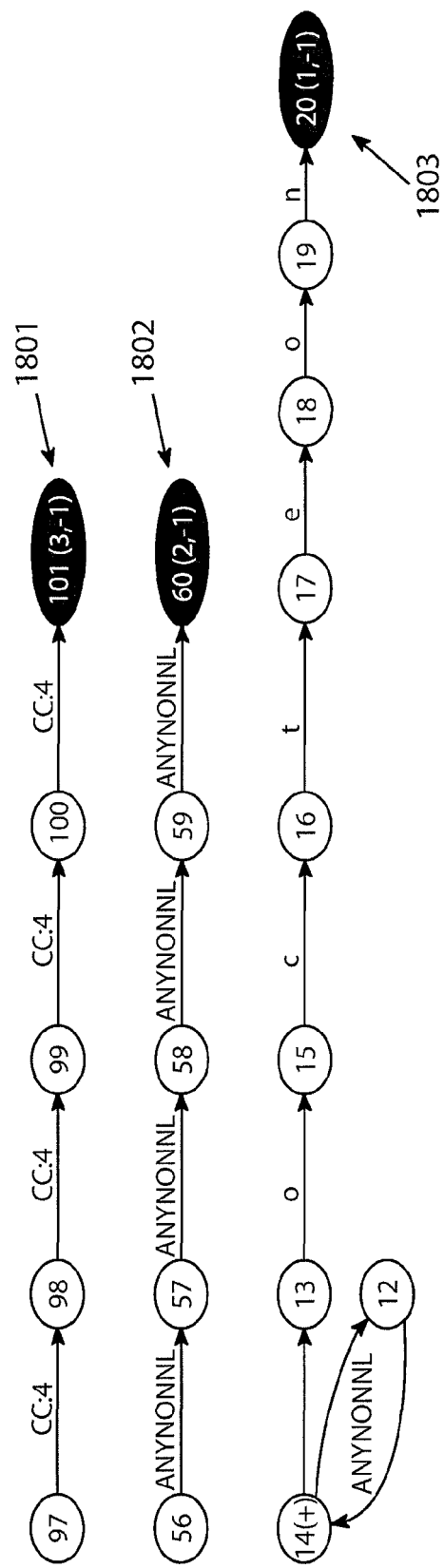
Figure 18C:
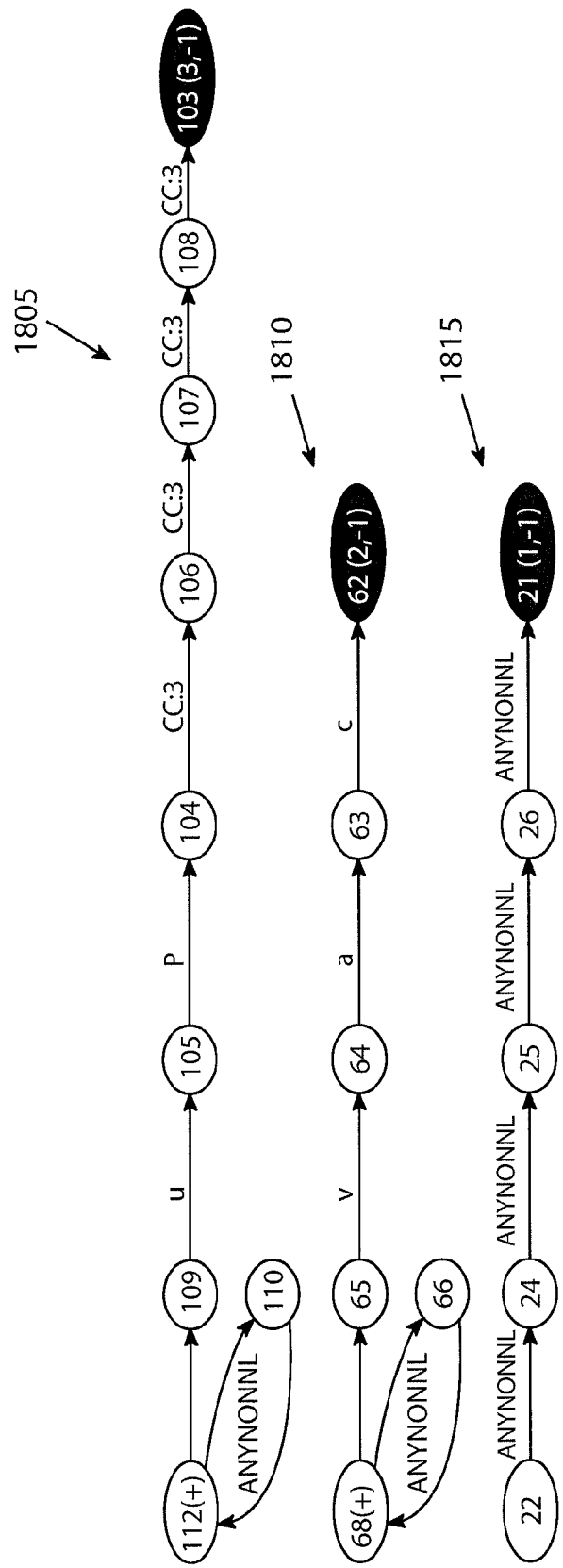

FIG. 18A shows a Stage One DFA, FIG. 18B shows Stage Two NFAs and FIG. 18C shows Stage Three reverse NFAs for the following patterns "[^\n]{4}nitrox.*octeon," "cav.*iumnetworks[^\n]{4}," "[^<]{4}pu.*review[^>]{4}."

Assume the following payload "<<<<nitroxandocteonchipsfromcavviumnetworksssssspuureview<<<<" for processing. Table 4 below shows part of each pattern processed in different stages of CARPA processing. It refers FIG. 18A, 18B & 18C.

| Patterns | Stage One sub-pattern (FIG. 18A) | Stage Two sub-pattern | Stage Three sub-pattern |
|---|---|---|---|
| [^\n]{4}nitrox.*octeon | nitrox | .*octeon (1803) | [^\n]{4} (1815) |
| cav.*iumnetworks[^\n]{4} | iumnetwo | [^\n]{4} (1802) | cav.* (1810) |
| [^<]{4}pu.*review[^>]{4} | review | [^>]{4} (1801) | [^<]{4}pu.* (1805) |

As shown in the FIG. 18A, "nitrox" part of pattern 1, "iumnetwo" part of the pattern 2 and "review" part of the pattern 3 are processed using CARPA Stage One DFA. It should be noted that the symbol "ANYNONNL" represents any character except a "new line" character, which is represented by "." in a pattern.

The following is a Transition table (Table 5) used during transitions between stages (i.e., from one stage to a next stage).

| | Stage 1-A End node | Stage 1-B String to match | Stage 2 NFA start node for trailing part | Stage 3 Reverse NFA start node for leading part |
|---|---|---|---|---|
| Pattern # 1 | 6 | None | 14 | 22 |
| Pattern # 2 | 14 | "rks" | 56 | 68 |
| Pattern # 3 | 20 | None | 97 | 112 |

As shown above, post Stage One processing has the following variants:
1. If the Stage One DFA part is string like, then the pattern matches the 5 remaining part of the string, if any, referred as Stage 1-B processing using string comparison.

2. If the Stage One DFA part of the pattern is string like, i.e., length of the Stage One DFA part is known, then the pattern only traverses a partial reverse NFA for the prefix part in Stage Three processing. By partial, it is meant as optimization, i.e., part of pattern already matched during Stage 1 processing is not inspected again in input payload.

3. The pattern traverses the trailing (subsequent) part of the pattern using the partial forward NFA during CARPA Stage 2 processing.

For the payload given above, CARPA Stage One DFA reports the following three matches: i) end node 6 at offset 9, ii) end node 14 at offset 39, and iii) end node 20 at offset 55.

The following is the post Stage One procedure in multi pass mode using Table 5 as a reference. For a first match in Stage One, end node '6' has no string to match (as per Table 5 under column Stage 1-B). Also, because there is a partial reverse NFA for the leading part of the pattern and the pattern starts at node 22, Stage Three starts processing the reverse NFA using the payload at offset '3' (which is obtained by subtracting the string length of Stage One, which is 6 from the offset 9). The reverse NFA start state={22} and processing continues as follows:
on '<'={24}
on '<'={25}
on '<'={26}
on '<'={21}

At this point a partial reverse NFA reaches the marked node and hence the leading part verification is completed. As the leading part is matching, the trailing part of the pattern is processed using a forward NFA starting at node 14 from offset 10 during CARPA Stage 2 processing. The NFA start state={14} and processing continues as follows:
on 'a'={12, 13}
on 'n'={12, 13}
on 'd'={12, 13}
on 'o'={12, 15}
on 'c'={12, 16}
on 't'={12, 17}
...
on 'n'={12, 20}

At this point the marked node is reached and hence a pattern 1 match is reported. For the second match reported by CARPA DFA Stage One, end node 14 has a string "rks" to match (as per Table 5, column Stage 1-B). The payload is matched against the string "rks" at offset 40. Because the payload is matched with the string "rks" Stage Two and Stage Three processing continues.

Because there is a partial reverse NFA for the leading part of the pattern and pattern matching starts at node 68, Stage Three starts processing the reverse NFA using the payload at offset '31' (which is obtained by subtracting the string length of Stage One, which is 8 from the offset 39). The reverse NFA start state={68} and processing continues as follows:
on 'v'={65, 66}
on 'v'={64, 66}
on 'a'={63, 66}
on 'c'={62, 66}

At this point a partial reverse NFA has reached the marked node and hence the leading part verification is done. As the leading part is matching, the trailing part of the forward NFA is processed at node 56 from offset 43 (which is obtained by adding the Stage 1 end offset 39 to the string length matched by Stage 1B) during CARPA NFA Stage 1B processing. The NFA start state={56} and processing continues as follows:
on 's'={57}
on 's'={58} on 's'={59}
on 's'={60}
At this point the marked node is reached and hence a pattern 2 match is reported.

For the third match reported by CARPA DFA Stage One, end node '20' has no string to match, as per Table 5 (under column Stage 1-B). Because there is a partial reverse NFA for the leading part and the leading part starts at node 112, Stage Three starts processing the reverse NFA using the payload at offset '49' (which is obtained by subtracting the string length of Stage One, which is 6 from the offset 55). The reverse NFA start state={112} and processing continues as follows:
on 'u'={109, 110}
on 'u'={105, 110}
on 'p'={104, 110}
on 's'={106, 110}
on 's'={107, 110}
on 's'={108, 110}
on 's'={103, 110}

At this point the partial reverse NFA reaches the marked node and hence the leading part verification is done. As the leading part is matching, the trailing part of the forward NFA is processed at node 97 from offset 56 as part of CARPA Stage Two processing. The NFA start state={97} and processing continues as follows:
on '<'={98}
on '<'={99}
on '<'={100}
on '<'={101}

At this point the marked node is reached and hence a pattern 3 match is reported.

An end offset relates to the end position of a matched pattern relative to an input string. Generally, an end offset of a matched pattern is easy to detect and report because once a pattern is matched using one of the finite automata described above, the position of the end matching character of the pattern relative to an input string may easily be recorded.

Traditionally, finite automata only needed to report the existence or non-existence of a given pattern within an input string and reported the end offset of the matched pattern for processing. With emerging applications, a start offset (e.g., the position of the first matching character of a pattern) has become important in Deep Packet Inspection systems. For instance, applications may need to scrub a portion of an input packet before further forwarding or the application may need to do another lookup or processing using the data in an input packet.

However, the start offset of a matched pattern is not easily discernible. For example, finite automata walk input strings through a graph once a character of the input string matches the first character of a given pattern to be monitored. However, matching of a first character does not necessarily mean that the following characters will match with the given pattern. Thus, finite automata generally do not record the position of a matching first character because this would unnecessarily waste memory resources.

A regex capture group refers to a sub-expression within a given pattern. For example, given pattern "abc(x.*z)de(m.*o) fgrst" contains two capture groups: i) "x.*z" and ii) "m.*o". In other words, the capture groups are patterns of interest nested within a larger pattern of interest.

A regex back reference refers to a substring previously encountered in the target text. In other words, a back reference is a reference to a previous sub-expression that has already been matched. The reference is to what the sub-expression matched, not to the expression itself. A back reference consists of the escape character '\' followed by a digit '1' to '9'. In some instances the digit may be greater than '9'. The expression '\1' refers to the first sub-expression, '\2' to the second, etc. For example, the expression (.*)\1 matches any string that is repeated about its mid-point. For example, abcabc or xyzxyz. A back reference to a sub-expression that did not participate in any sub-expression matches the null string.

An assertion is a test on the characters following or preceding the current matching point that does not actually consume any characters. The simple assertions are coded as \b, \B, \A, \Z, \z, ^ and $. More complicated assertions are coded as subpatterns. There are two kinds: those that look ahead of the current position in the subject string, and those that look behind it.

An assertion subpattern is matched in the normal way, except that it does not cause the current matching position to be changed. Lookahead assertions start with (?= for positive assertions and (?! for negative assertions. For example, \w+(?=;) matches a word followed by a semicolon, but does not include the semicolon in the match, and foo(?!bar) matches any occurrence of "foo" that is not followed by "bar". Note that the apparently similar pattern (?!foo)bar does not find an occurrence of "bar" that is preceded by something other than "foo"; it finds any occurrence of "bar" whatsoever, because the assertion (?!foo) is always TRUE when the next three characters are "bar". A lookbehind assertion is needed to achieve this effect.

Lookbehind assertions start with (?<= for positive assertions and (?<! for negative assertions. For example, (?<!foo) bar does find an occurrence of "bar" that is not preceded by "foo". The contents of a lookbehind assertion are restricted such that all the strings it matches must have a fixed length. However, if there are several alternatives, they do not all have to have the same fixed length. Thus (?<=bullock|donkey) is permitted, but (?<!dogs?|cats?) causes an error at compile time. Branches that match different length strings are permitted only at the top level of a lookbehind assertion. This is an extension compared with Perl 5.005, which requires all branches to match the same length of string. An assertion such as (?<=ab(c|de)) is not permitted, because its single top-level branch can match two different lengths, but it is acceptable if rewritten to use two top-level branches: (?<=abc|abde). The typical implementation of lookbehind assertions is, for each alternative, to temporarily move the current position back by the fixed width and then try to match. If there are insufficient characters before the current position, the match is deemed to fail. Lookbehinds in conjunction with once-only subpatterns can be particularly useful for matching at the ends of strings.

Several assertions (of any sort) may occur in succession. For example, (?<=\d{3})(?<!999)foo matches "foo" preceded by three digits that are not "999". Notice that each of the assertions is applied independently at the same point in the subject string. First there is a check that the previous three characters are all digits, then there is a check that the same three characters are not "999". This pattern does not match "foo" preceded by six characters, the first of which are digits and the last three of which are not "999". For example, it doesn't match "123abcfoo". A pattern to do that is (?<=\d{3} . . . )(?<!999)foo.

This time the first assertion looks at the preceding six characters, checking that the first three are digits, and then the second assertion checks that the preceding three characters are not "999".

Assertions can be nested in any combination. For example, (?<=(?<!foo)bar)baz matches an occurrence of "baz" that is preceded by "bar" which in turn is not preceded by "foo", while (?<=\d{3} . . . (?<!999))foo is another pattern which matches "foo" preceded by three digits and any three characters that are not "999".

Assertion subpatterns are not capturing subpatterns, and may not be repeated, because it makes no sense to assert the same thing several times. If any kind of assertion contains capturing subpatterns within it, these are counted for the purposes of numbering the capturing subpatterns in the whole pattern. However, substring capturing is carried out only for positive assertions, because it does not make sense for negative assertions.

Figure 19A:
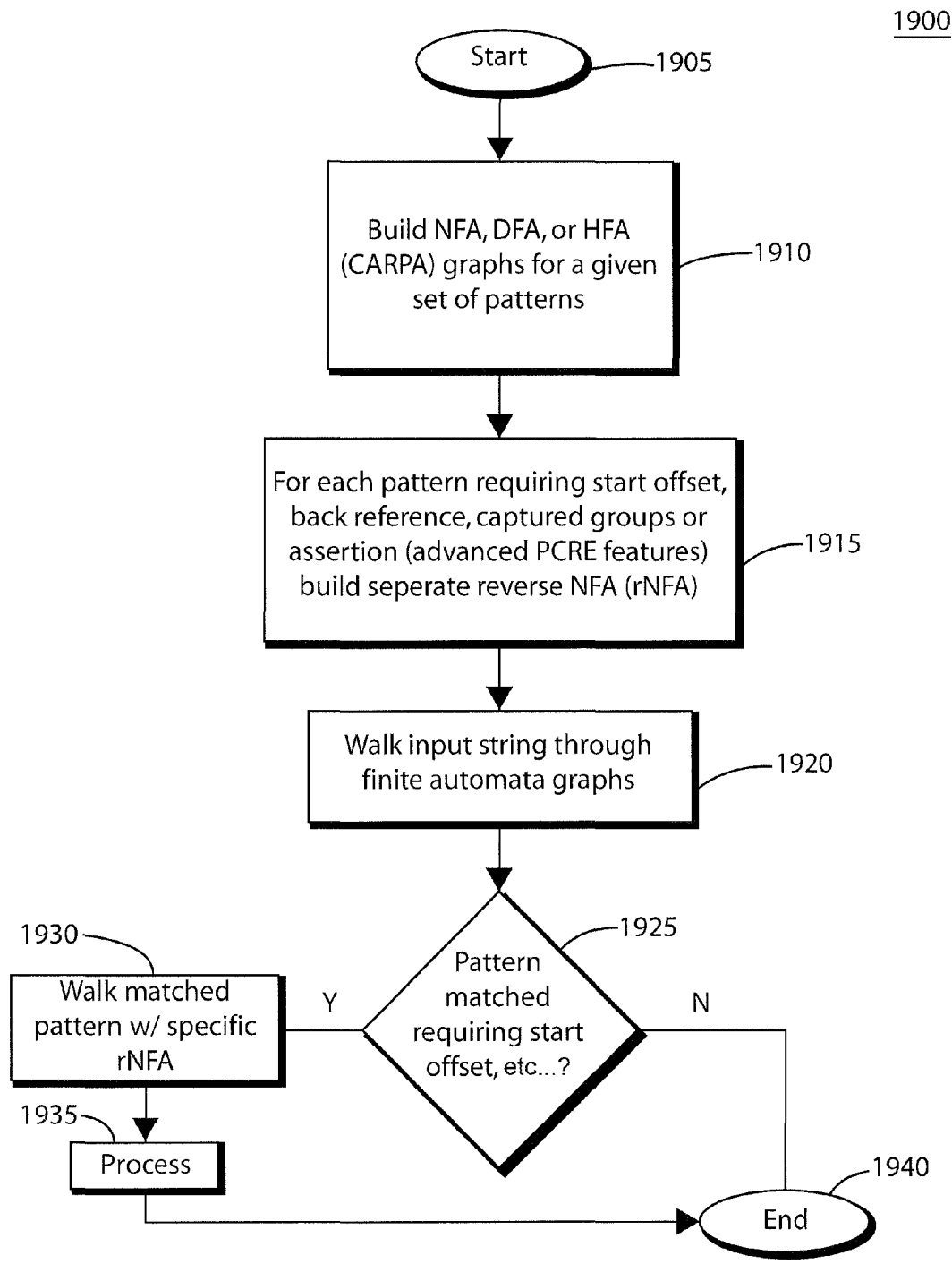
FIG. 19A is a flow diagram of a method for processing advanced regular expressions.

FIG. 19A is a flow diagram of a method 1900 for processing advanced regular expressions. The method begins at step 1905. At 1910, finite automata such as an NFA, DFA, or CARPA are built for a given set of patterns, as described above. At 1915, for each pattern requiring a start offset, back reference, captured group, or assertion, a separate reverse NFA (rNFA) is built per pattern. Upon receiving an input string, at 1920, the input string is processed through the built finite automata (examples below are illustrated using CARPA processing as described above). At 1925, it is determined whether a matched pattern requires a start offset, back reference, captured group, or assertion. If not, the method ends at 1940. If so, the method, at 1930, walks the matched patterns through a rNFA built for the specific matched pattern. At 1935, the results of the rNFA walk are processed and, at 1940, the method ends.

Figure 19B:
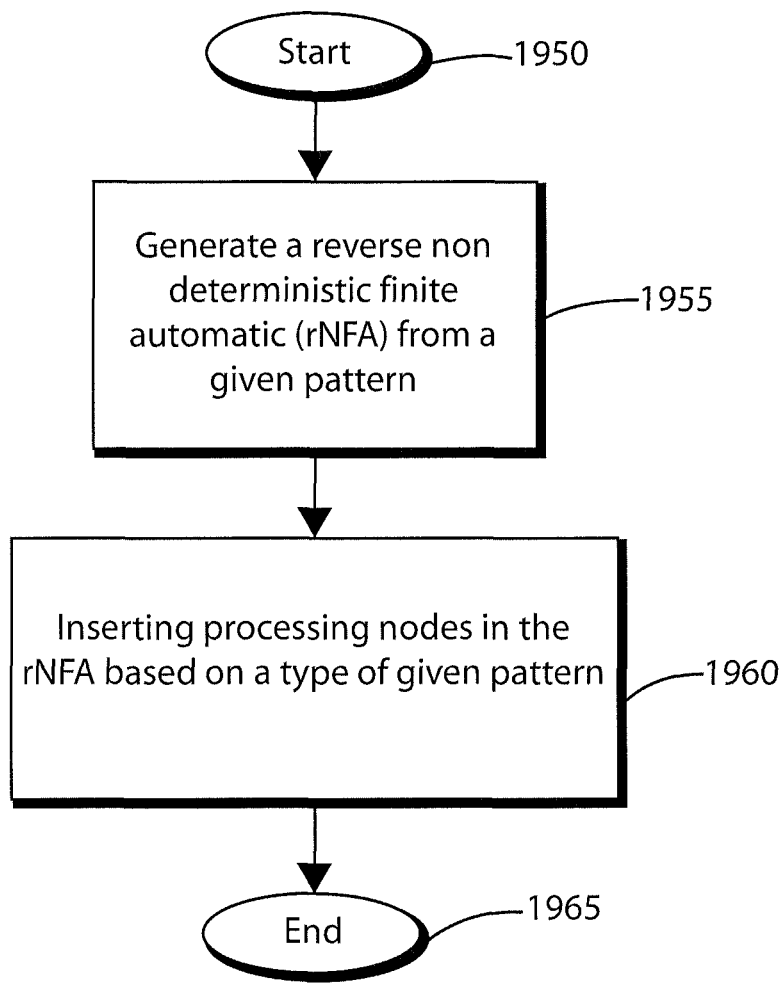
FIG. 19B is a flow diagram of a method for generating a reverse non-deterministic finite automata (rNFA) from an advanced regular expression.

FIG. 19B is a flow diagram of a method 1945 for generating an rNFA from an advanced regular expression. The method begins at step 1950. At 1955, a rNFA is generated from a given pattern. At 1960, processing nodes are inserted into the rNFA based on a type of the given pattern. At 1965, the method ends.

Figures 1, 20A:
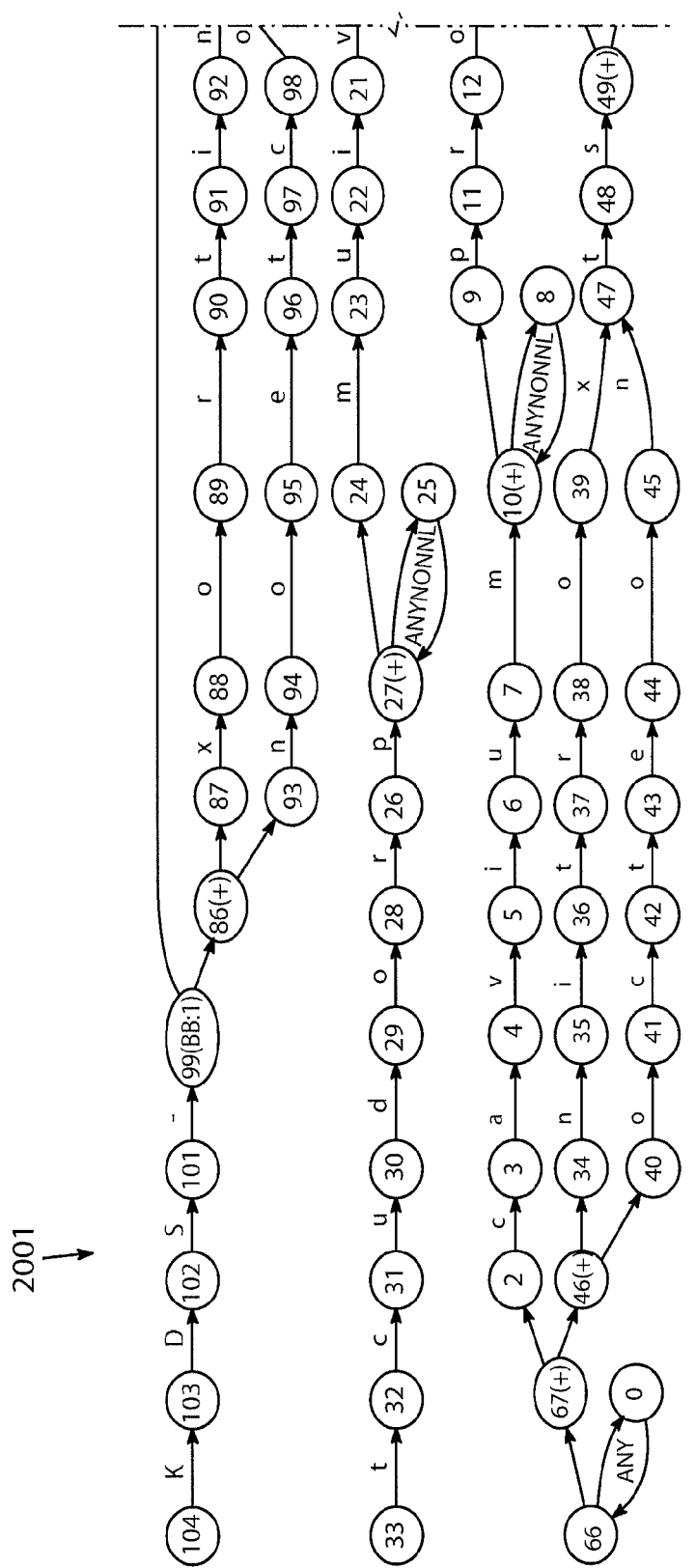
FIG. 20A-B are graphs of an example CARPA-DFA, corresponding CARPA-NFA, and reverse NFA, respectively, in accordance with an embodiment of the present invention.
Figures 2, 20A:
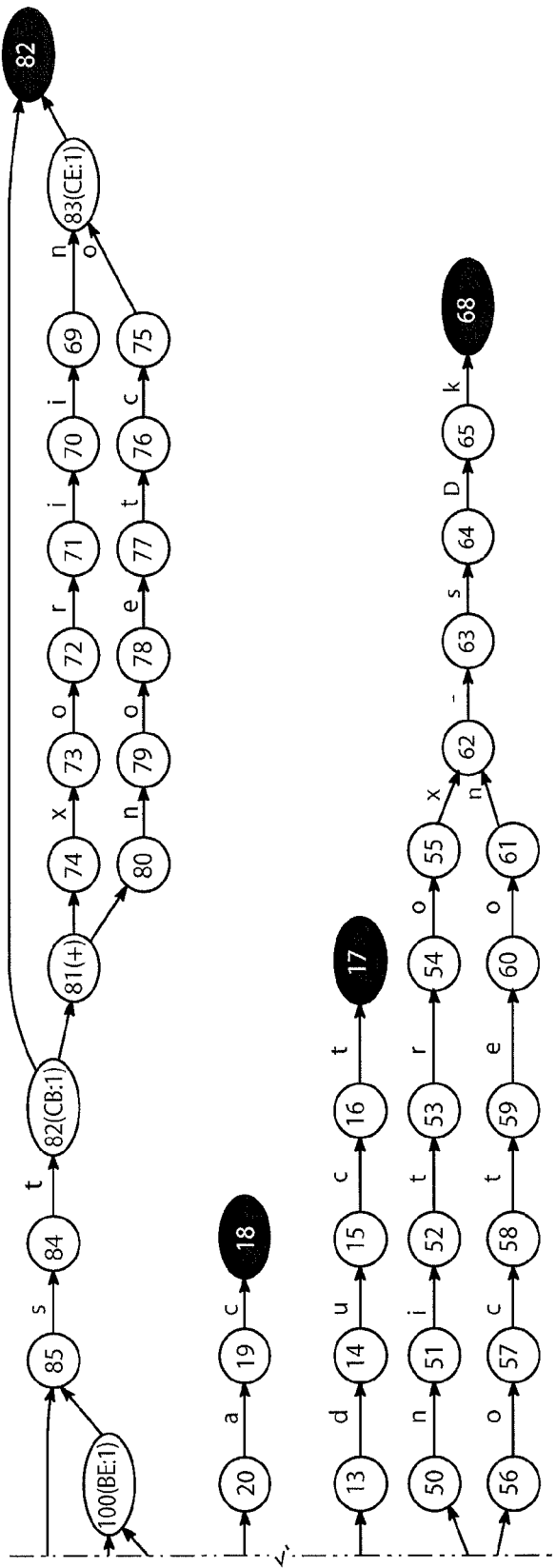
Figure 20B:
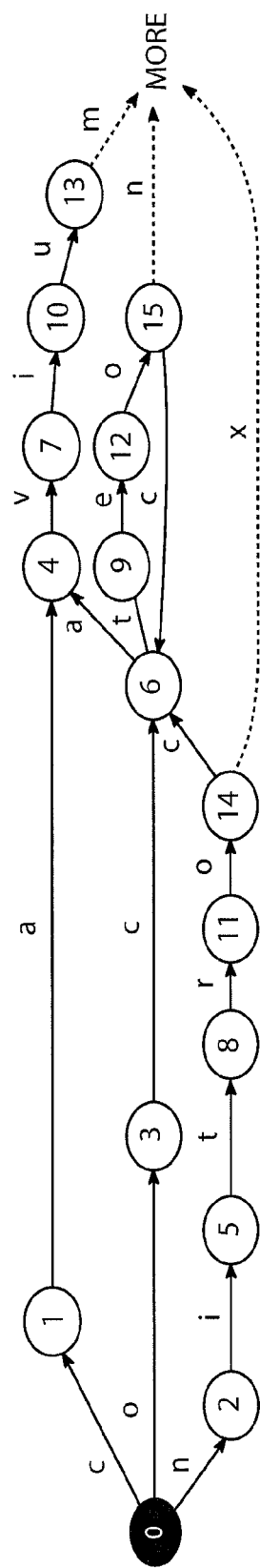

FIG. 20A shows a NFA graph 2000 for a pattern set containing the patterns "{t}cavium.*product" and "(nitrox|octeon)'s\1-SDK." FIG. 20A also shows an rNFA graph 2001 for the above patterns. The rNFA for the first pattern starts at node '33' and for the second pattern the rNFA starts at node '104'. FIG. 20B shows a DFA (stage 1 CARPA) graph for the above pattern set. It should be noted that each node may have an associated node type that indicates to a walker an action to take. For example, a back reference BEGIN (BBEGIN) node and capture BEGIN (CBEGIN) node indicate, respectively, to the walker when to perform a back reference or when to start capturing. In addition, a back reference END (BEND) node and a capture END (CEND) node indicate, respectively, to the walker when to stop performing a back-reference or capture. Further, an ASSERT node type indicates that an assertion should be performed.

In an example, a payload is received containing the following text: "caviumnetworksocteonproductnitrox'socteon-SDKocteon'socteon-SDK"

As shown in the FIG. 20A, the back-reference '\1' of the second pattern is replaced with a corresponding capture group "(nitrox|octeon)" and the NFA is created for the pattern "(nitrox|octeon)'s(nitrox|octeon)-SDK" and is converted into a CARPA DFA, as shown in FIG. 20B, to find the pattern within the payload.

A CARPA matching procedure for the pattern set and received payload is described below. Given the payload received, the DFA (stage 1 CARPA), shown in FIG. 20B, finds the following matches in the payload:

1. Match-1
Pattern 1 at offset 26 (corresponding NFA marked node is 17)

2. Match-2
Pattern 2 at offset 44 (corresponding NFA marked node is 66)

3. Match-3
Pattern 3 at offset 62 (corresponding NFA marked node is 66).

It should be noted that the above mentioned offsets refer to a position of a character within the received payload. Once the DFA finds the above matches in the received payload, the second stage of CARPA processing begins for each match found.

For Match-1, as shown in FIG. 20A, the corresponding NFA marked node '17' shows that a rNFA walk is needed and the start node of the rNFA walk is node '33.' Based on the match, it is known that the rNFA is being done for a start offset and rNFA processing occurs as described below.

A rNFA algorithm starts to run at node '33' and runs backwards starting at offset 26 of the received payload and continues as follows:
on 't'={32}
on 'c'={31}
on 'u'={30}
on 'd'={29}
on 'o'={28}
on 'r'={26}
on 'p'={24, 25}
on 'n'={24, 25}
. . .
on 'c'={18}

At this point, the rNFA found a match and hence the final match of the pattern is reported using the offset of 'c' (0) and offset of 't' (26) as the start and end offsets of the Match-1.

For Match-2, as shown in FIG. 20A, the corresponding NFA marked node 66 shows that a rNFA walk is needed and the start node of the rNFA walk is '104.' Based on the match, it is known that the rNFA is being done for back-references and the rNFA processing occurs as described below.

A rNFA algorithm starts to run at node '104' and runs backwards starting at offset 44 of the received payload and continues as follows:
on 'K'={103}
on 'D'={102}
on'S'={101}
on '-'={99}

Node '99' is a BBEGIN node. Because there is no running back-reference captured and back-reference '1' is not valid, the current offset '40' is recorded as an end offset and a capturing field is set and moved to nodes {87, 93}. Processing then continues as follows:
on 'n'={94}
on 'o'={95}
on 'e'={96}
on 't'={97}
on 'c'={98}
on 'o'={100}

Node '100' is a BEND node. Because back-reference '1' is being captured, the previous offset '35' is recorded as a start offset of back-reference '1' and moved to {85}. Processing then continues as follows:
on 's'={84}
on '''={82}

Node '82' is a CBEGIN node. Because back-reference '1' is valid, the back-reference matching procedure starts. An offset of the back reference to the match (moff) and the length of the back reference (mlen) to the match are set to 40 and 6 respectively. Since the capture '1' is not valid, the current offset '32' is recorded as an end offset of capture '1' and moved to {74, 80}. Processing then continues with 'x'={73}. Here the current character 'x' is not same as the corresponding back-reference character 'n' at offset 40. Thus, the thread terminates and no match is reported.

For Match-3, as shown in FIG. 20A, the corresponding NFA marked node 66 shows that a reverse NFA walk is needed and the start node of the reverse NFA walk is '104.' Based on the match, it is known that the rNFA is being done for a back references and the rNFA processing occurs as described below.

A rNFA algorithm starts to run at node '104' and runs backwards starting at offset 62 of the received payload and continues as follows:
on 'K'={103}
on 'D'={102}
on 'S'={101}
on '-'={99}

Node '99' is a BBEGIN node. Because there is no running back-reference captured and back-reference '1' is not valid, the current offset '58' is recorded as an end offset and a capturing field is set and moved to nodes {87, 93}. Processing then continues as follows:
on 'n'={94}
on 'o'={95}
on 'e'={96}
on 't'={97}
on 'c'={98}
on 'o'={100}

Node '100' is a BEND node. Since back-reference '1' is being captured, the previous offset '53' is recorded as start offset of back-reference '1' and moved to {85} and processing continues as follows:
on 's'={84}
on '''={82}

Node '82' is a CBEGIN node. Because back-reference '1' is valid, the back-reference matching procedure starts. An offset of the back reference to the match (moff) and the length of the back reference (mlen) to the match are set to 58 and 6 respectively. Further, because the capture '1' is not valid, the current offset '50' is recorded as end offset of capture '1' and move to {74, 80}. Then on 'n'={79} it is determined that the back-reference character at offset 58 is also 'n,' Thus, mlen and moff are decremented. On 'o'={78} the back-reference character at offset 57 is also 'n.'Thus, mlen and moff are further decremented. This processing continues until character 'o'. Then on 'o'={83}, node '83' is determined to be a CEND node. Because mlen is zero, the back-reference matches the capturing part of the pattern and match is validated. The current offset '45' is then recorded as the start offset of capture '1' and moved to {68}. Node 68 is a marked node and hence a match is reported. The matching report states that the second pattern is matched from offsets 45 to 62 and the first capture group is from offsets 45 to 50.

Figure 21A:
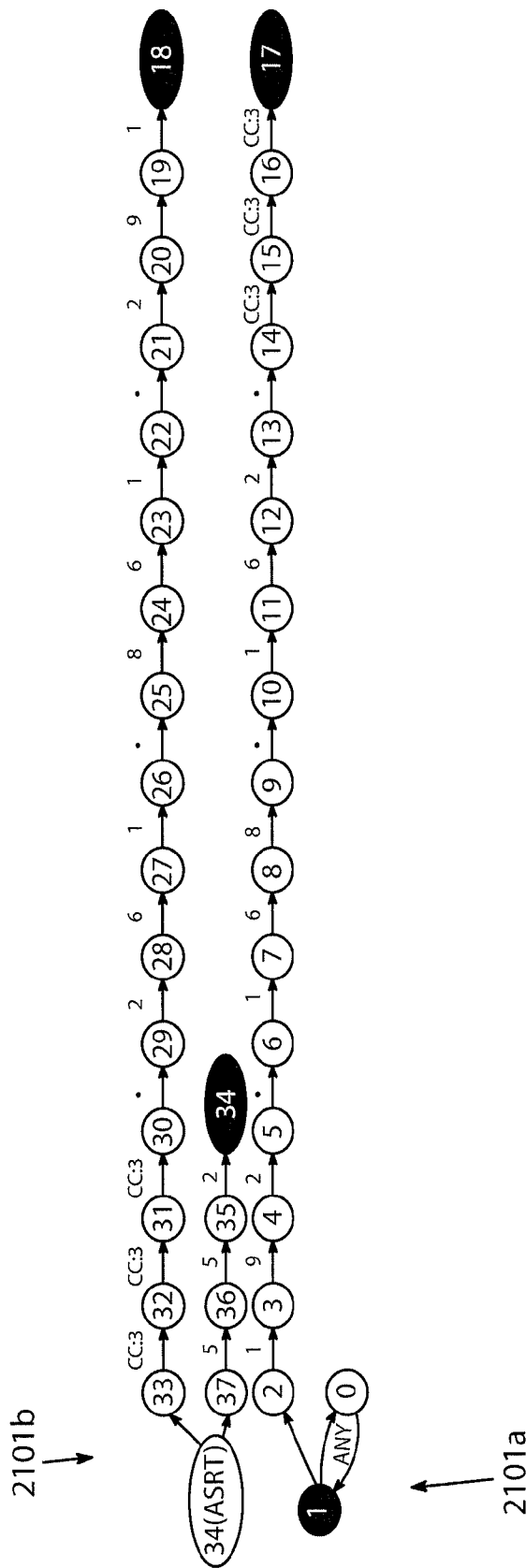
FIG. 21A-B are graphs of an example CARPA-DFA, corresponding CARPA-NFA, and reverse NFA, respectively, in accordance with an embodiment of the present invention.
Figure 21B:
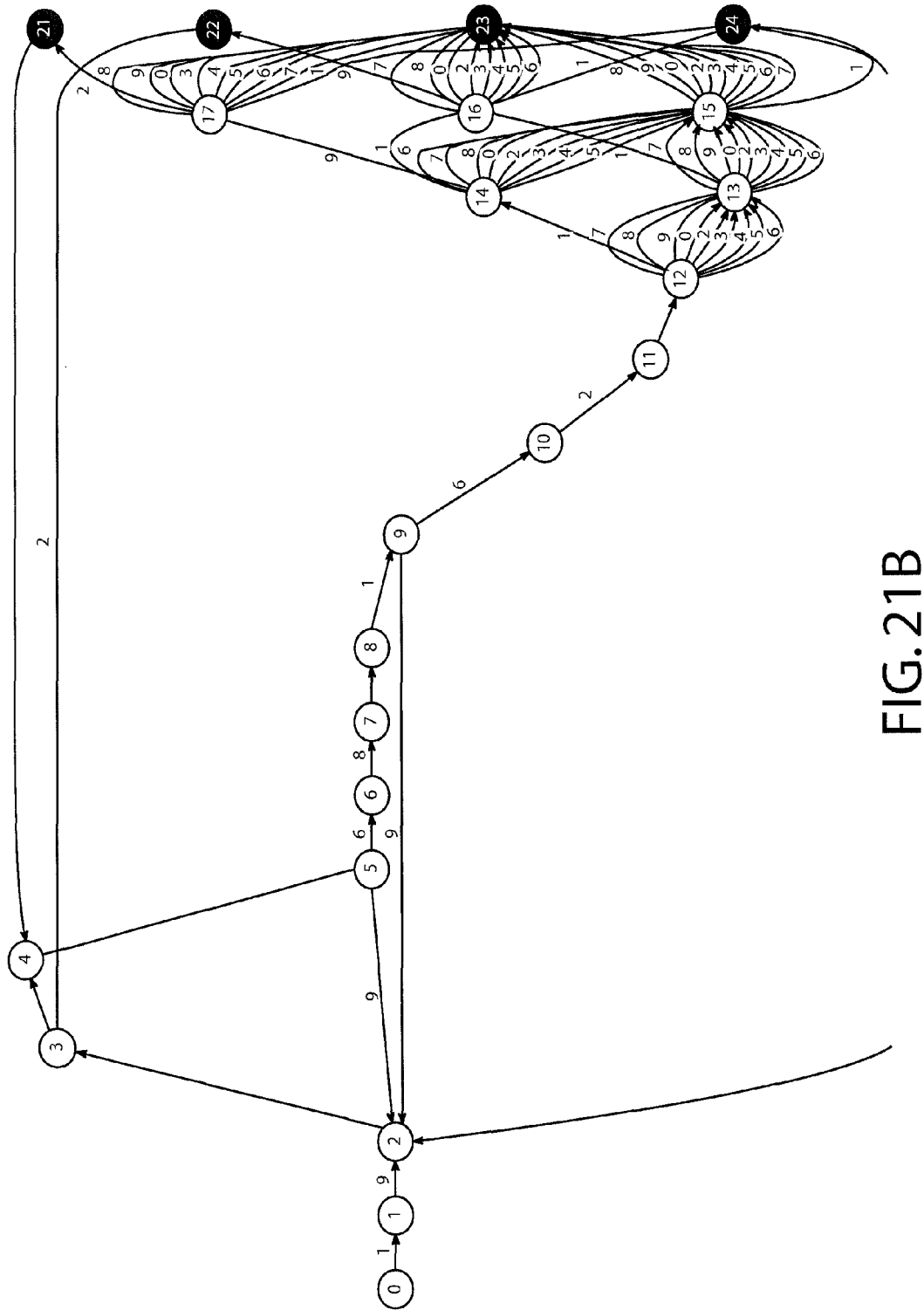

FIG. 21A shows a NFA graph 2101a for a pattern set containing the pattern "192\.168\.162\.\d\d(?<!255)." FIG. 21A also shows a rNFA graph 2101b for the above pattern. The rNFA for the pattern starts at node '34.' FIG. 21B shows a DFA (stage 1 CARPA) graph for the above pattern set.

In an example, a payload is received containing the text "192.168.162.255,192.168.162.101." A CARPA matching procedure for the pattern set and received payload is described below. Given the payload received, the DFA (stage 1 CARPA), shown in FIG. 20B, finds the following matches in the payload:

1. Match-1
Pattern 1 at offset 14 (corresponding NFA marked node is 17)
2. Match-2
Pattern 1 at offset 30 (corresponding NFA marked node is 17).

It should be noted that the above mentioned offsets refer to a position of a character within the received payload. Once the DFA finds the above matches in the received payload, the second stage of CARPA processing begins for each match found.

For Match-1, as shown in FIG. 21A, the corresponding NFA marked node '17' shows that a rNFA walk is needed and the start node of the rNFA walk is node '34.'Based on the match, it is known that the rNFA is being done for an assertion and rNFA processing occurs as described below.

A rNFA algorithm starts to run at node '34' and runs backwards starting at offset 14 of the received payload. Because node '34' is a negative look behind an ASSERT node, the ASSERT NFA starting at node '37' is run backwards, before moving forward from the node '33.' Processing then continues as follows:
ASSERT NFA START STATES={37}
on '5'={36}
on '5'={35}
on '2'={38}

At this point, ASSERT NFA finds a match. As the assertion is a negative assertion, the NFA walk is not continued from node 33 and is considered as false positive.

For Match-2, as shown in the FIG. 21A, the corresponding NFA marked node '17' shows that a rNFA walk is needed and the start node of the reverse NFA walk is node '34.' Based on the match, it is know that the rNFA walk is being done for an assertion and rNFA processing starts to run at node '34' and runs backwards starting at offset 30. Because node '34' is a negative look behind an ASSERT node, the ASSERT NFA starting at node '37' is run backwards, before moving forward from node '33.' Processing then continues as follows:
ASSERT NFA START STATES={37}
on '1'={ }

At this point, ASSERT NFA cannot find a match. Because the assertion is a negative assertion, the NFA walk is continued from node 33 and continues as follows:
RNFA START STATES={33}
on '1'={32}
on '0'={31}
on '1'={30}
on '.'={29}
on '2'={28}
...
...
on '9'={19}
on '1'={18}

At this point, the rNFA finds a match and the final match of the pattern is reported.

It should be understood that the block, flow, network diagrams may include more or fewer elements, be arranged differently, or be represented differently. It should be understood that implementation may dictate the block, flow, network diagrams and the number of block, flow, network diagrams illustrating the execution of embodiments of the invention.

It should be understood that elements of the block, flow, network diagrams described above may be implemented in software, hardware, or firmware. In addition, the elements of the block, flow, network diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and other non-transitory forms of computer readable medium. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
in a processor of a security appliance coupled to a network:
walking an input of a sequence of characters through a deterministic finite automata (DFA) graph generated for at least one given regular expression pattern to enable inspection of packet content, the at least one given regular expression employed to detect a security breach or an intrusion; and
at a marked node of the DFA graph, the marked node being a node that marks a match of the at least one given regular expression pattern:
based on a specific type of the at least one given regular expression pattern matching at the marked node, walking the input sequence of characters through a reverse non-deterministic finite automata (rNFA) graph by walking the input sequence of characters backwards through the rNFA graph beginning from an offset of the input sequence of characters associated with the marked node, the rNFA graph generated for the at least one given regular expression pattern and having at least one processing node inserted therein, the at least one processing node inserted into the rNFA graph based on the specific type of the at least one regular expression pattern; and
based on the specific type of the at least one given regular expression pattern not matching at the marked node, reporting the match of the at least one given regular expression pattern.

2. The method of claim 1 wherein the specific type of the at least one given regular expression pattern includes at least one of the following: start offset, back reference, capture group, and assertion, or a combination thereof.

3. The method of claim 1 further comprising determining a start offset of the given regular expression pattern upon walking the sequence of characters through the rNFA graph.

4. The method of claim 3 wherein determining includes marking an offset of the last character accepted by the rNFA graph as the start offset of the given regular expression pattern and reporting the start offset.

5. The method of claim 1 wherein the specific type of the at least one given regular expression pattern is a back reference type and further comprising walking the rNFA graph from the offset of the input sequence of characters associated with the marked node and determining whether the given regular expression pattern matched by the DFA graph includes a possible matching back-reference.

6. The method of claim 5 further comprising determining at least one of the following: a start offset of the possible matching back-reference, end offset of the possible matching back-reference, and length of the possible matching back-reference.

7. The method of claim 6 further comprising matching the possible matching back-reference with an associated capture group of the at least one given regular expression pattern, the associated capture group being determined by the input of the sequence of characters.

8. The method of claim 7 further comprising determining at least one of the following: a start offset of the associated capture group, end offset of the associated capture group, and length of the associated capture group.

9. The method of claim 7 further comprising matching the possible matching back-reference with at least one other possible matching back-reference, the possible matching back-reference and the at least one other possible matching back-reference associated with a same capture group.

10. The method of claim 9 further comprising determining a non-matching back-reference of the given regular expression pattern in an event the possible matching back-reference does not match with the at least one other possible matching back-reference.

11. The method of claim 5 wherein to determine that the given regular expression pattern is matched by the DFA graph includes matching the possible matching back-reference with an associated capture group by determining at least one of the following: that a length of the possible matching back-reference and the associated capture group are equivalent and that a character string of the possible matching back-reference and the associated capture group are equivalent.

12. The method of claim 1 further comprising walking the rNFA graph from the offset of the input sequence of characters associated with the marked node and determining whether the given regular expression pattern matched by the DFA graph satisfies an assertion of the given regular expression pattern.

13. The method of claim 12 wherein determining whether the given regular expression pattern satisfies the assertion includes determining a subset of the given regular expression pattern, the subset of the given regular expression pattern corresponding to the assertion of the given regular expression pattern.

14. The method of claim 13 further comprising determining whether the subset of the given regular expression pattern is matched by the rNFA graph.

15. The method of claim 14 further comprising:
based on the assertion being a positive assertion, reporting the assertion is satisfied in an event the subset of the given regular expression pattern is matched by the rNFA graph.

16. The method of claim 14 further comprising:
based on the assertion being a negative assertion, reporting an unsatisfied assertion in an event the subset of the given regular expression pattern is matched by the rNFA graph.

17. The method of claim 1 wherein the rNFA graph is generated for the specific type of the at least one given regular expression pattern.

18. The method of claim 1 wherein the rNFA graph is generated for a portion of the at least one given regular expression pattern.

19. A security appliance coupled to a network, the security appliance comprising:
a processor implemented in hardware configured to:
walk an input of a sequence of characters through a deterministic finite automata (DFA) graph generated for at least one given regular expression pattern to enable inspection of packet content, the at least one given regular expression employed to detect a security breach or an intrusion; and at a marked node of the DFA graph:
based on a specific type of the at least one given regular expression pattern matching at the marked node, walk the input sequence of characters through a reverse non-deterministic finite automata (rNFA) graph by walking the input sequence of characters backwards through the rNFA graph beginning from an offset of the input sequence of characters associated with the marked node, the rNFA graph generated for the at least one given regular expression pattern and having at least one processing node inserted therein, the at least one processing node inserted into the rNFA graph based on the specific type of the at least one regular expression pattern; and based on the specific type of the at least one given regular expression pattern not matching at the marked node, reporting the match of the at least one given regular expression pattern.

20. The security appliance of claim 19 wherein the specific type of the at least one given regular expression pattern includes at least one of the following: start offset, back reference, capture group, and assertion.

21. The security appliance of claim 19 wherein the processor is further configured to determine a start offset of the given regular expression pattern upon walking the sequence of characters through the rNFA graph.

22. The security appliance of claim 21 wherein the processor is further configured to mark an offset of the last character accepted by the rNFA graph as the start offset of the given regular expression pattern and reporting the start offset.

23. The security appliance of claim 19 wherein the processor is further configured to walk the rNFA graph from the offset of the input sequence of characters associated with the marked node and determine whether the given regular expression pattern matched by the DFA graph includes a possible matching back-reference.

24. The security appliance of claim 23 wherein the specific type of the at least one given regular expression pattern is a back reference type and the processor is further configured to determine at least one of the following: a start offset of the possible matching back-reference, end offset of the possible matching back-reference, and length of the possible matching back-reference.

25. The security appliance of claim 24 wherein the processor is further configured to match the possible matching back-reference with an associated capture group of the at least one given regular expression pattern, the associated capture group being determined by the input of the sequence of characters.

26. The security appliance of claim 25 wherein the processor is further configured to determine at least one of the following: a start offset of the associated capture group, end offset of the associated capture group, and length of the associated capture group.

27. The security appliance of claim 25 wherein the processor is further configured to match the possible matching back-reference with at least one other possible matching back-reference, the possible matching back-reference and the at least one other possible matching back-reference associated with a same capture group.

28. The security appliance of claim 27 wherein the processor is further configured to determine a non-matching back-reference of the given regular expression pattern in an event the possible matching back-reference does not match with the at least one other possible matching back-reference.

29. The security appliance of claim 23 wherein the processor is further configured to determine at least one of the following: whether a length of the possible matching back-reference and an associated capture group are equivalent and whether a character string of the possible matching back-reference and the associated capture group are equivalent.

30. The security appliance of claim 19 wherein the processor is further configured to walk the rNFA graph from the offset of the input sequence of characters associated with the marked node and determine whether the given regular expression pattern matched by the DFA graph satisfies an assertion of the given regular expression pattern.

31. The security appliance of claim 30 wherein the processor is further configured to determine a subset of the given regular expression pattern, the subset of the given pattern regular expression corresponding to the assertion of the given regular expression pattern.

32. The security appliance of claim 31 wherein the processor is further configured to determine whether the subset of the given regular expression pattern is matched by the rNFA graph.

33. The security appliance of claim 32 wherein the processor is further configured to:
based on the assertion being a positive assertion, report the assertion is satisfied in an event the subset of the given regular expression pattern is matched by the rNFA graph.

34. The security appliance of claim 32 wherein the processor is further configured to:
based on the assertion being a positive assertion, report an unsatisfied assertion in an event the subset of the given regular expression pattern is matched by the rNFA graph.

* * * * *